US011707392B2

(12) United States Patent
Kennedy et al.

(10) Patent No.: US 11,707,392 B2
(45) Date of Patent: Jul. 25, 2023

(54) PATIENT SUPPORT APPARATUS FOR REMOVABLY RETAINING DIFFERENTLY-SIZED PORTABLE ELECTRONIC DEVICES

(71) Applicant: Stryker Corporation, Kalamazoo, MI (US)

(72) Inventors: Jeffrey Alan Kennedy, Kalamazoo, MI (US); Christopher Ryan Sweeney, Portage, MI (US); Kurosh Nahavandi, Portage, MI (US); Krishna Sandeep Bhimavarapu, Kalamazoo, MI (US); Anish Paul, Kalamazoo, MI (US); Jerald A. Trepanier, Augusta, MI (US); Kyle Stephen Spieker, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 81 days.

(21) Appl. No.: 17/241,216

(22) Filed: Apr. 27, 2021

(65) Prior Publication Data

US 2021/0330526 A1 Oct. 28, 2021

Related U.S. Application Data

(60) Provisional application No. 63/015,819, filed on Apr. 27, 2020.

(51) Int. Cl.
*A61G 7/05* (2006.01)
*H02J 7/00* (2006.01)
(Continued)

(52) U.S. Cl.
CPC ............ *A61G 7/0524* (2016.11); *A61G 7/012* (2013.01); *A61G 7/015* (2013.01); *H02J 7/0042* (2013.01)

(58) Field of Classification Search
CPC .... H01H 9/025; A61G 7/018; A61G 2203/36; A61G 7/0524; A61G 7/012; A61G 7/015; A47C 31/008
See application file for complete search history.

(56) References Cited

U.S. PATENT DOCUMENTS

| 7,566,984 B2 | 7/2009 | Blanchard |
| 8,143,846 B2 | 3/2012 | Herman et al. |

(Continued)

OTHER PUBLICATIONS

Patric Sundsvald, Phone wall mount, Oct. 16, 2017, https://www.myminifactory.com/object/3d-print-phone-holder-wallmount-46951 (Year: 2017).*

(Continued)

*Primary Examiner* — David R Hare
*Assistant Examiner* — Adam C Ortiz
(74) *Attorney, Agent, or Firm* — Howard & Howard Attorneys PLLC

(57) ABSTRACT

A patient support apparatus for removably retaining differently-sized portable electronic devices. The patient support apparatus comprises a base, a litter with a patient support deck for supporting the patient, and a side rail. The side rail is coupled to the litter and arranged for movement relative to the base. The side rail includes a caddy comprising a back, a first brace, and a second brace spaced from the first brace. The first brace extends laterally from the back and defines a first bottom support region. The second brace extends laterally from the back and defines a second bottom support region converging toward the first bottom support region to arrange the first and second bottom support regions to provide differing points of contact for retaining differently-sized portable electronic devices.

18 Claims, 51 Drawing Sheets

(51) Int. Cl.
    *A61G 7/015*        (2006.01)
    *A61G 7/012*        (2006.01)

(56) References Cited

U.S. PATENT DOCUMENTS

| | | | |
|---|---|---|---|
| 9,375,374 B2 | 6/2016 | Herman et al. | |
| 9,685,814 B1* | 6/2017 | Moyer | H02J 7/00034 |
| 10,741,284 B2 | 8/2020 | Brosnan et al. | |
| 2011/0247137 A1* | 10/2011 | Herman | A61G 7/018 |
| | | | 5/503.1 |
| 2011/0277239 A1* | 11/2011 | Keehfus | A47C 21/00 |
| | | | 5/503.1 |
| 2016/0008197 A1 | 1/2016 | Zerhusen et al. | |
| 2018/0333317 A1 | 11/2018 | Zerhusen et al. | |
| 2019/0015276 A1 | 1/2019 | Bhimavarapu et al. | |
| 2021/0212872 A1 | 7/2021 | Herman et al. | |

OTHER PUBLICATIONS

Frumusanu, Andrei, "The State of Wireless Charging Standards in Mobile", Apr. 2, 2015, 6 pages.
Bill-Rom, "Centrella Smart + Bed Brochure", https://centrellabed.com/files/brochure.pdf, Sep. 28, 2017, 11 pages.
Stryker, "In-Touch Critcal Care Bed, Model FL27, 2131/2141 Maintenance Manual," 2141-009-002 Rev A, https://techweb.stryker.com/Critical_Care/FL27/3_0/maintenance/2141-009-002A.pdf, Jun. 2012, 247 pages.

* cited by examiner

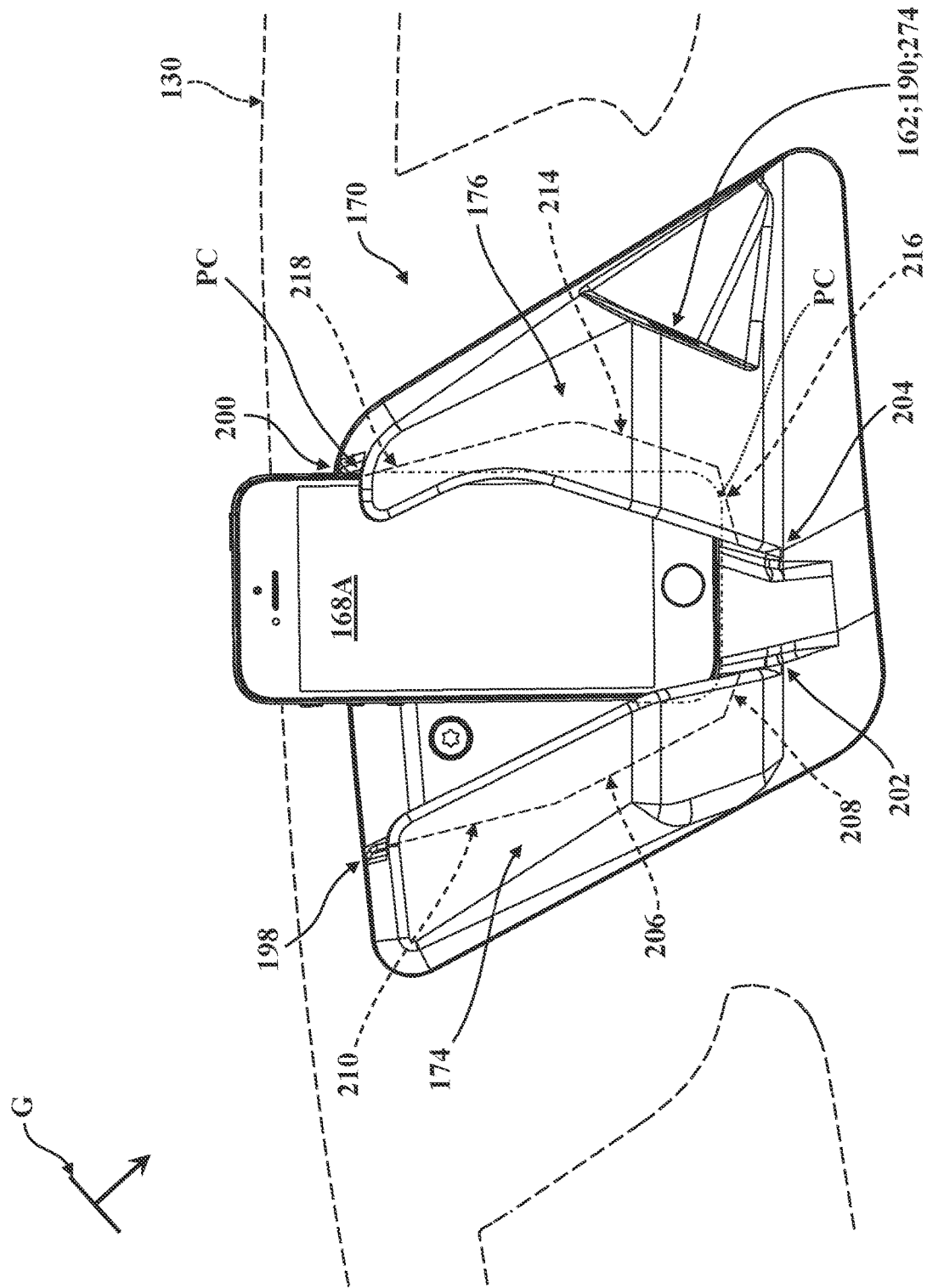

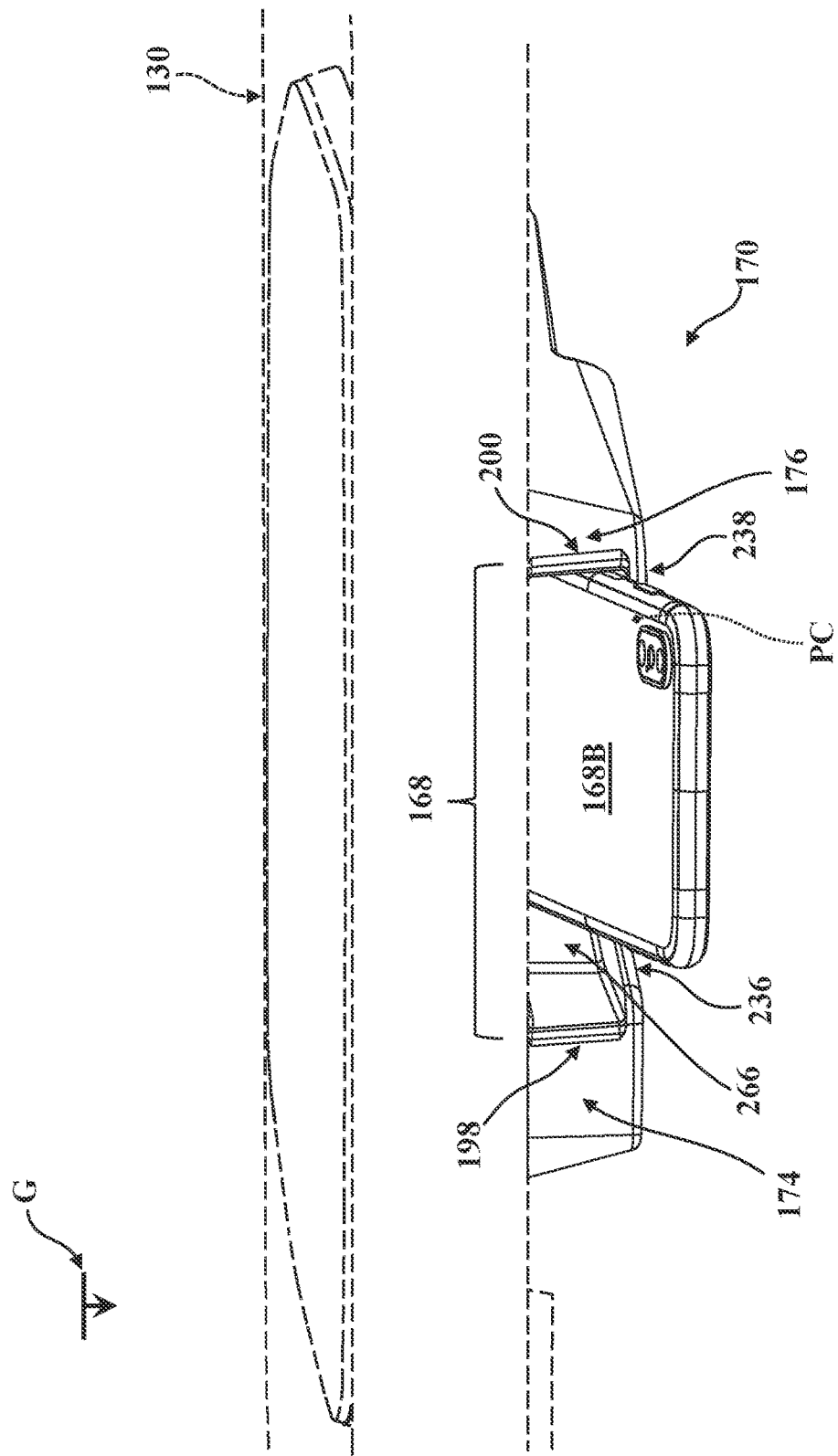

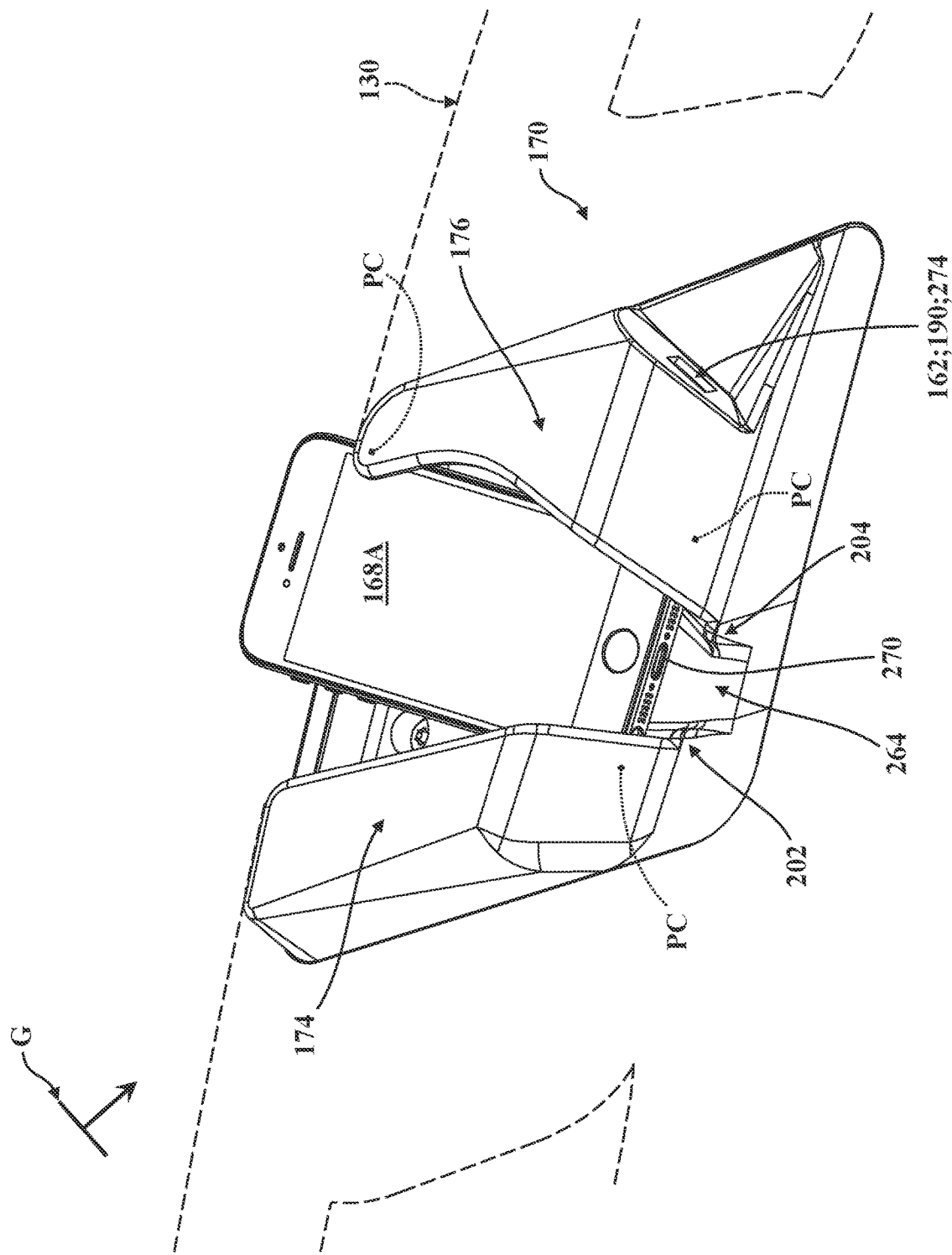

US 11,707,392 B2

PATIENT SUPPORT APPARATUS FOR REMOVABLY RETAINING DIFFERENTLY-SIZED PORTABLE ELECTRONIC DEVICES

CROSS-REFERENCE TO RELATED APPLICATION

This application claims priority to and all the benefits of U.S. Provisional Patent Application No. 63/015,819, filed on Apr. 27, 2020, the disclosure of which is hereby incorporated by reference in its entirety.

TECHNICAL FIELD

The present disclosure relates, generally, to patient support apparatuses and, more specifically, to patient support apparatuses for removably retaining differently-sized portable electronic devices.

BACKGROUND

Patient support apparatuses, such as hospital beds, stretchers, cots, tables, wheelchairs, and chairs are used to help caregivers facilitate care of patients in a health care setting. Conventional patient support apparatuses generally comprise a base and a patient support surface upon which the patient is supported. Often, these patient support apparatuses have one or more movable components, such as side rails that lift and lower, deck sections which articulate to adjust the patient support surface, lift mechanisms that adjust the height of the patient support surface, and the like.

As portable electronic devices (e.g., mobile phones, tablets, and the like of various form factors) become increasingly prevalent in society, patients are often left without a convenient place to store their portable electronic device(s) while they are supported by the patient support apparatus. Here, patients may place their portable electronic devices next to them (e.g., on a mattress), but may subsequently have difficulty locating the portable electronic device if, for example, they adjust their position on the mattress. Furthermore, because various components of the patient support apparatus can move relative to each other, it is possible for portable electronic devices to become lodged between different components (e.g., between the mattress and a side rail).

Accordingly, there remains a need in the art to address one or more of the challenges outlined above.

BRIEF DESCRIPTION OF THE DRAWINGS

Advantages of the present disclosure will be readily appreciated as the same becomes better understood by reference to the following detailed description when considered in connection with the accompanying drawings.

FIG. 18D is another enlarged partial front view of the side rail, the caddy, and the first type of portable electronic device of FIGS. 18B-18C, shown with the first type of portable electronic device retained by the caddy in another different exemplary configuration effected by the arrangement of the gravitational reference indicia.

FIG. 20C is another enlarged partial top perspective view of the side rail and the caddy of FIG. 20A, shown with a second type of portable electronic device retained by the caddy in an exemplary configuration effected by the arrangement of the gravitational reference indicia.

FIG. 24B is another enlarged partial bottom perspective view of the side rail and the caddy of FIG. 24A, shown with a first type of portable electronic device retained by the caddy in an exemplary configuration effected by the arrangement of the gravitational reference indicia.

DETAILED DESCRIPTION

Figure 1:
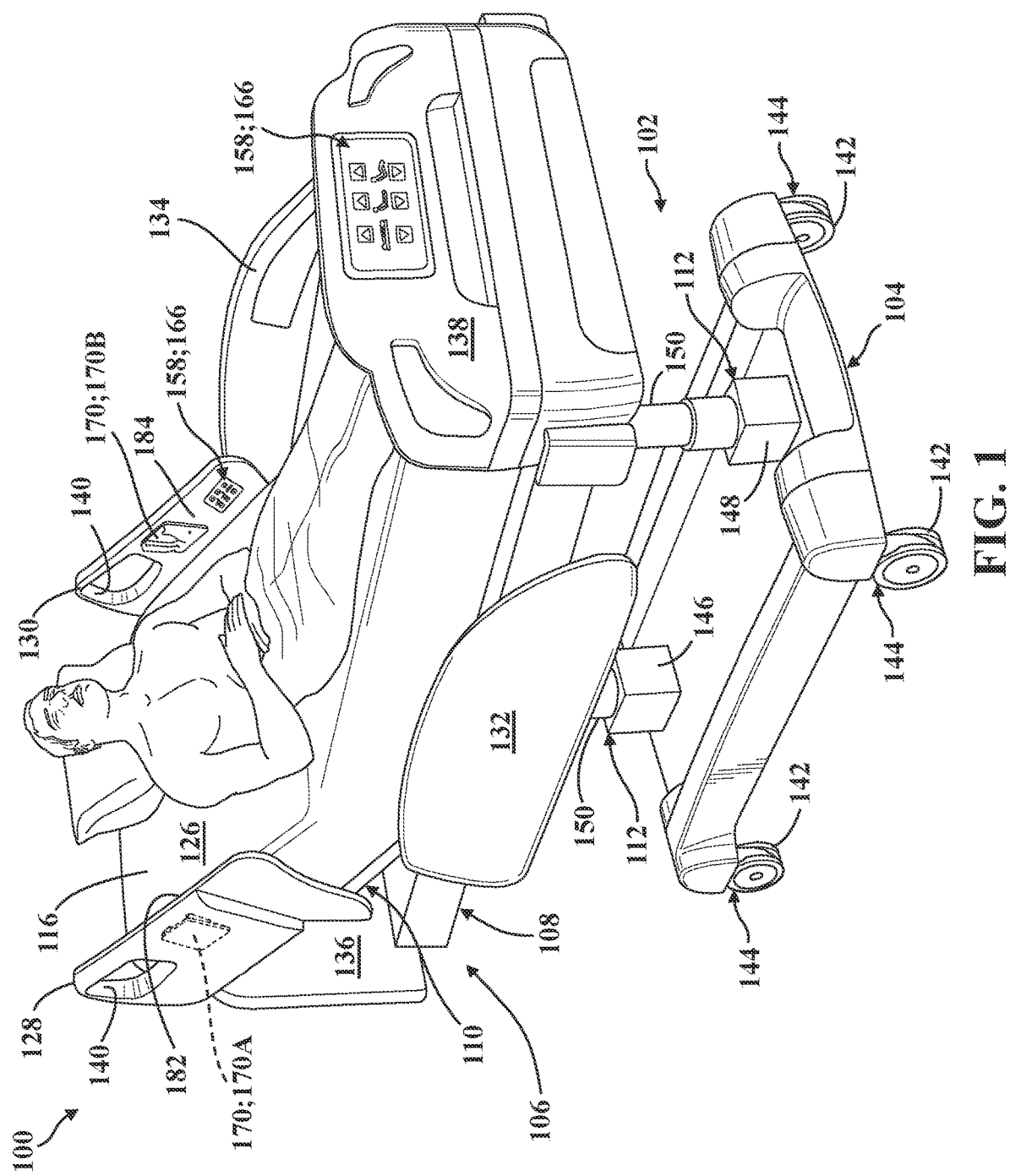
FIG. 1 is perspective view of a patient support apparatus having a base, a litter with a patient support deck, a lift mechanism, and first, second, third, and fourth side rails, the first and second side rails shown supporting caddies each configured to removably retain differently sized portable electronic devices according to embodiments of the present disclosure.

Referring to FIGS. 1 and 3A-6B, a patient support apparatus 100 is shown for supporting a patient in a health care setting. The patient support apparatus 100 illustrated throughout the drawings is realized as a hospital bed. In other embodiments, however, the patient support apparatus 100 may be a stretcher, a cot, a table, a wheelchair, a chair, or a similar apparatus utilized in the care of a patient.

A support structure 102 provides support for the patient. In the representative embodiment illustrated herein, the support structure 102 generally comprises a base 104 and a litter 106. In the representative embodiment illustrated herein, the litter 106 comprises an intermediate frame 108 and a patient support deck 110 spaced above the base 104. Here, and as is described in greater detail below, a lift mechanism 112 is interposed between the base 104 and the litter 106 to facilitate moving the litter 106 relative to the base 104 between a plurality of vertical configurations, including without limitation one or more raised configurations 106A (see FIGS. 3A-4A), lowered configurations 106B (see FIGS. 4B-5), and/or inclined configurations 106C (see FIGS. 6A-6B) such as a Trendelenburg configuration (see FIG. 6B).

The patient support deck 110 has at least one deck section 114 arranged for movement relative to the intermediate frame 108 between a plurality of section positions 114A, 114B. The deck sections 114 of the patient support deck 110 provide a patient support surface 116 upon which the patient is supported. More specifically, in the representative embodiment of the patient support apparatus 100 illustrated herein, the patient support deck 110 has four deck sections 114 which cooperate to define the patient support surface 116: a back section 118, a seat section 120, a leg section 122, and a foot section 124 (see FIGS. 3A-6B). In the representative embodiment illustrated herein, the seat section 120 is fixed to the intermediate frame 108 and is not arranged for movement relative thereto. However, it will be appreciated that the seat section 120 could be movable relative to other deck sections 114 in some embodiments. Conversely, the back section 118 and the leg section 122 are arranged for independent movement relative to each other and to the intermediate frame 108, as described in greater detail below, and the foot section 124 is arranged to move partially concurrently with the leg section 122. Other configurations are contemplated, and it will be appreciated that different arrangements of deck sections 114 are contemplated by the present disclosure. By way of non-limiting example, the patient support deck 110 could be configured without a discrete seat section 120 in some embodiments. Furthermore, while the representative embodiment of the litter 106 illustrated herein employs the intermediate frame 108 to support the deck sections 114 of the patient support deck 110 for movement relative to the base 104 via the lift mechanism 112, it will be appreciated that various types of litters 106, with or without discrete intermediate frames 108 and/or with differently-configured lift mechanism 112, are contemplated by the present disclosure.

A mattress 126 is disposed on the patient support deck 110 during use. The mattress 126 comprises a secondary patient support surface 116 upon which the patient is supported. The base 104, the litter 106, the intermediate frame 108, and the patient support deck 110 each have a head end and a foot end corresponding to designated placement of the patient's head and feet on the patient support apparatus 100. It will be appreciated that the specific configuration of the support structure 102 may take on any known or conventional design, and is not limited to that specifically illustrated and described herein. In addition, the mattress 126 may be omitted in certain embodiments, such that the patient can rest directly on the patient support surface 116 defined by the deck sections 114 of the patient support deck 110. Other configurations are contemplated.

Figure 3A:
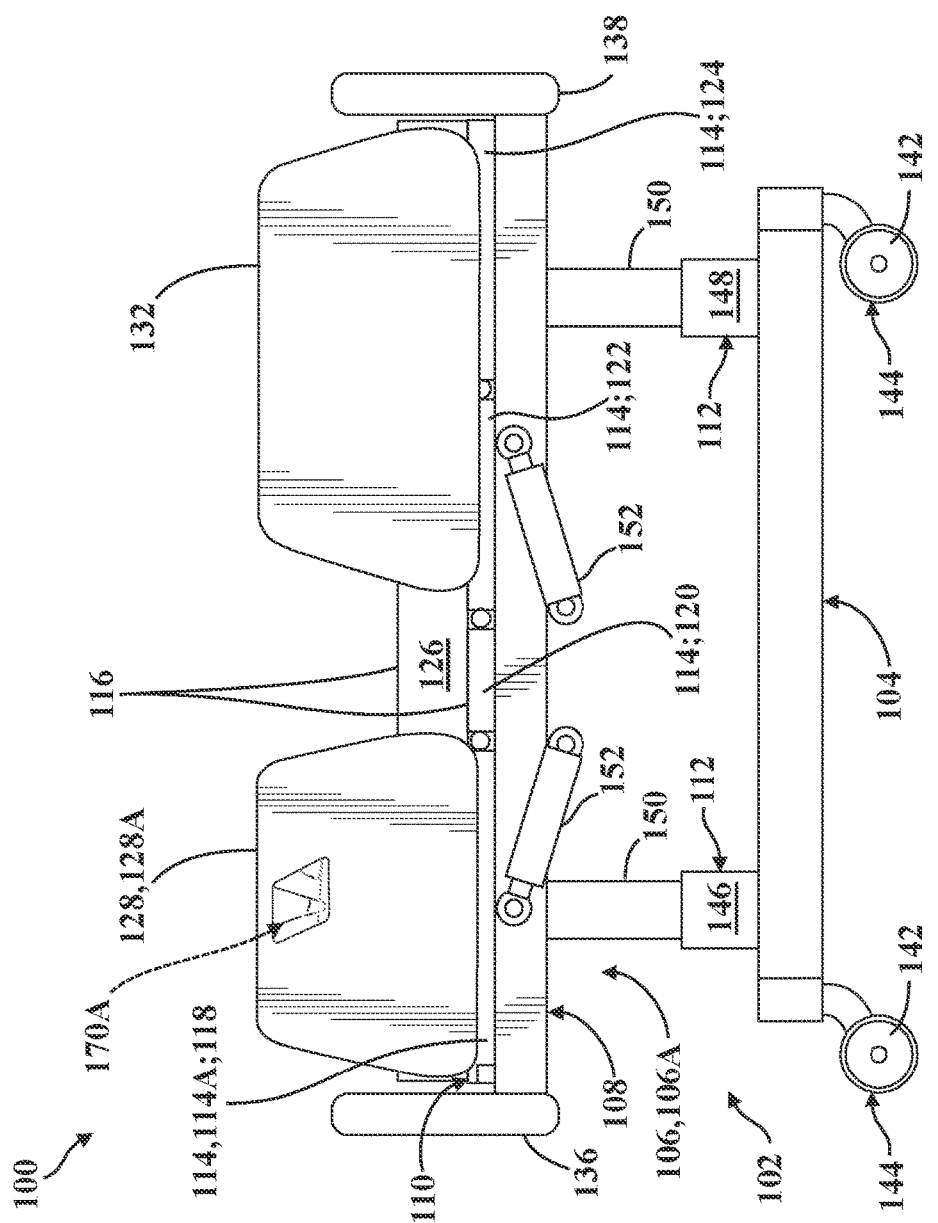
FIG. 3A is a schematic right-side view of the patient support apparatus of FIG. 1, shown with each of the side rails arranged in a raised position, and with a caddy coupled to the first side rail depicted in phantom.
Figure 3B:
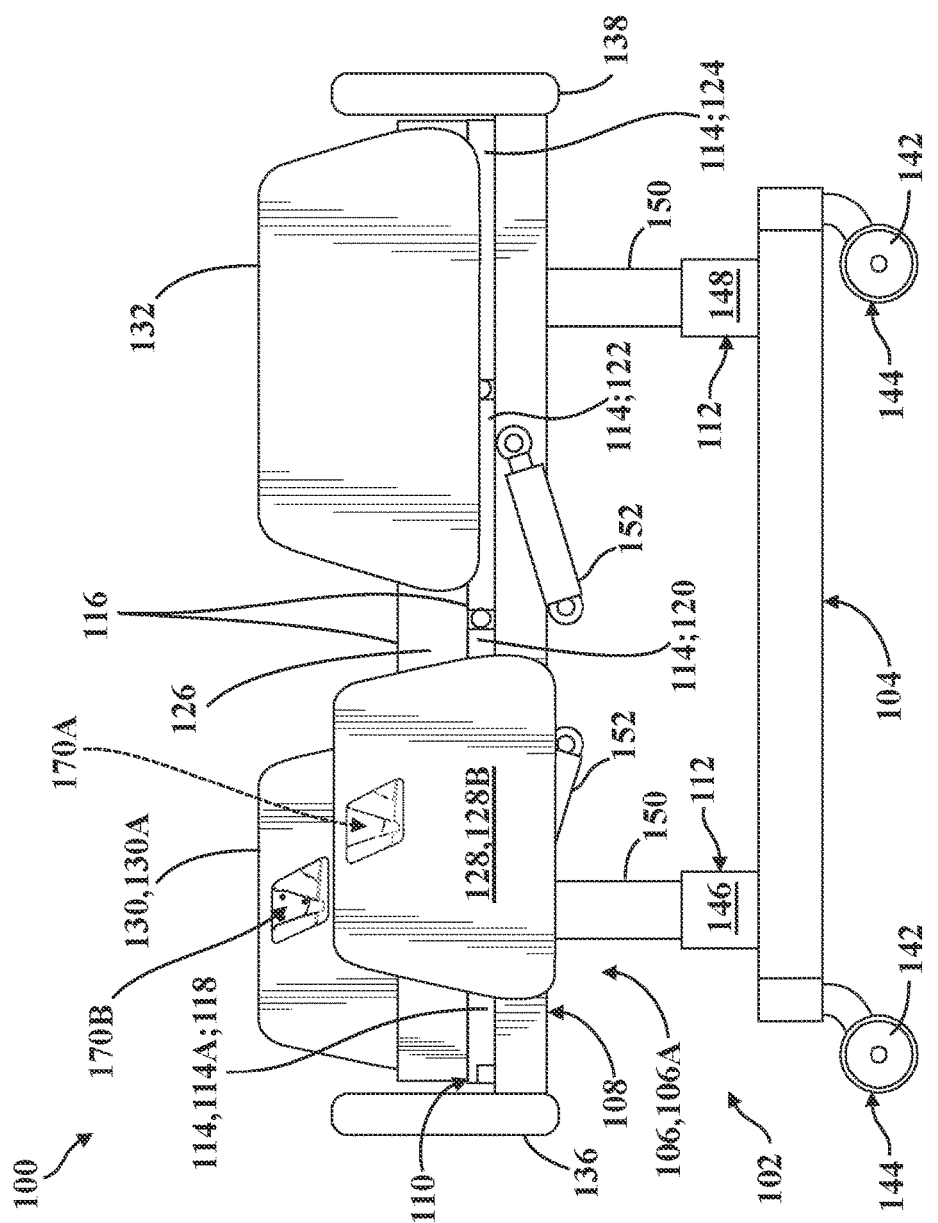
FIG. 3B is another schematic right-side view of the patient support apparatus of FIG. 3A, shown with the first side rail arranged in an intermediate position supporting a caddy depicted in phantom, and shown with the second side rail arranged in the raised position supporting a caddy.
Figure 3C:
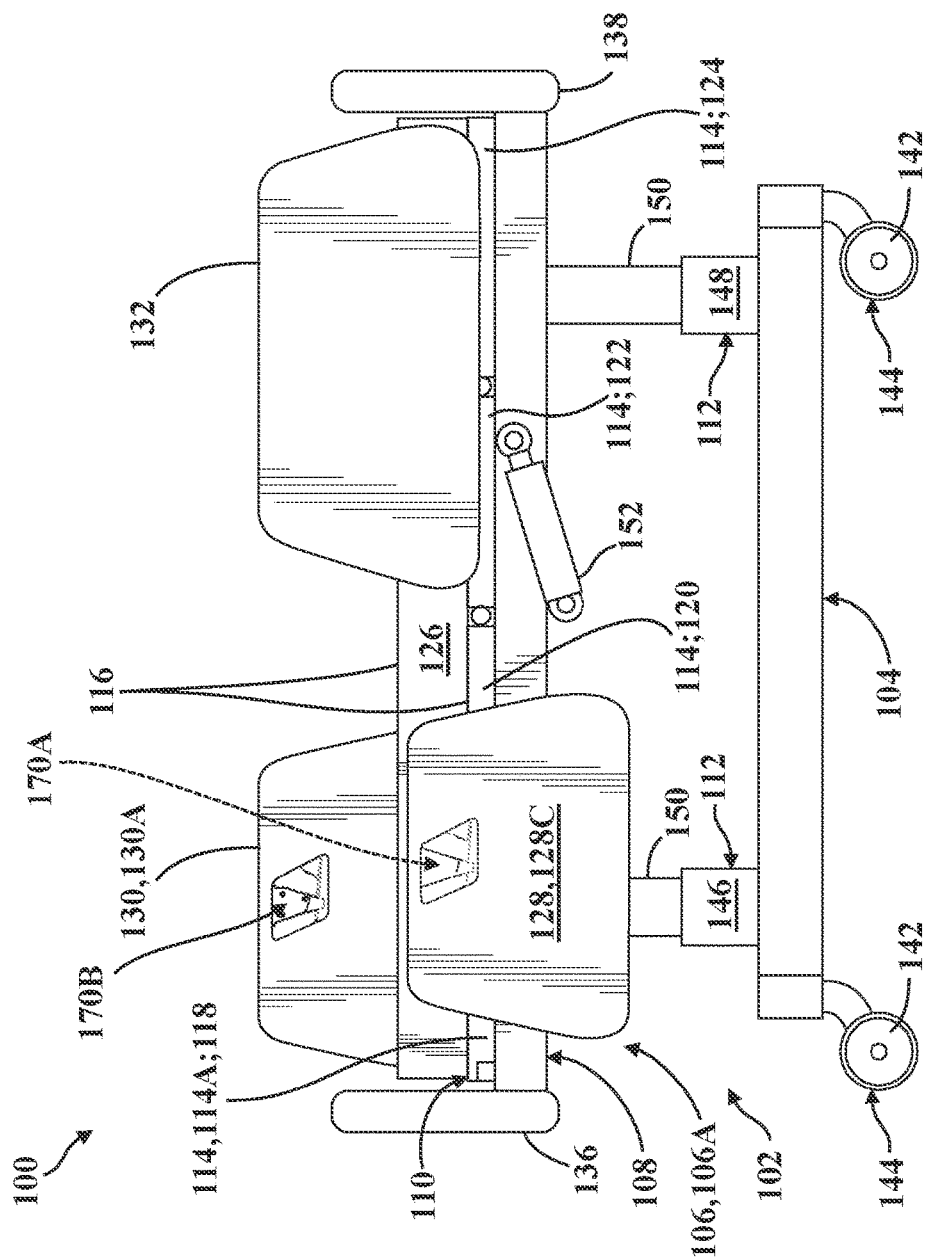
FIG. 3C is another schematic right-side view of the patient support apparatus of FIGS. 3A-3B, shown with the first side rail arranged in a lowered position supporting the caddy depicted in phantom.

Side rails 128, 130, 132, 134 are coupled to the support structure 102 and are supported for movement relative to the litter 106 (and, thus, relative to the base 104). A first side rail 128 is positioned at a right head end of the litter 106. A second side rail 130 is positioned at a left head end of litter 106. A third side rail 132 is positioned at a right foot end of the litter 106. A fourth side rail 134 is positioned at a left foot end of the litter 106. As shown in FIGS. 3A-3C, one or more of the side rails may be movable between a raised position 128A, 130A in which they block ingress and egress into and out of the patient support apparatus 100 (see FIG. 3A), one or more intermediate positions 128B, 130B (see FIG. 3B), and a lowered position 128C, 130C in which they are not an obstacle to such ingress and egress (see FIG. 3C). It will be appreciated that there may be fewer side rails for certain embodiments, such as where the patient support apparatus 100 is realized as a stretcher or a cot. Similarly, it will be appreciated that side rails may be attached to any suitable component or structure of the patient support apparatus 100. In the representative embodiment illustrated herein, the first and second side rails 128, 130 are coupled to the back section 118 of the patient support deck 110 and move concurrently therewith (connection not shown in detail). In FIGS. 4A-6B, which each depict right-side views of the patient support apparatus 100, the first and third side rails 128, 132 are omitted for illustrative purposes.

As shown in FIGS. 1 and 3A-6B, a headboard 136 and a footboard 138 are coupled to the intermediate frame 108 of the litter 106. However, it will be appreciated that the headboard 136 and/or footboard 138 may be coupled to other locations on the patient support apparatus 100, such as the base 104, or may be omitted in certain embodiments. One or more caregiver interfaces 140, such as handles, are shown in FIG. 1 as being integrated into the first and second side rails 128, 130 to facilitate movement of the patient support apparatus 100 over floor surfaces. Additional caregiver interfaces 140 may be integrated into the headboard 136, the footboard 138, and/or other components of the patient support apparatus 100, such as the third and/or fourth side rails 132, 134, the intermediate frame 108, and the like. The caregiver interfaces 140 are shaped so as to be grasped by a caregiver as a way to position or otherwise manipulate the patient support apparatus 100 for movement. It will be appreciated that the caregiver interfaces 140 could be integrated with or operatively attached to any suitable portion of the patient support apparatus 100, or may be omitted in certain embodiments.

Wheels 142 are coupled to the base 104 to facilitate transportation over floor surfaces. The wheels 142 are arranged in each of four quadrants of the base 104, adjacent to corners of the base 104. In the embodiment shown in FIG. 1, the wheels 142 are caster wheels that are able to rotate and swivel relative to the support structure 102 during transport. Here, each of the wheels 142 forms part of a caster assembly 144 mounted to the base 104. It should be understood that various configurations of the caster assemblies 144 are contemplated. In addition, in some embodiments, the wheels 142 are not caster wheels. Moreover, it will be appreciated that the wheels 142 may be non-steerable, steerable, non-powered, powered, or combinations thereof. While the representative embodiment of the patient support apparatus 100 illustrated herein employs four wheels 142, additional wheels are also contemplated. For example, the patient support apparatus 100 may comprise four non-powered, non-steerable wheels, along with one or more additional powered wheels. In some cases, the patient support apparatus may not include any wheels. In other embodiments, one or more auxiliary wheels (powered or non-powered), which are movable between stowed positions and deployed positions, may be coupled to the support structure 102. In some cases, when auxiliary wheels are located between caster assemblies 144 and contact the floor surface in the deployed position, they cause two of the caster assemblies 144 to be lifted off the floor surface, thereby shortening a wheel base of the patient support apparatus 100. A fifth wheel may also be arranged substantially in a center of the base 104.

Figure 4A:
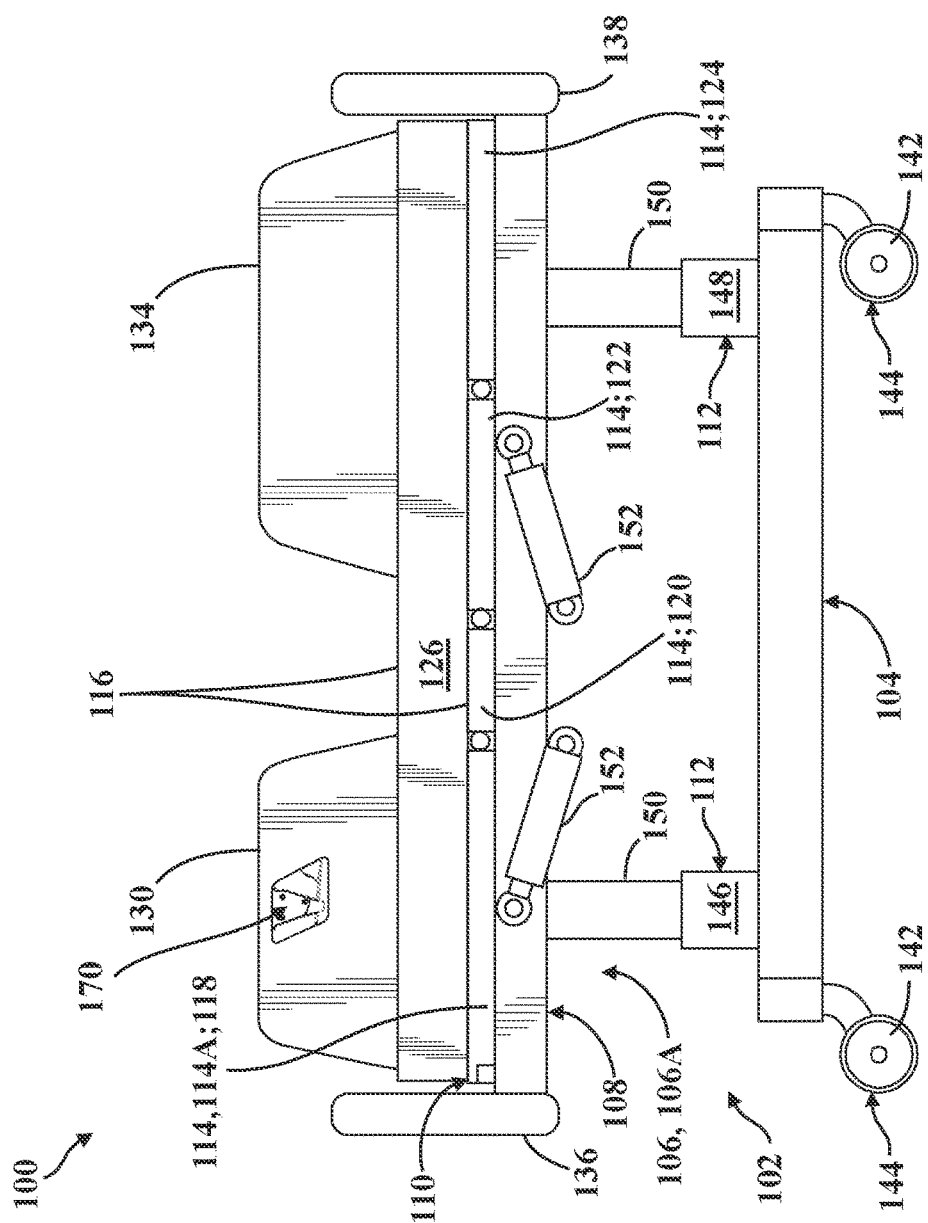
FIG. 4A is another schematic right-side view of the patient support apparatus of FIGS. 3A-3C, shown with two of the side rails removed for illustrative purposes but depicting the caddy coupled to the second side rail, and with the lift mechanism supporting the litter in a raised configuration.
Figure 4B:
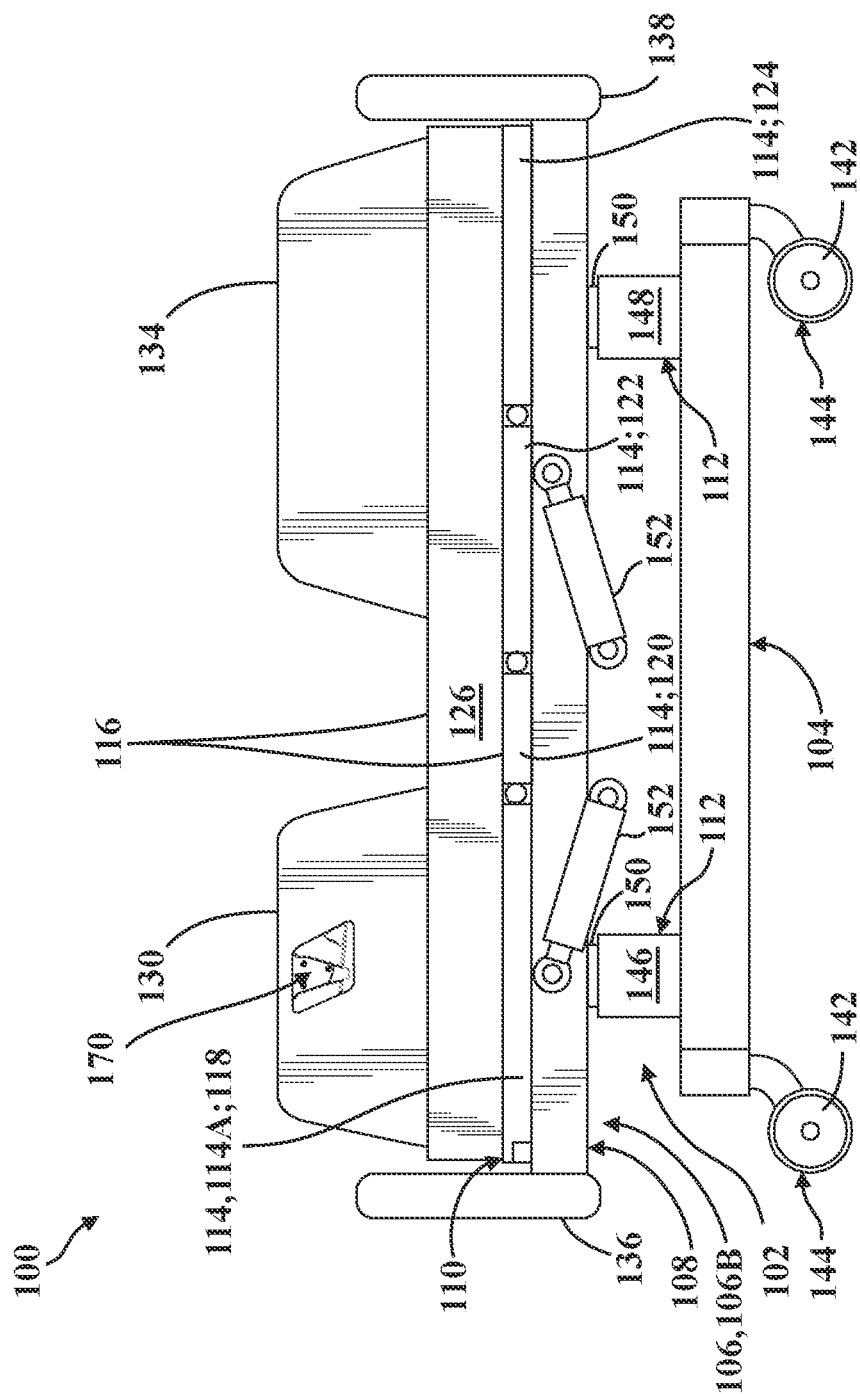
FIG. 4B is another schematic right-side view of the patient support apparatus of FIG. 4A, shown with the lift mechanism supporting the litter in a lowered configuration.
Figure 5:
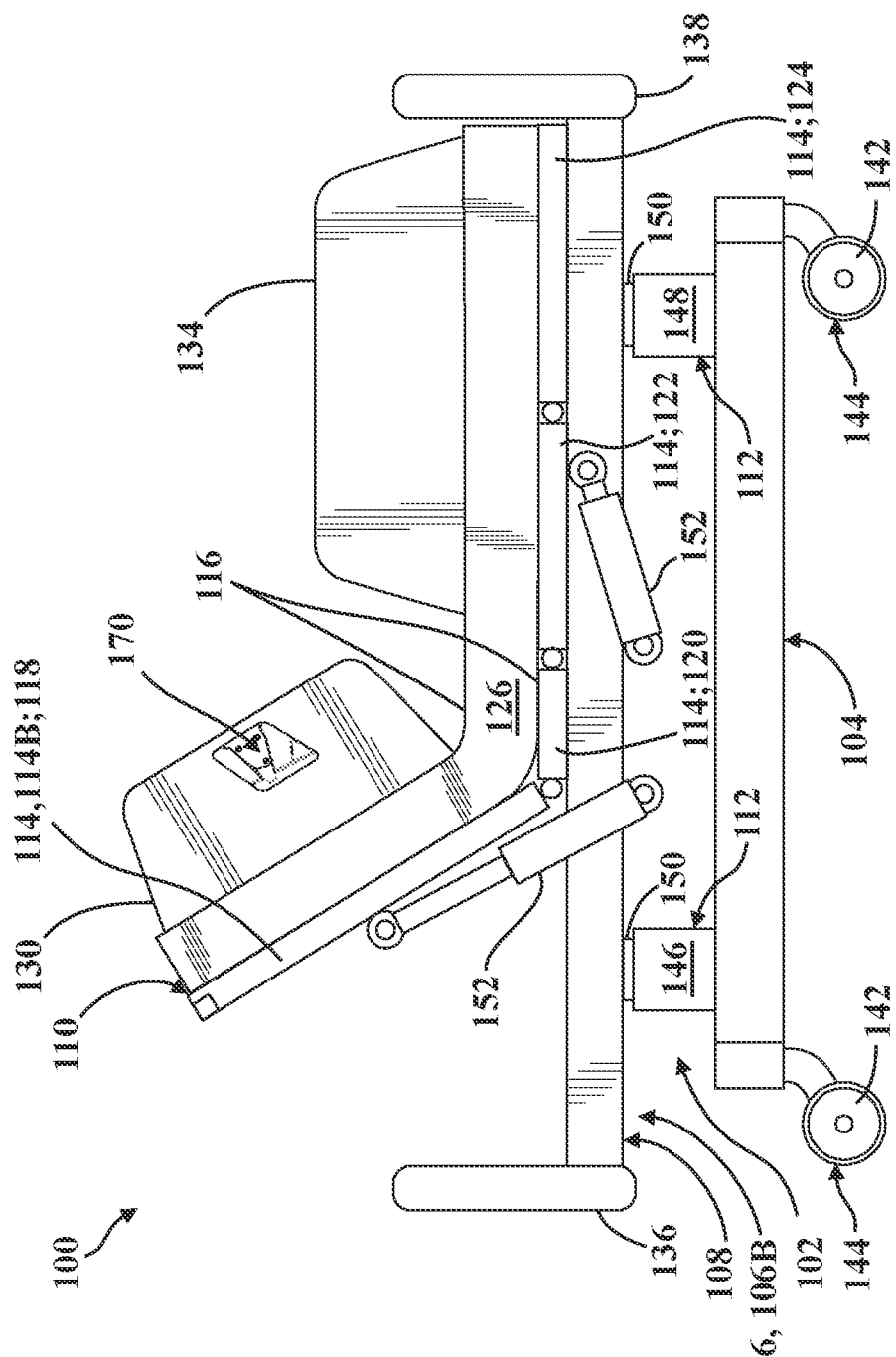
FIG. 5 is another schematic right-side view of the patient support apparatus of FIG. 4B, shown with the patient support deck having a back section arranged in a fowler's position with the second side rail coupled to the back section.
Figure 6A:
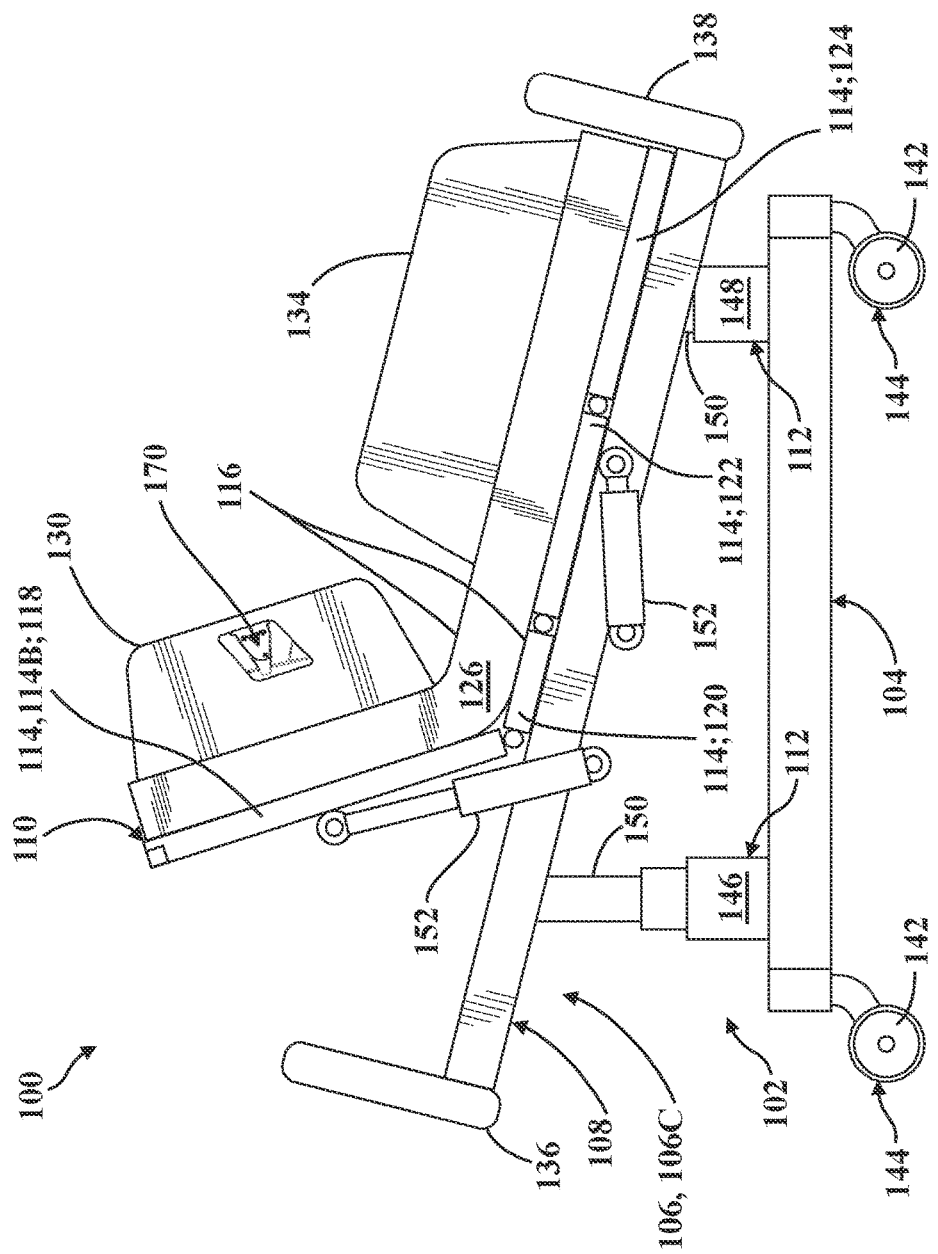
FIG. 6A is another schematic right-side view of the patient support apparatus of FIG. 5, shown with the lift mechanism supporting the litter in an inclined configuration.
Figure 6B:
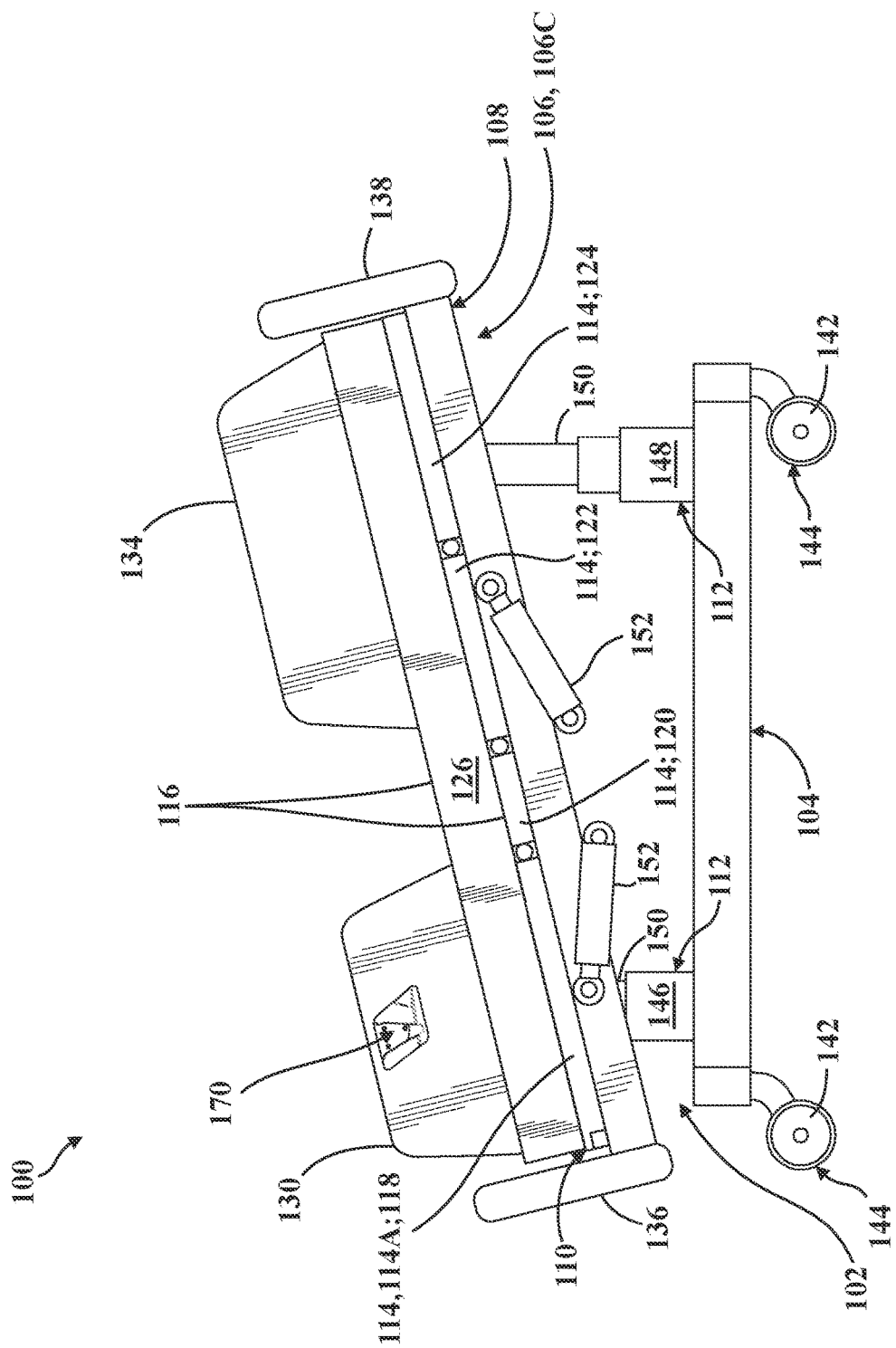
FIG. 6B is another schematic right-side view of the patient support apparatus of FIG. 6A, shown with the back section lowered and with lift mechanism supporting the litter in a Trendelenburg configuration.

As noted above, the patient support apparatus 100 employs the lift mechanism 112 to lift and lower the litter 106 relative to the base 104 which, in turn, moves the patient support deck 110 between various vertical configurations, such as to the raised vertical configuration 106A depicted in FIGS. 3A-4A, the lowered vertical configuration 106B depicted in FIGS. 4B-5, or to any desired vertical configuration therebetween including various inclined configurations 106A such as those depicted in FIGS. 6A-6B. To this end, the lift mechanism 112 comprises a head end lift member 146 and a foot end lift member 148 which are each arranged to facilitate movement of the litter 106 with respect to the base 104 using one or more lift actuators 150. The lift actuators 150 may be realized as linear actuators, rotary actuators, or other types of actuators, and may be electrically operated and/or may be hydraulic. It is contemplated that, in some configurations, only one lift member and one associated lift actuator may be employed, e.g., to raise only one end of the litter 106 (see FIGS. 6A-6B), or one central lift actuator to raise and lower the litter 106. The construction of the lift mechanism 112, the head end lift member 146, and/or the foot end lift member 148 may take on any known or conventional design, and is not limited to that specifically illustrated. By way of non-limiting example, the lift mechanism 112 could comprise a "scissor" linkage arranged between the base 104 and the litter 106 with one or more actuators configured to facilitate vertical movement of the patient support deck 110.

As noted above, the patient support deck 110 is operatively attached to the intermediate frame 108 (e.g., as depicted in FIGS. 1 and 3A-6B), with one or more of the deck sections 114 arranged for movement between a first section position 114A (see FIGS. 3A-4B and 6B) and a second section position 114B (see FIGS. 5-6A). To this end, one or more deck actuators 152 are interposed between the deck section 114 and the intermediate frame 108 to move the deck section 114. In the representative embodiments illustrated herein, the deck actuator 152 is realized as a linear actuator disposed in force-translating relationship between the deck section 114 and the intermediate frame 108. More specifically, one deck actuator 152 is provided between the intermediate frame 108 and the back section 118, and another deck actuator 152 is provided between the intermediate frame 108 and the leg section 122, and each of the deck actuators 152 is arranged for independent movement to position the respective deck sections 114 to adjust the shape of the patient support surface 116 between a plurality of patient support configurations (for example, a flat configuration, a raised fowler configuration, a seated configuration, etc.). Here, the deck actuator 152 coupled to the back section 118 is configured to move the back section 118 between the first section position 114A114A (see FIGS. 3A-4B and 6B), the second section position 114B (see FIGS. 5-6A), as well as to additional section positions between the first and second section positions 114A, 114B and/or to section positions beyond the second section position 114B.

Those having ordinary skill in the art will appreciate that the patient support apparatus 100 could employ any suitable number of deck actuators 152, of any suitable type or configuration sufficient to effect selective movement of one or more of the deck sections 114 relative to the litter 106 or other components of the support structure 102. By way of non-limiting example, the deck actuator 152 could be a linear actuator or one or more rotary actuators driven electronically and/or hydraulically, and/or controlled or driven in any suitable way. Moreover, the deck actuator 152 could be mounted, secured, coupled, or otherwise operatively attached to the intermediate frame 108 and to the deck section 114, either directly or indirectly, in any suitable way. In addition, one or more of the deck actuators 152 could be omitted for certain applications.

Referring now to FIGS. 1-6B, the patient support apparatus 100 employs a control system, generally indicated at 154, to effect operation of various functions of the patient support apparatus 100, as described in greater detail below. To this end, and as is best shown schematically in FIG. 2, the control system 154 generally comprises a controller 156 disposed in communication with one or more user interfaces 158 adapted for use by the patient and/or the caregiver to facilitate operation of one or more functions of the patient support apparatus 100. In certain embodiments, the controller 156 is also disposed in communication with the lift actuators 150, the deck actuators 152, one or more sensors 160, one or more charging interfaces 162, and one or more power supplies 164. Each of these components will be described in greater detail below.

Figure 2:
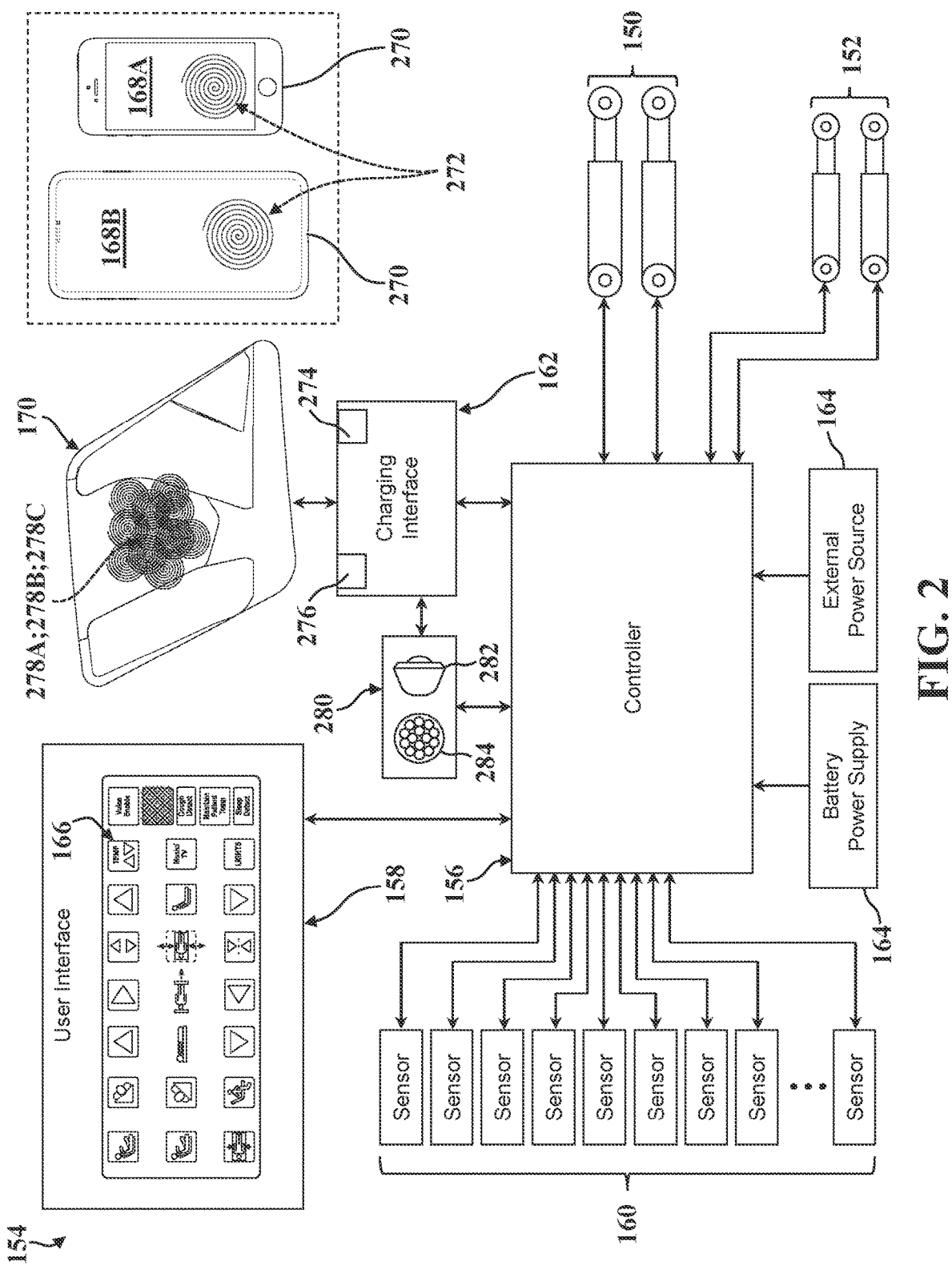
FIG. 2 is an illustrative view of a control system of the patient support apparatus of FIG. 1.

As noted above, the controller 156 is best depicted schematically FIG. 2, and has been omitted from certain drawings for the purposes of clarity and consistency. It will be appreciated that the controller 156 and/or the control system 154 can be configured or otherwise arranged in a number of different ways. The controller 156 may have one or more microprocessors for processing instructions or for processing an algorithm stored in memory to control operation of the actuators 150, 152, generation or interpretation of signals, communication with the user interfaces 158, and the like. Additionally or alternatively, the controller 156 may comprise one or more microcontrollers, field programmable gate arrays, systems on a chip, discrete circuitry, and/or other suitable hardware, software, or firmware that is capable of carrying out the various functions and operations described herein. The controller 156 may be carried onboard the patient support apparatus 100, such as on the base 104 or the litter 106, or may be remotely located. The controller 156 may comprise one or more subcontrollers configured to control all of the actuators 150, 152 and/or user interfaces 158 or one or more subcontrollers for each actuator 150, 152 and/or user interface 158. The controller 156 may communicate with the actuators 150, 152, the user interfaces 158, and or other components of the control system 154 via wired or wireless connections.

In the representative embodiment illustrated in FIG. 1, the patient support apparatus 100 comprises a plurality of user interfaces 158 which may be accessible by the patient, the caregiver, or by both the caregiver and the patient. Each user interface 158 of the patient support apparatus 100 generally comprises an input device 166 configured to generate an input signal in response to activation by a user which, in turn, is communicated to the controller 156. The controller 156, in turn, is responsive to the input signal and can control or otherwise carry out one or more functions of the patient support apparatus 100 in response to receiving the input signal. Put differently, the controller 156 is configured to perform a function of the patient support apparatus 100 in response to receiving the input from the input device 166. By way of non-limiting example, the input device 166 could be realized as a "lift bed" button, activation of which causes the controller 156 to drive the lift actuators 150 to move the litter 106 from the lowered configuration 106B (see FIG. 4B) vertically away from the base 104 towards the raised configuration 106A (see FIG. 4A). Moreover, in some embodiments, the controller 156 may be configured to facilitate navigation of visual content of the user interface 158 in response to receiving the input signal from the input device 166. Thus, it will be appreciated that the user interface 158 could be configured in a number of different ways sufficient to generate the input signal. Moreover, it will be appreciated that the user interfaces 158 could be of a number of different styles, shapes, configurations, and the like. By way of non-limiting example, one or more of the user interfaces 158 may comprise buttons, indicators, screens, graphical user interfaces, and the like. Other configurations are contemplated.

Referring now to FIGS. 1-26F, in the representative embodiments illustrated herein, the patient support apparatus 100 is configured to removably retain differently-sized portable electronic devices 168A, 168B (see FIGS. 2 and 16B-16C), such as one or more mobile phones, tablet computers, electronic reader devices, and the like, of various sizes, shapes, configurations, and/or profiles. To this end, one or more of the side rails 128, 130, 132, 134 includes a caddy 170 which is configured to removably retain differently-sized portable electronic devices 168A, 168B. The caddy 170 generally comprises a back 172, a first brace 174, and a second brace 176. The first brace 174 extends laterally from the back 172 and defines a first bottom support region 178. The second brace 176 extends laterally from the back 172 and is spaced from the first brace 174. The second brace 176 defines a second bottom support region 180 converging toward the first bottom support region 178 to arrange the first and second bottom support regions 178, 180 to provide differing points of contact PC for retaining differently-sized portable electronic devices 168A, 168B. The various portions of the caddy 170 introduced above will each be described in greater detail below.

Those having ordinary skill in the art will appreciate that patient use of portable electronic devices 168A, 168B is commonplace. By way of non-limiting example, a patient may rely on their mobile phone for entertainment, communication, and other purposes while on bed rest following a surgical procedure. As will be appreciated from the subsequent description below, the caddy 170 is shaped and arranged to retain different portable electronic devices 168A, 168B in a number of different orientations irrespective of the specific configuration of the portable electronic device 168A, 168B being retained. To demonstrate this, the representative first and second portable electronic devices 168A, 168B illustrated throughout the drawings are of different sizes; the first portable electronic device 168A is smaller than second portable electronic device 168B, both in terms of width and height (see FIG. 2). It will be appreciated that the portable electronic devices 168A, 168B illustrated throughout the drawings are representative, non-limiting examples of two differently-sized mobile phones, and form no part of the patient support apparatus 100 or the caddy 170. Put differently, a number of differently-sized portable electronic devices can be retained by the caddy 170.

As noted above, the caddy 170 is configured for removably retaining differently-sized portable electronic devices 168A, 168B in a number of different orientations defined, for example, based on movement of the side rails 128, 130, 132, 134. Here, the caddy 170 maintains retention of differently-sized portable electronic devices 168A, 168B during concurrent movement of the side rail 128, 130, 132, 134 and the caddy 170. It will be appreciated that the side rails 128, 130, 132, 134 can move relative to the base 104 in a number of different ways. Furthermore, because the caddy 170 is coupled to one or more of the side rails 128, 130, 132, 134 for concurrent movement, both the caddy 170 and the retained portable electronic device 168A, 168B can likewise be moved relative to the base 104 in a number of different ways. For example, the side rails 128, 130, 132, 134 can be moved relative to the litter 106 between a plurality of side rail positions 128A, 128B, 128C (see FIGS. 3A-3C), and the caddy 170 maintains retention of differently-sized portable electronic devices 168A, 168B as the side rail 128 moves between the plurality of different side rail positions 128A, 128B, 128C. In addition, the side rails 128, 130, 132, 134 can be moved relative to the base 104 based on movement of the litter 106 between a plurality of vertical configurations 106A, 106B, 106C (see FIGS. 4A-6B) via operation of the lift mechanism 112, and the caddy 170 maintains retention of differently-sized portable electronic devices 168A, 168B as the litter 106 moves between the plurality of different vertical configuration 106A, 106B, 106C. Furthermore, in embodiments of the patient support apparatus 100 where one or more of the side rails 128, 130 are coupled to the back section 118 for concurrent movement, adjustment of the patient support deck 110 can also move the side rails 128, 132 as the back section 118 is moved between the first and second section positions 114A, 114B (see FIGS. 4B-5), and the caddy 170 maintains retention of differently-sized portable electronic devices 168A, 168B as the back section 118 moves between the plurality of section positions 114A, 114B.

As best shown in FIG. 1, in some embodiments, the first side rail 128 defines a first side rail surface 182, and the second side rail 130 defines a second side rail surface 184 facing toward the first side rail surface 182. As shown in FIG. 1, a first caddy 170A may be coupled to the first side rail surface 182 (e.g., such that the first brace 174 and the second brace 176 of the first caddy 170A extend laterally away from the first side rail surface 182; not shown in detail), and a second caddy 170B may be coupled to the second side rail surface 184 (e.g., such that the first brace 174 and the second brace 176 of the second caddy 170B extend laterally away from the second side rail surface 184; not shown in detail). With this configuration, a separate caddy 170 may be coupled to each of the first and second side rails 128, 130, thereby allowing the patient to store their portable electronic device 168A, 168B on either the left or right side of the patient support apparatus 100, and/or to store one portable electronic device on the left side of the patient support apparatus 100 and another portable electronic device on the right side of the patient support apparatus 100 (not shown in detail). However, other configurations are contemplated, and one or more of the caddies 170 may each also be configured to retain multiple portable electronic devices simultaneously in some embodiments (not shown). Furthermore, while caddies 170 are shown as being coupled to the head-end side rails 128, 130 in the illustrated embodiments, it will be appreciated that the specific configuration of the side rails 128, 130, 132, 134 could be different than the representative examples provided herein. Thus, in some embodiments, caddies 170 may additionally or alternatively be coupled to foot-end side rails 132, 134 and/or to other components of the patient support apparatus 100 (e.g., the headboard 136, the footboard 138, and the like). Other configurations are contemplated.

Figure 7:
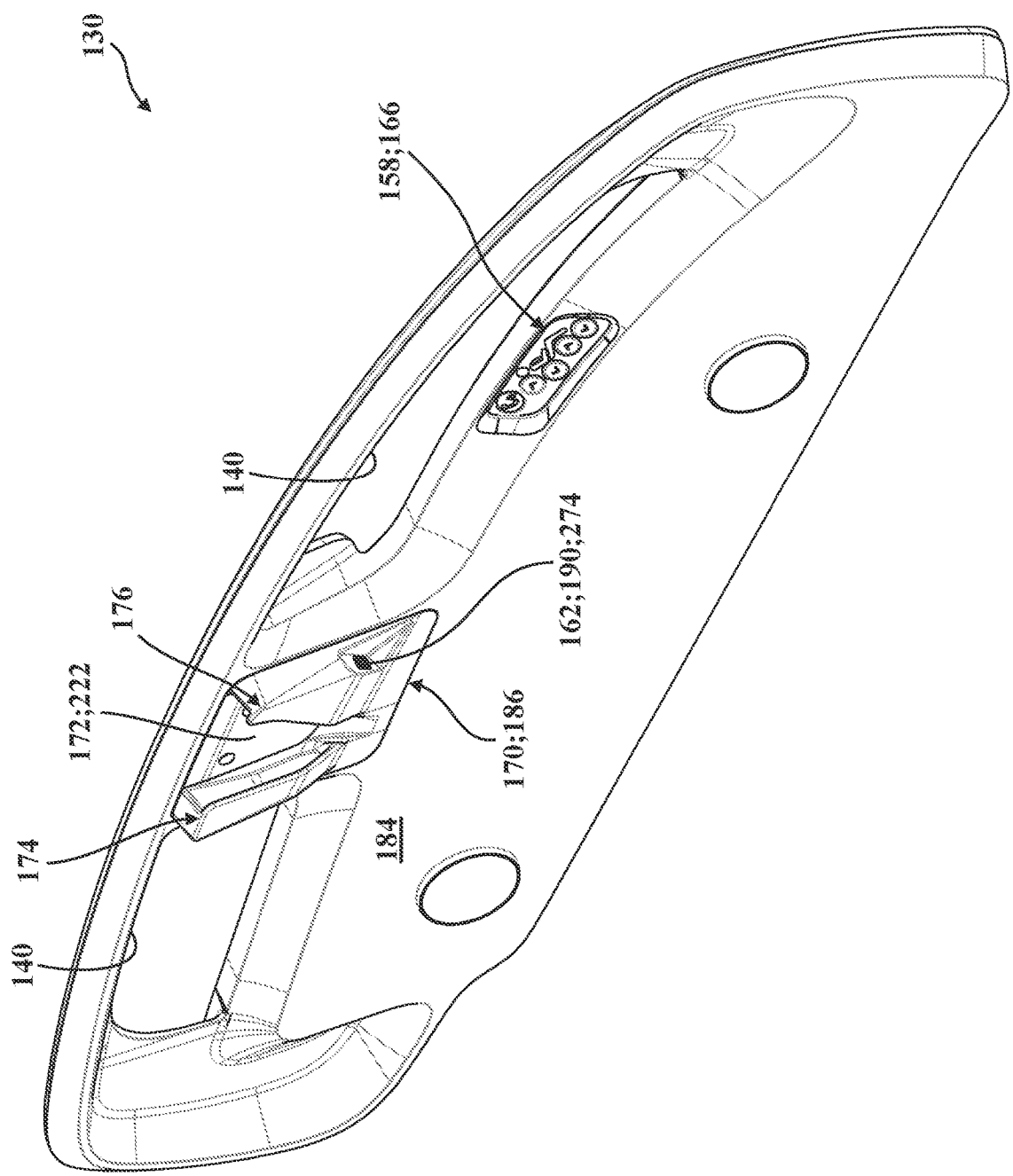
FIG. 7 is a perspective view of a side rail supporting a caddy subassembly with a caddy for retaining differently sized portable electronic devices, shown with the caddy subassembly secured to the side rail via fasteners, according to embodiments of the present disclosure.
Figure 8:
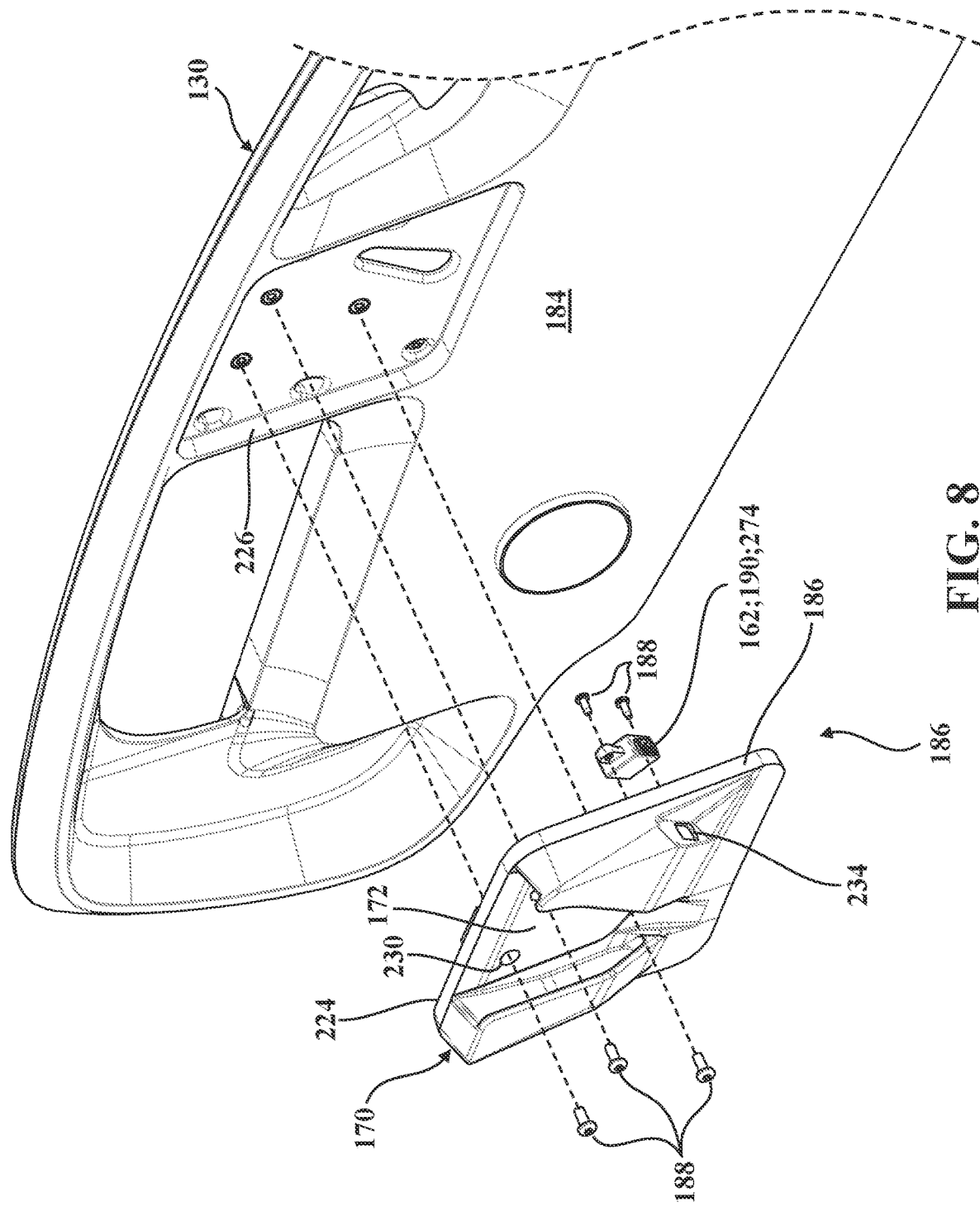
FIG. 8 is a partial, exploded perspective view of the side rail and the caddy subassembly of FIG. 7, shown with the caddy spaced from the side rail.
Figure 9:
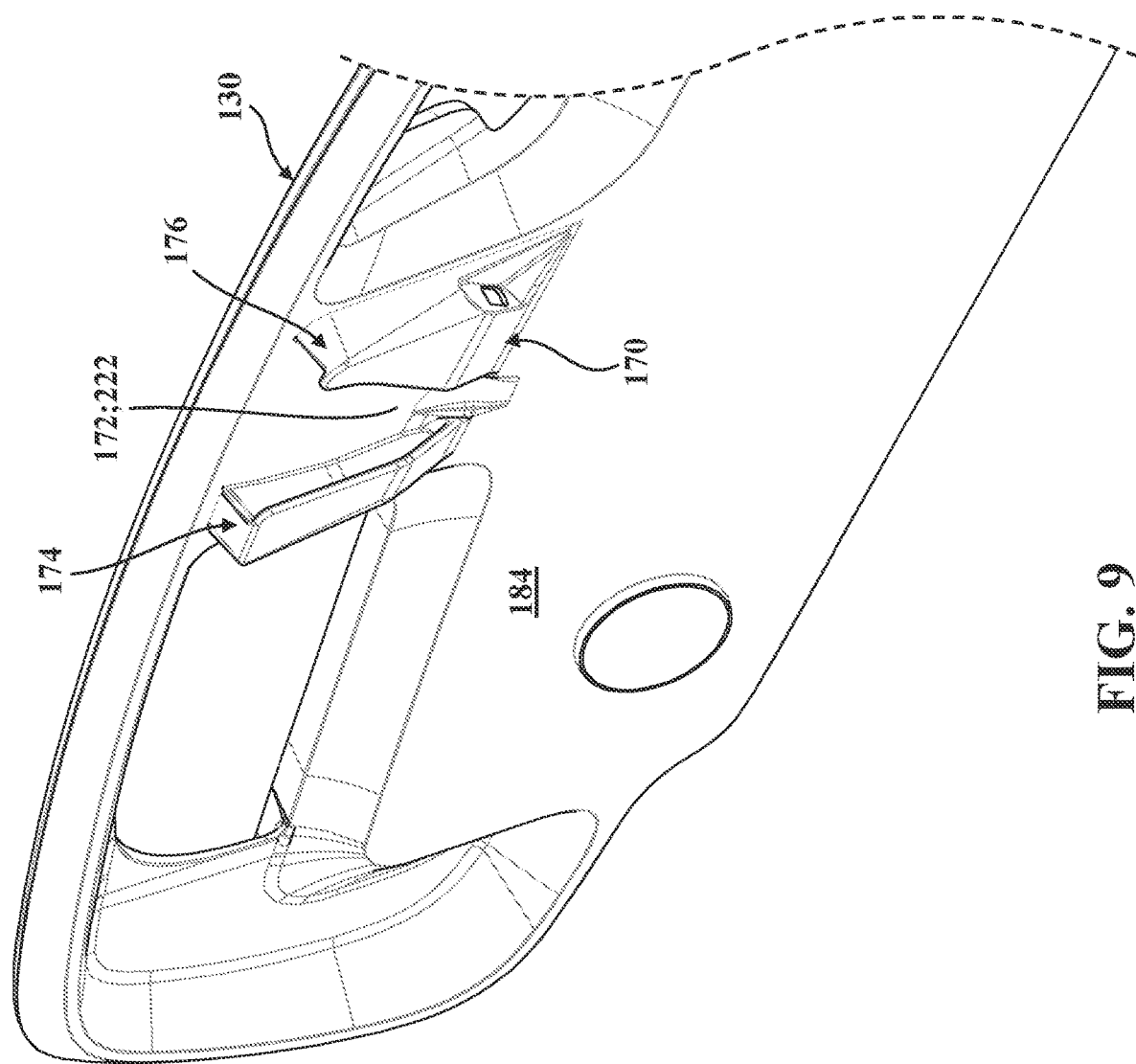
FIG. 9 is a perspective view of a side rail supporting a caddy for retaining differently sized portable electronic devices, shown with the caddy formed integrally with the side rail, according to embodiments of the present disclosure.

Referring now to FIG. 7, an exemplary embodiment of the second side rail 130 is shown with the caddy 170 coupled thereto. More specifically, in the representative embodiment illustrated herein, the caddy 170 forms part of a caddy subassembly 186 which is removably coupled to the second side rail 130 via fasteners 188. As shown in FIG. 8, the caddy subassembly 186 also comprises a tether connector 190 which is removably coupled to the caddy 170 via fasteners 188. As is described in greater detail below in connection with FIG. 25, the tether connector 190 forms part of the charging interface 162 and allows the user to connect a tether 192 to the patient support apparatus 100. While the tether connector 190 is formed separately from the caddy 170 in the illustrated embodiment, it will be appreciated that one or more portions of the tether connector 190 could be formed integrally with the caddy 170. Similarly, while the caddy 170 is formed separately from and coupled to the side rail 130 in the representative embodiment illustrated in FIGS. 7-8, the caddy 170 could be formed integrally with the side rail 130 in some embodiments (see FIG. 9). Other configurations are contemplated.

As noted above, the caddy 170 comprises first and second braces 174, 176 extending from the back 172 which are spaced laterally from each other and define respective first and second bottom support regions 178, 180 what converge toward each other to provide differing points of contact PC for retaining differently-sized portable electronic devices 168A, 168B. As is described in greater detail below in connection with FIGS. 15-24C, various portions of the caddy 170 may provide points of contact PC which differ based on the type, style, configuration, and/or size of portable electronic device 168A, 168B retained by the caddy 170, and/or which differ based on the orientation of the caddy 170 relative to gravity. For illustrative purposes, certain drawings schematically depict a gravitational reference indicia G to help represent general changes in the direction of gravity while maintaining a fixed perspective throughout subsets of successive drawing views (e.g., compare FIGS. 18A-18G). Here, the gravitational reference indicia G is employed in FIGS. 15-24C to help illustrate how various portions of the caddy 170 can provide differing points of contact PC with the representative first and second portable electronic devices 168A, 168B when the caddy 170 is arranged in various ways relative to gravity.

Figure 12:
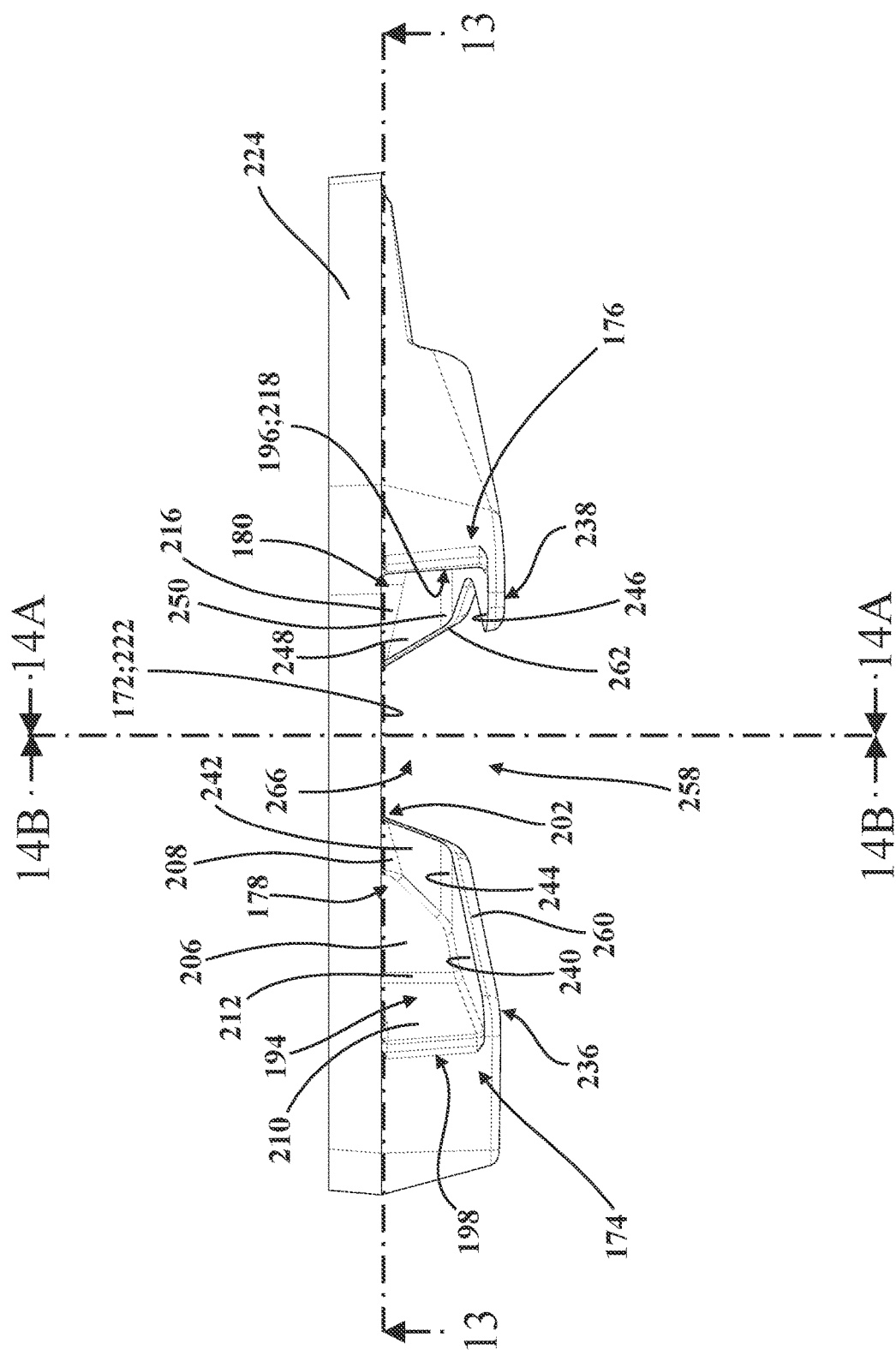
FIG. 12 is a top view of the caddy of the caddy subassembly of FIGS. 10-11.
Figure 13:
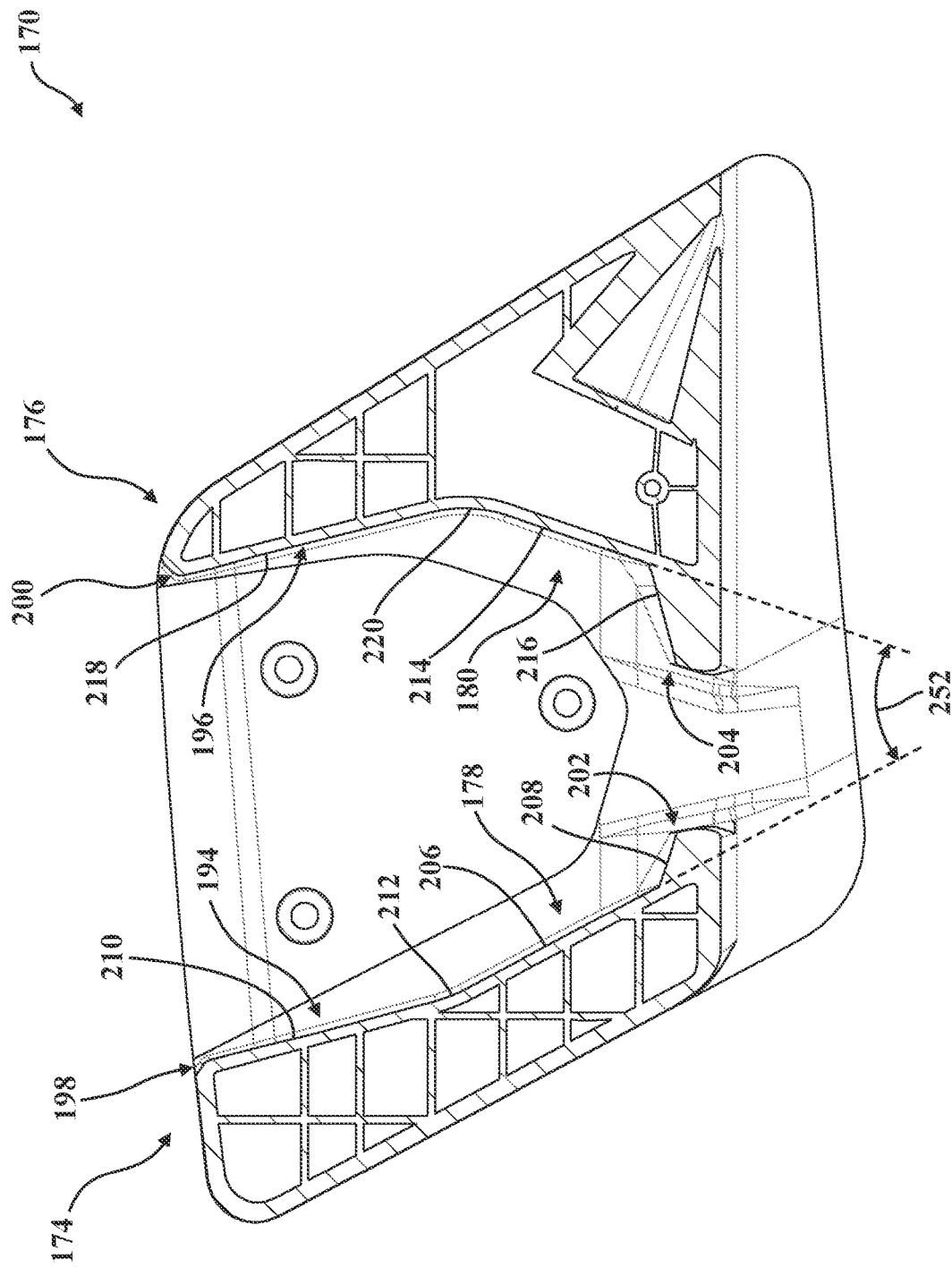
FIG. 13 is a sectional view taken along line 13-13 in FIG. 12.
Figure 14B:
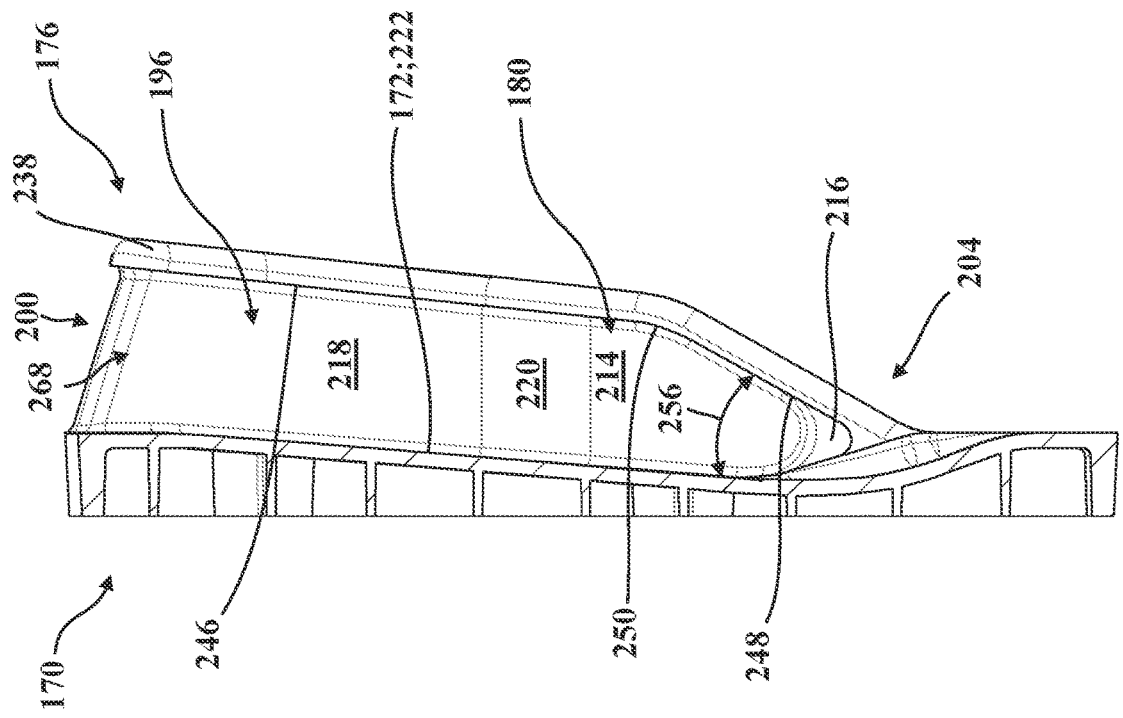
FIG. 14B is a sectional view taken along line 14B-14B in FIG. 12.

Referring now to FIGS. 10-14B, as noted above, the first and second braces 174, 176 each extend generally laterally away from the back 172 and define the respective first and second bottom support regions 178, 180. As is best shown in FIGS. 14A-14B, the first and second braces 174, 176 each also define respective first and second top support regions 194, 196, respective first and second top ends 198, 200, and respective first and second bottom ends 202, 204. Each of the portions of the first and second braces 174, 176 introduced above will be described in greater detail below.

Figure 14A:
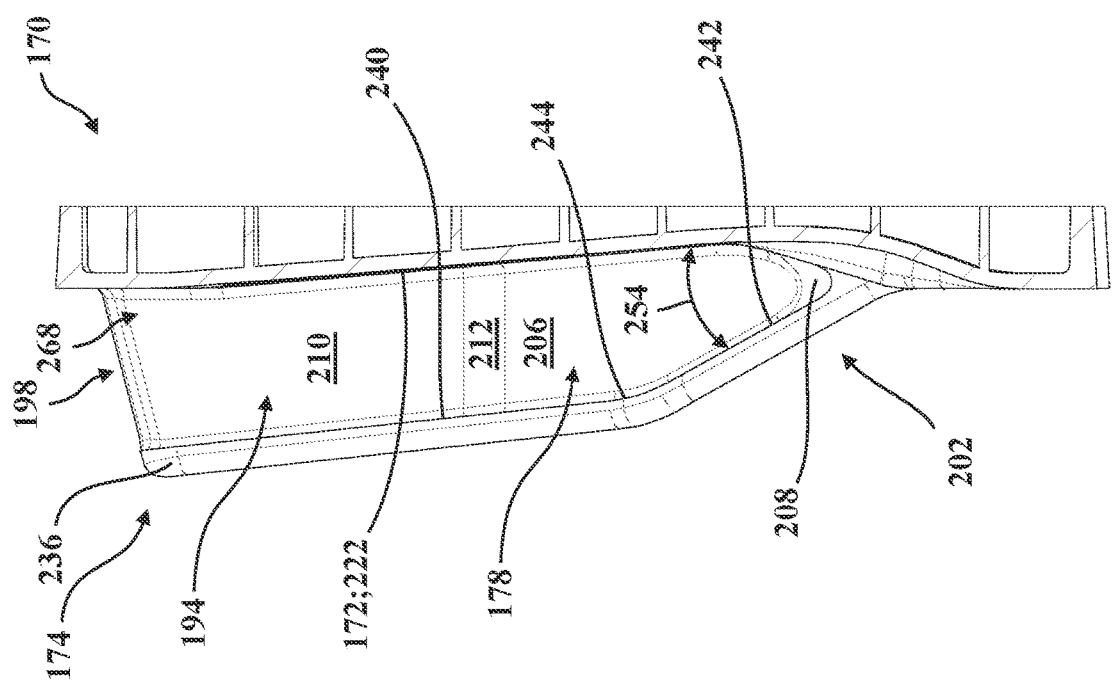
FIG. 14A is a sectional view taken along line 14A-14A in FIG. 12.

As shown in FIG. 14A, the first top support region 194 extends from the first top end 198 toward the first bottom end 202. Similarly, the first bottom support region 178 extends from the first bottom end 202 toward the first top end 198. In the representative embodiment illustrated herein, the first bottom support region 178 comprises a first middle support face 206 and a first lower support face 208, and the first top support region 194 comprises a first top support face 210 and a first transition support face 212. Here, the first top support face 210 is generally planar and has a substantially trapezoidal profile. The first middle support face 206 is also generally planar, and has a profile which tapers or otherwise narrows towards the back 172 and towards the first bottom end 202. The first transition support face 212 has a curved profile (see FIG. 13) extending between the first top support face 210 and the first middle support face 206. The first lower support face 208 has a generally conical profile which tapers towards the first bottom end 202 and towards the back 172. As is described in greater detail below, the first middle support face 206, the first lower support face 208, the first top support face 210, and/or the first transition support face 212 may provide differing points of contact PC with differently-sized portable electronic devices 168A, 168B.

As shown in FIG. 14B, the second top support region 196 extends from the second top end 200 toward the second bottom end 204. Similarly, the second bottom support region 180 extends from the second bottom end 204 toward the second top end 200. In the representative embodiment illustrated herein, the second bottom support region 180 comprises a second middle support face 214 and a second lower support face 216, and the second top support region 196 comprises a second top support face 218 and a second transition support face 220. Here, the second top support face 218 is generally planar and has a substantially trapezoidal profile. The second middle support face 214 is also generally planar, and has a profile which tapers or otherwise narrows towards the back 172 and towards the second bottom end 204. The second transition support face 220 has a curved profile (see FIG. 13) extending between the second top support face 218 and the second middle support face 214. The second lower support face 216 has a generally conical profile which tapers towards the second bottom end 204 and towards the back 172. As is described in greater detail below, the second middle support face 214, the second lower support face 216, the second top support face 218, and/or the second transition support face 220 may provide differing points of contact PC with differently-sized portable electronic devices 168A, 168B.

Figure 10:
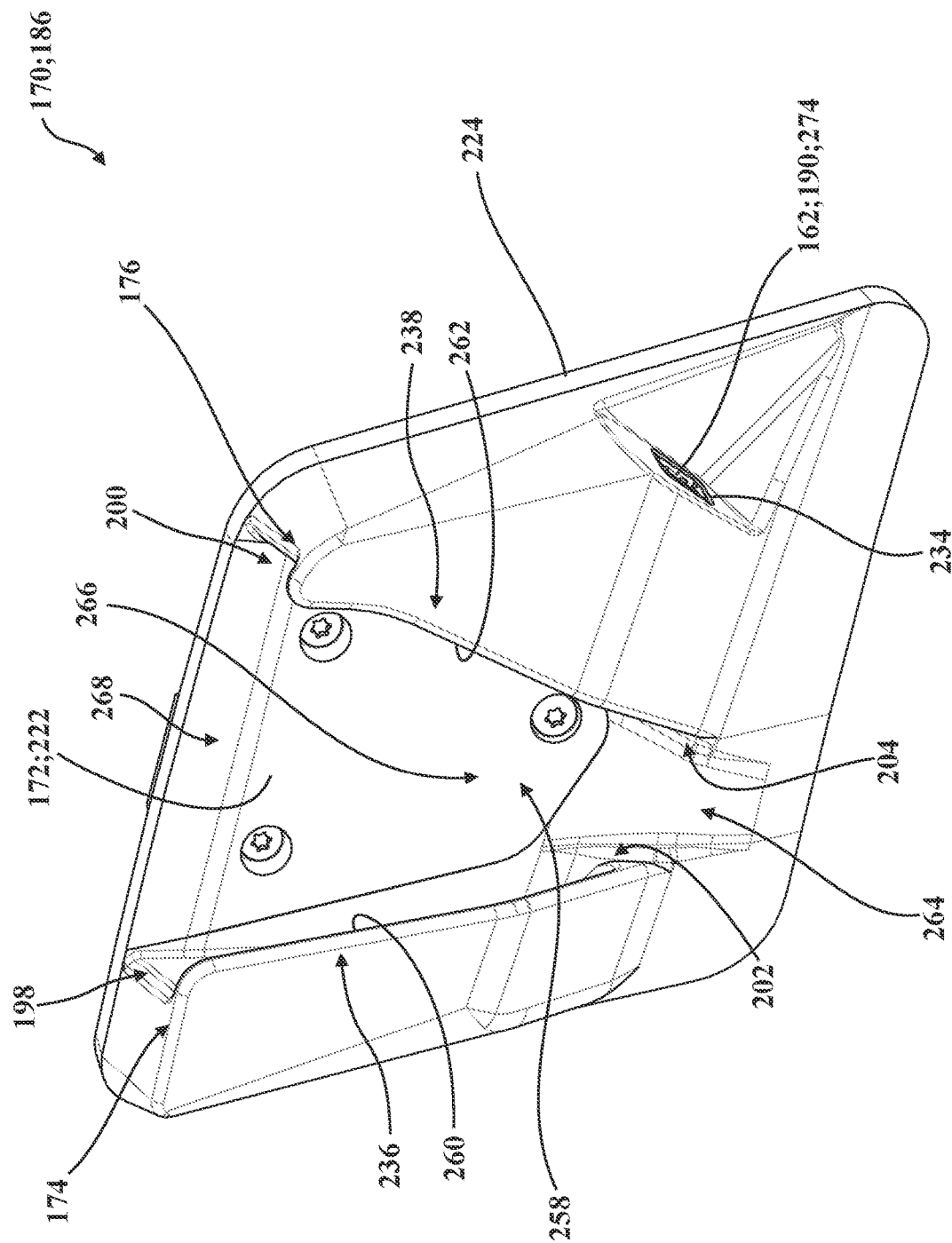
FIG. 10 is a front perspective view of the caddy subassembly of FIGS. 7-8.
Figure 11:
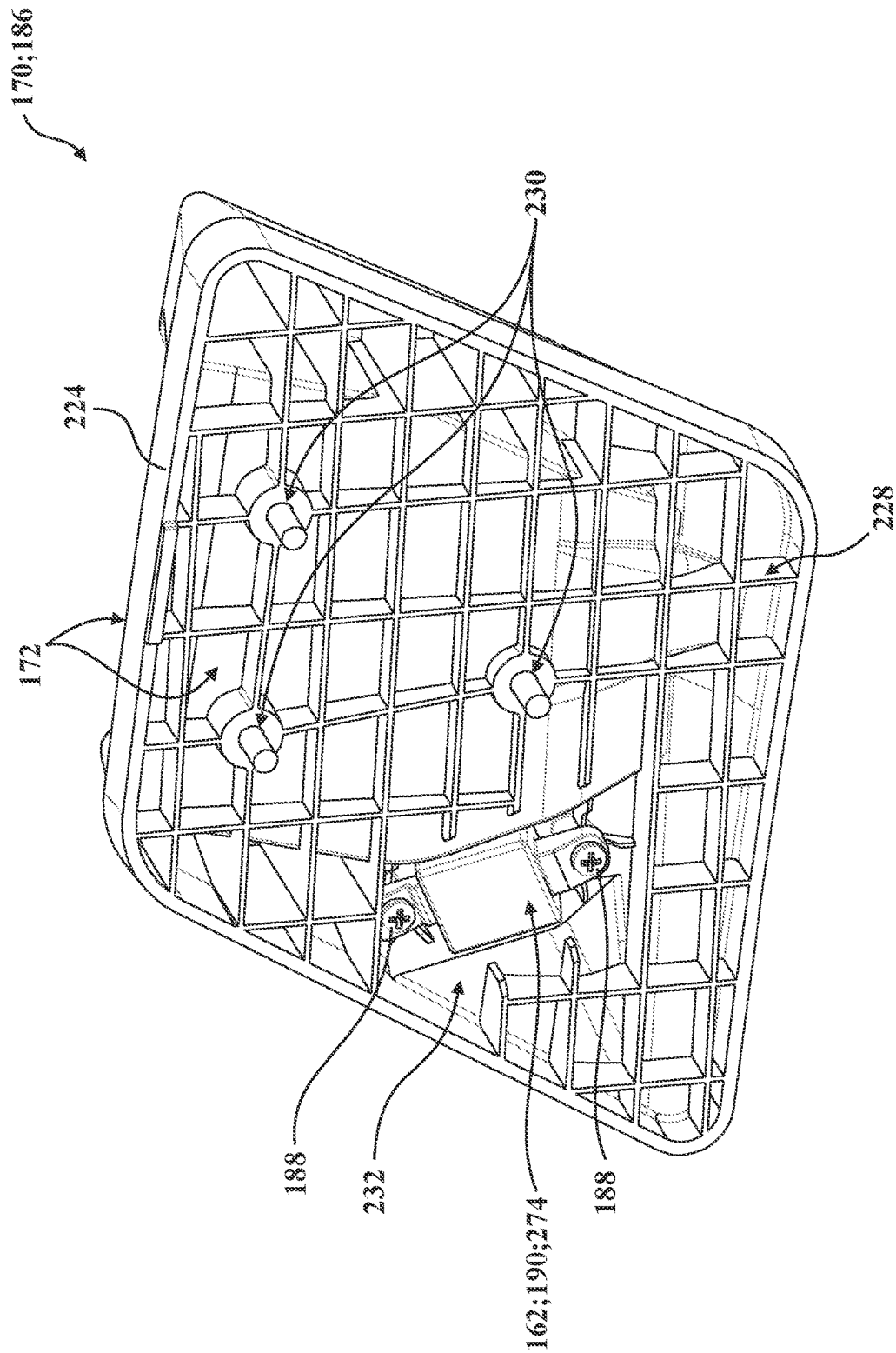
FIG. 11 is a rear perspective view of the caddy subassembly of FIG. 10.

As is best shown in FIG. 10, the back 172 of the caddy 170 comprises a back surface 222 which extends generally longitudinally between the first brace 174 and the second brace 176, and also extends generally vertically between the first and second top ends 198, 200 and the first and second bottom ends 202, 204. The back 172 also comprises a back frame 224 which extends away from the back surface 222 and tapers to facilitate alignment with a correspondingly-shaped frame aperture 226 formed in the side rail 130 (see FIG. 8). As shown in FIG. 11, the representative embodiment of the caddy 170 illustrated herein also comprises ribs 228 formed on the back 172 within the back frame 224. Here too, back apertures 230 are formed extending through the back surface 222 to facilitate attachment to the side rail 130 via fasteners 188, and a back pocket 232 is provided to accommodate the tether connector 190 therein. A notch 234 formed in the caddy 170 is disposed in communication with the back pocket 232 to facilitate connection with the tether 192 as noted above and as is described in greater detail below.

In the representative embodiment illustrated herein, the first and second braces 174, 176 also comprise respective first and second lips 236, 238 which provide additional differing points of contact PC with differently-sized portable electronic devices 168A, 168B. As shown in FIG. 14A, the first lip 236 comprises a first top constraining face 240, a first bottom constraining face 242, and first transition constraining face 244. The first top constraining face 240 is arranged generally parallel with and faces toward the back surface 222, and extends from adjacent to the first top end 198 toward the first bottom end 202. The first bottom constraining face 242 faces generally toward the back surface 222 and merges with the first lower support face 208 adjacent to the first bottom end 202. The first transition constraining face 244 has a curved profile extending between the first top constraining face 240 and the first bottom constraining face 242. As shown in FIG. 14B, the second lip 238 comprises a second top constraining face 246, a second bottom constraining face 248, and second transition constraining face 250. The second top constraining face 246 is arranged generally parallel with and faces toward the back surface 222, and extends from adjacent to the second top end 200 toward the second bottom end 204. The second bottom constraining face 248 faces generally toward the back surface 222 and merges with the second lower support face 216 adjacent to the second bottom end 204. The second transition constraining face 250 has a curved profile extending between the second top constraining face 246 and the second bottom constraining face 248.

As is best shown in FIG. 13, in the representative embodiment illustrated herein, the first lower support face 208 of the first bottom support region 178 is spaced from the second lower support face 216 of the second bottom support region 180. As noted above, both the first lower support face 208 and the second lower support face 216 have substantially planar profiles. In the illustrated embodiment, the first lower support face 208 and the second lower support face 216 are arranged at an oblique angle 252 relative to each other. As will be appreciated from the subsequent description of FIGS. 15-24C below, this arrangement provides a "wedge" in the longitudinal direction which promotes engagement with differently-sized portable electronic devices 168A, 168B at differing points of contact PC. Similarly, and as is depicted in FIGS. 14A-14B, the first and second bottom constraining faces 242, 248 of the first and second lips 236, 238 are respectively arranged at first and second bottom oblique angles 254, 256 relative to the back surface 222 of the back 172 to provide a "wedge" in the lateral direction which promotes engagement with differently-sized portable electronic devices 168A, 168B at differing points of contact PC.

As is best shown in FIGS. 10 and 12, the first and second braces 174, 176 are spaced longitudinally from each other to define an access opening 258 therebetween shaped and arranged to permit access to differently-sized portable electronic devices 168A, 168B retained by the caddy 170. To this end, the first lip 236 of the first brace 174 extends generally longitudinally toward the second brace 176 to a first lip edge 260, and the second lip 238 of the second brace 176 extends generally longitudinally toward the first brace 174 to a second lip edge 262. In the representative embodiment illustrated herein, the access opening 258 defined by the first and second lip edges 260, 262 has a generally V-shaped profile which promotes access to various portions of portable electronic devices 168A, 168B, such as buttons, touch-screen interfaces, cameras, speakers, microphones, sensors, and the like (not shown in detail, but generally known in the related art). Here too in the illustrated embodiment, the first and second braces 174, 176 are spaced from each other adjacent to the first and second bottom ends 202, 204 to define an accessory slot 264 therebetween for routing one or more tethers 192 therebetween to differently-sized portable electronic devices retained within the caddy 170 (see FIG. 25).

As is best shown in FIGS. 12-14B, in some embodiments, the back surface 222 of the back 172 cooperates with the first and second braces 174, 176 to define a storage volume 266 for receiving differently sized portable electronic devices 168A, 168B. Furthermore, the first top end 198 and the second top end 200 may cooperate to define an inlet 268 shaped to receive differently sized portable electronic devices 168A, 168B within the storage volume 266. For example, the inlet 288 may be sized to be capable of receiving relatively large portable electronic devices 168B, as well as relatively small portable electronic devices 168A, within the storage volume 266. In some embodiments, the inlet 268 and/or the storage volume 266 could be sized, shaped, or otherwise configured to receive multiple portable electronic devices at the same time (not shown), one or more of which could be charged via the charging interface 162. Other configurations are contemplated.

Figure 15:
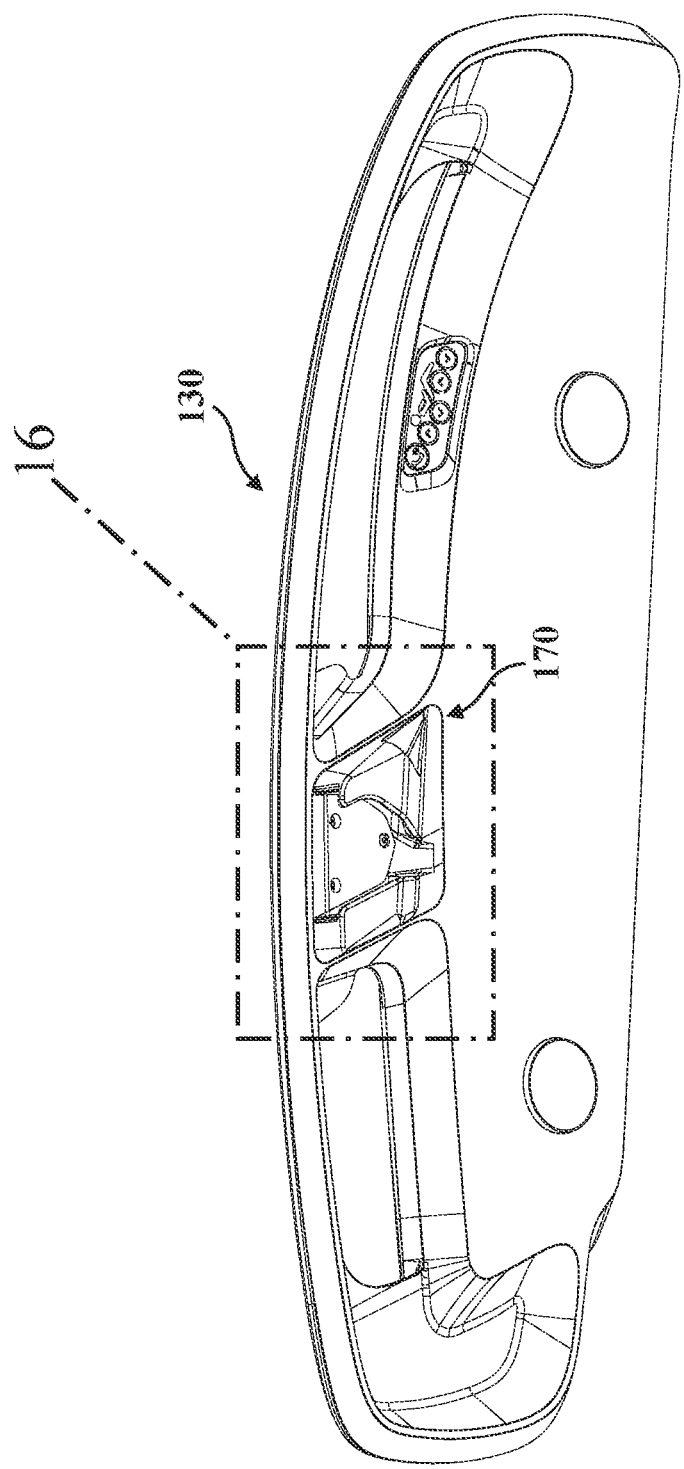
FIG. 15 is a top perspective view of the side rail and caddy of FIGS. 7-8.
Figure 16A:
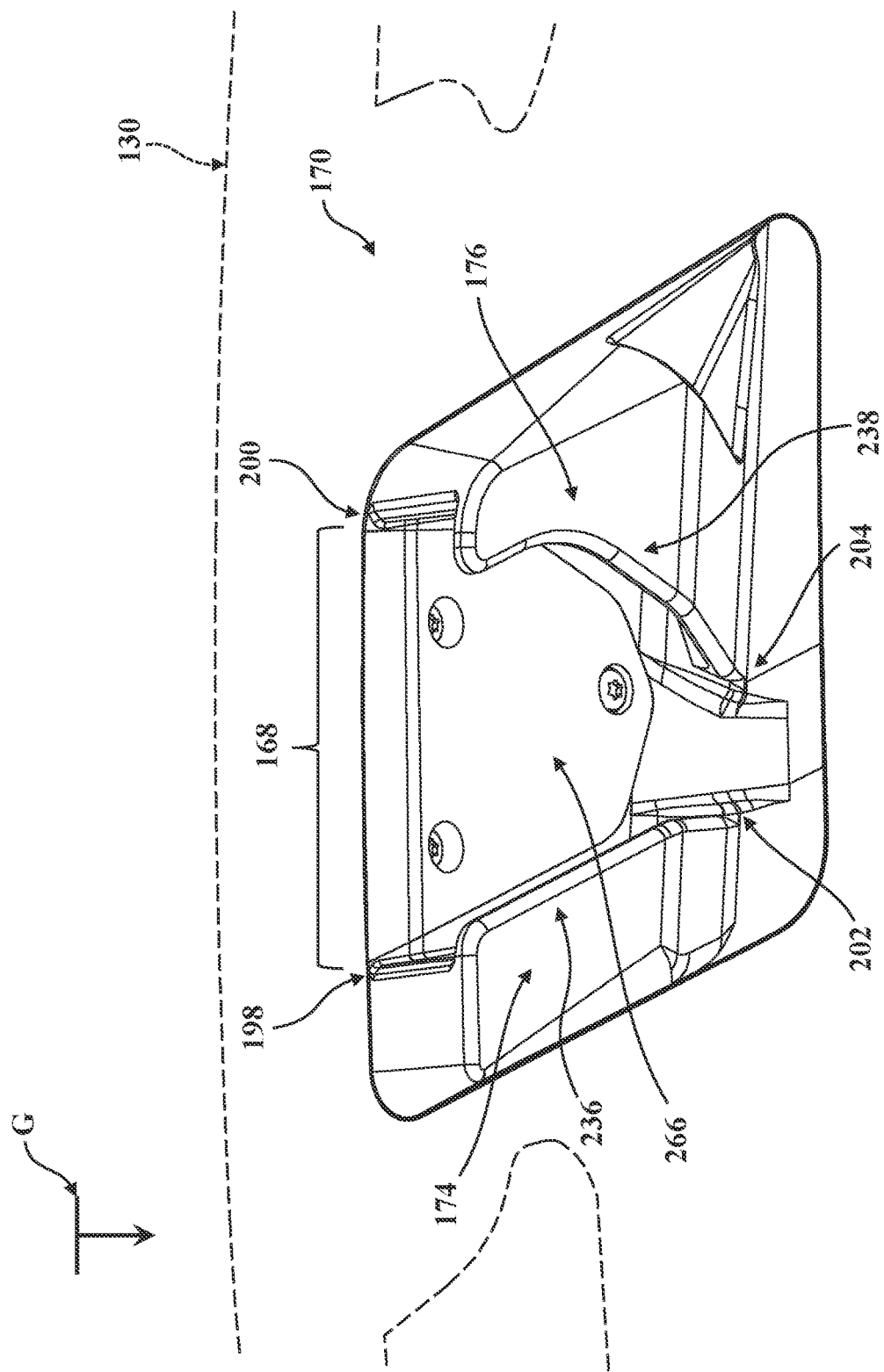
FIG. 16A is an enlarged partial perspective view taken at reference 16 in FIG. 15, arranged relative to an exemplary gravitational reference indicia with the side rail depicted in phantom for illustrative purposes, and shown with the caddy coupled to the side rail.
Figure 16B:
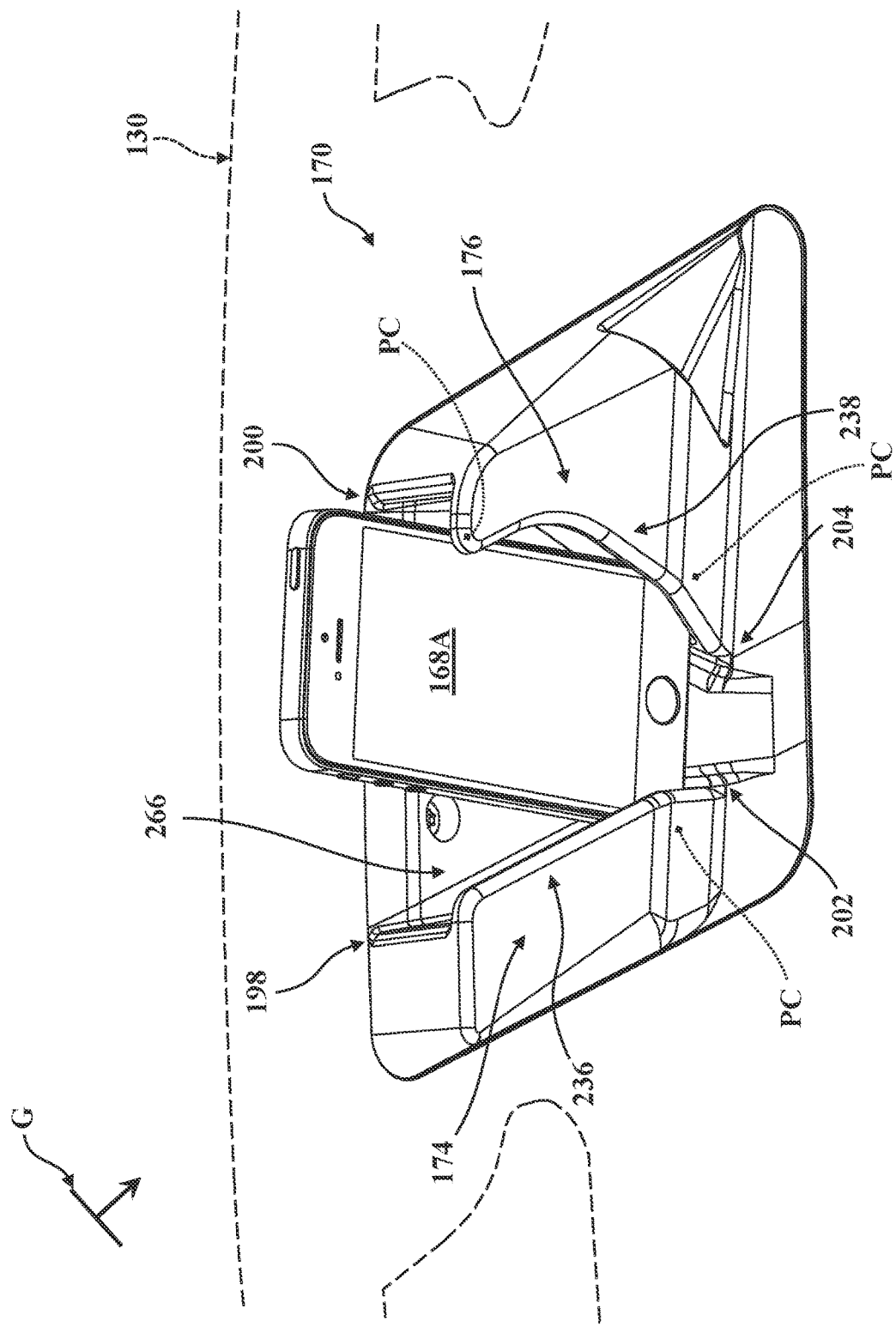
FIG. 16B is another enlarged partial perspective view of the side rail and the caddy of FIG. 16A, shown with a first type of portable electronic device retained by the caddy in an exemplary configuration effected by the arrangement of the gravitational reference indicia.
Figure 16C:
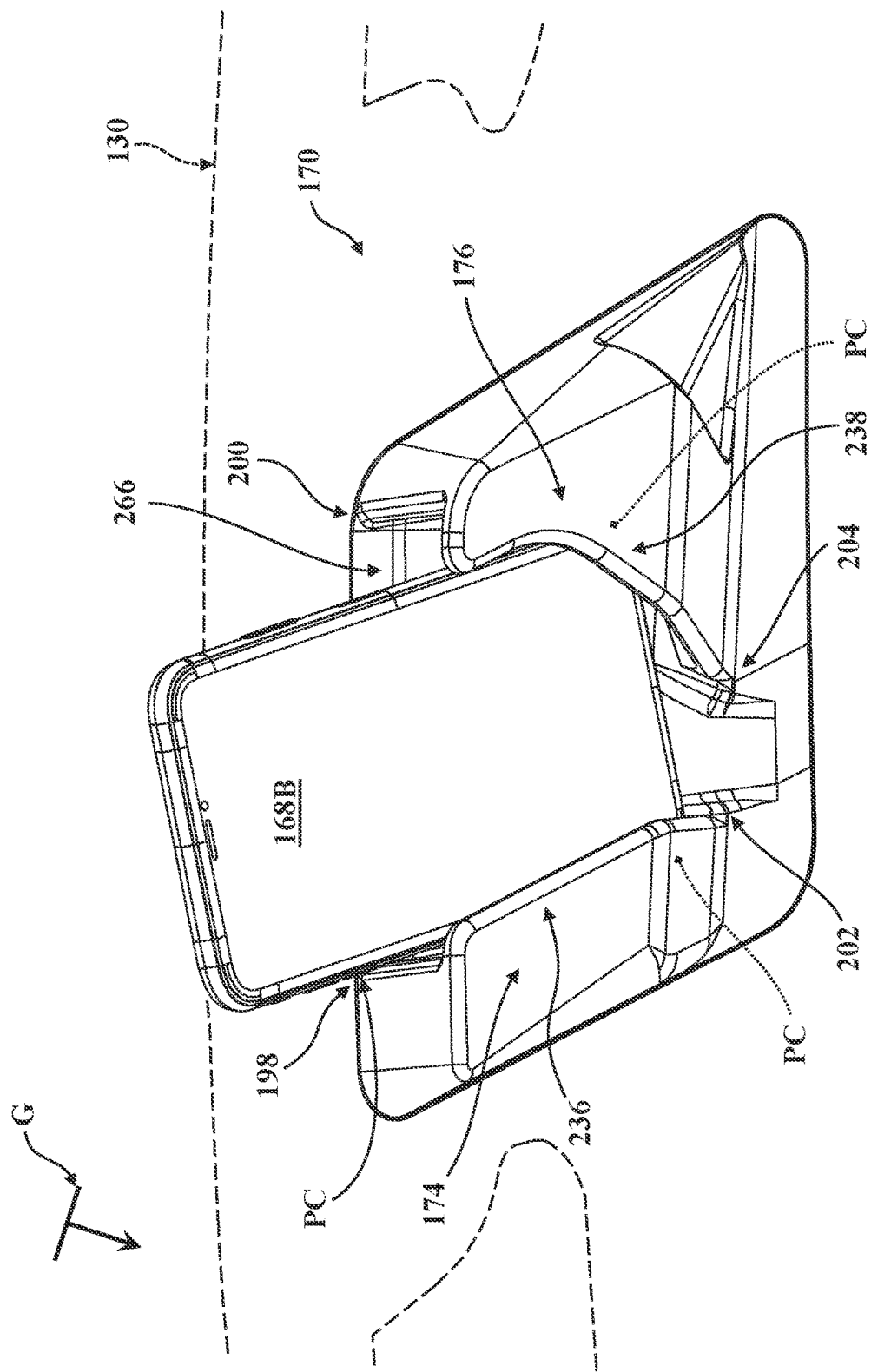
FIG. 16C is another enlarged partial perspective view of the side rail and the caddy of FIG. 16A, shown with a second type of portable electronic device retained by the caddy in an exemplary configuration effected by the arrangement of the gravitational reference indicia.

Referring now to FIGS. 15-16C, the second side rail 130 is shown from one perspective to illustrate how differently-sized portable electronic devices 168A, 168B can be retained by and engage the caddy 170 at differing points of contact PC based, for example, on the arrangement of the caddy 170 coupled to the second side rail 130 relative to gravity represented by the gravitational reference indicia G. For the purposes of clarity and consistency, certain structural features described below are not separately illustrated in FIGS. 15-16C, but can be found in other Figures (e.g., FIGS. 10-14B). In FIG. 16B, the first portable electronic device 168A is shown retained by the caddy 170, and various portions of the first and second braces 174, 176 are shown providing differing points of contact PC with the first portable electronic device 168A, such as the second top constraining face 246 of the second lip 238, and portions of the first and second bottom support regions 178, 180 (engagement not shown in detail). In FIG. 16C, the second portable electronic device 168B is shown retained by the caddy 170, and various portions of the first and second braces 174, 176 are shown providing differing points of contact PC with the second portable electronic device 168B, such as the first top constraining face 240 of the first lip 236, and portions of the first and second bottom support regions 178, 180 (engagement not shown in detail). It will be appreciated that FIGS. 16B-16C depict exemplary arrangements of differently-sized portable electronic devices 168A, 168B retained by the caddy 170 and disposed in engagement with differing points of contact PC based, for example, on differences in the size, shape, profile, and the like of the portable electronic devices 168A, 168B, as well as based on the arrangement of the caddy 170 in each view relative to gravity as represented by the gravitational reference indicia G (compare FIG. 16B with FIG. 16C).

Figure 17:
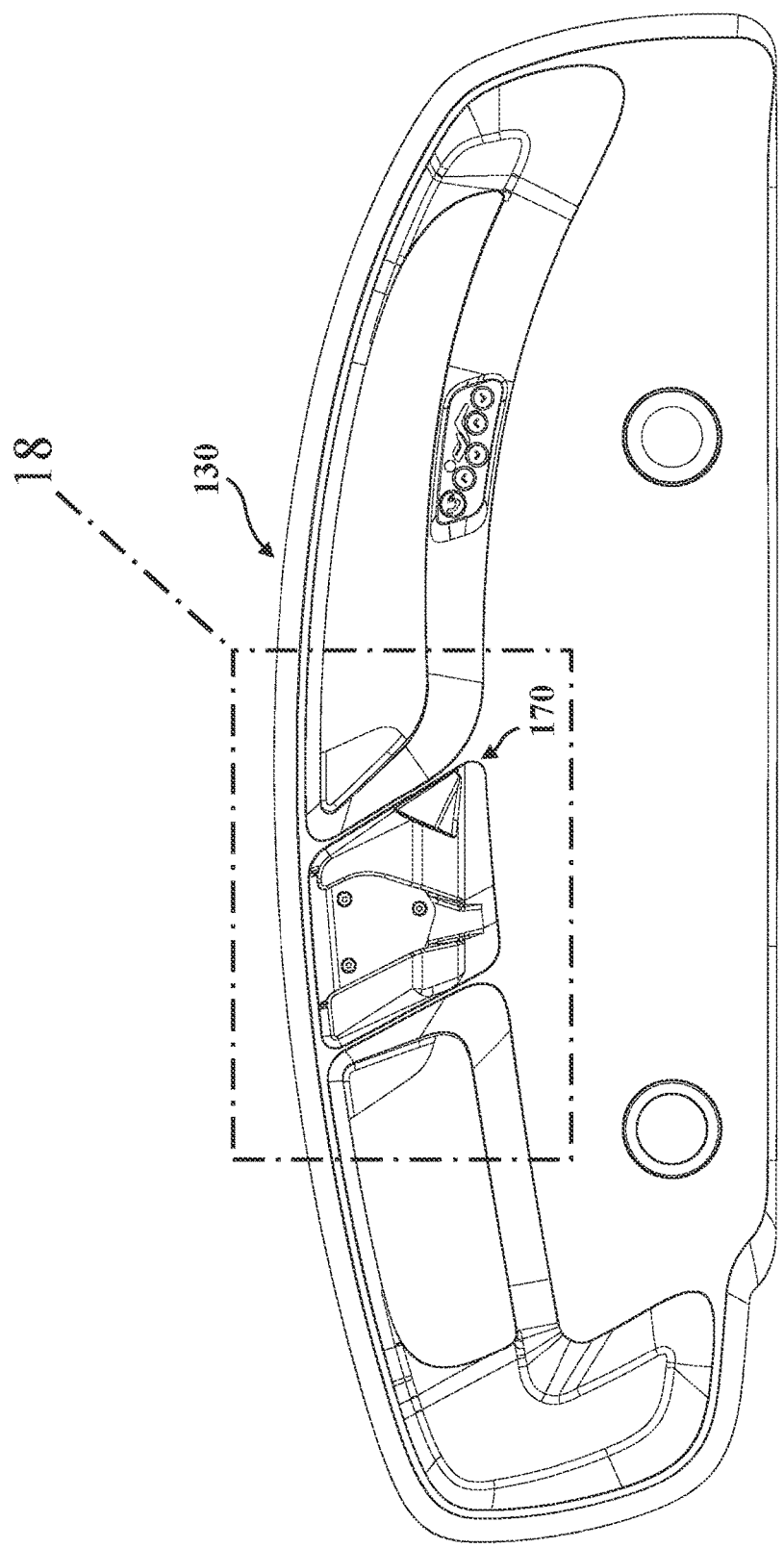
FIG. 17 is a front view of the side rail and caddy of FIGS. 7-8.
Figure 18A:
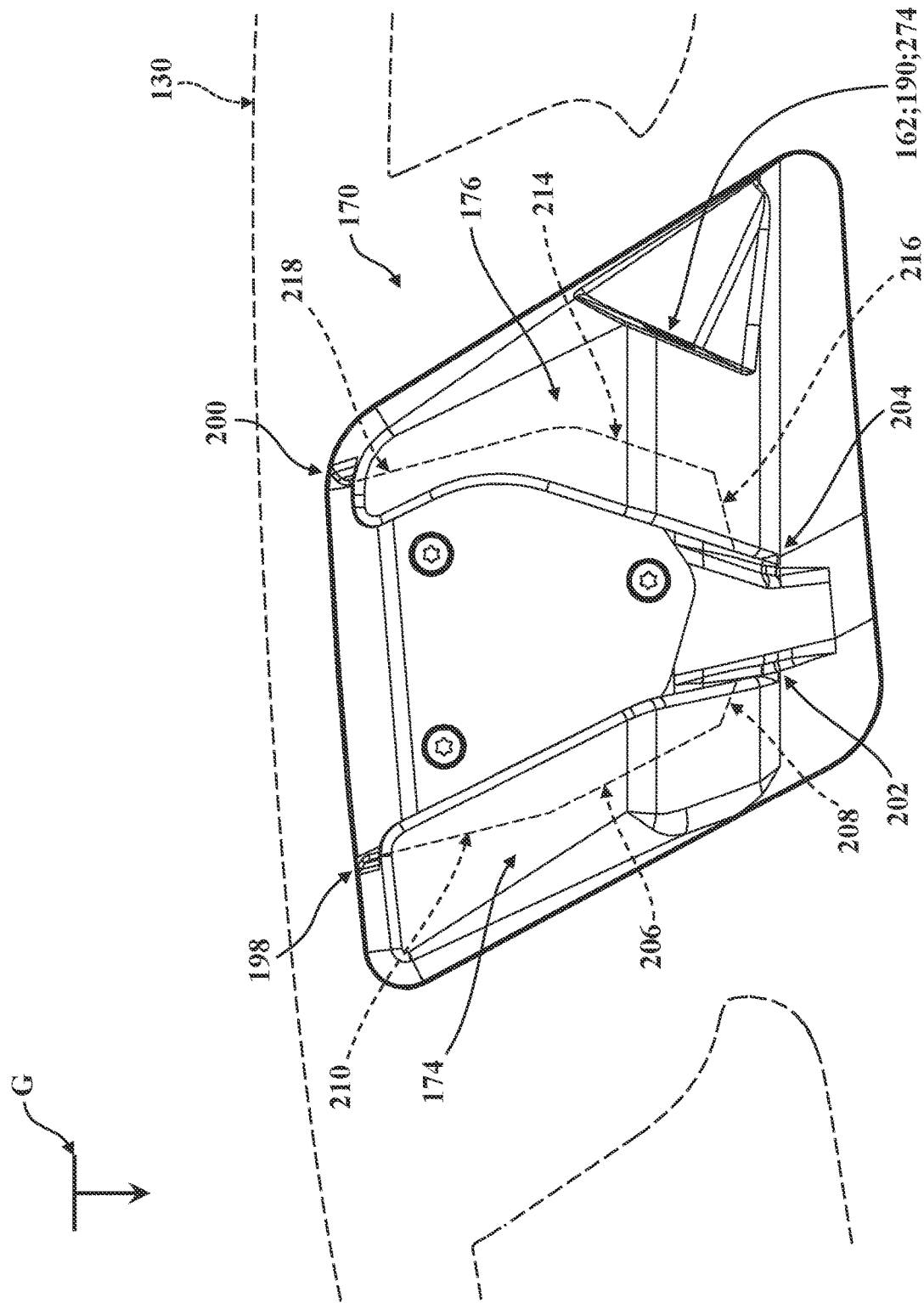
FIG. 18A is an enlarged partial front view taken at reference 18 in FIG. 17, arranged relative to an exemplary gravitational reference indicia with the side rail depicted in phantom for illustrative purposes, and shown with the caddy coupled to the side rail.
Figure 18B:
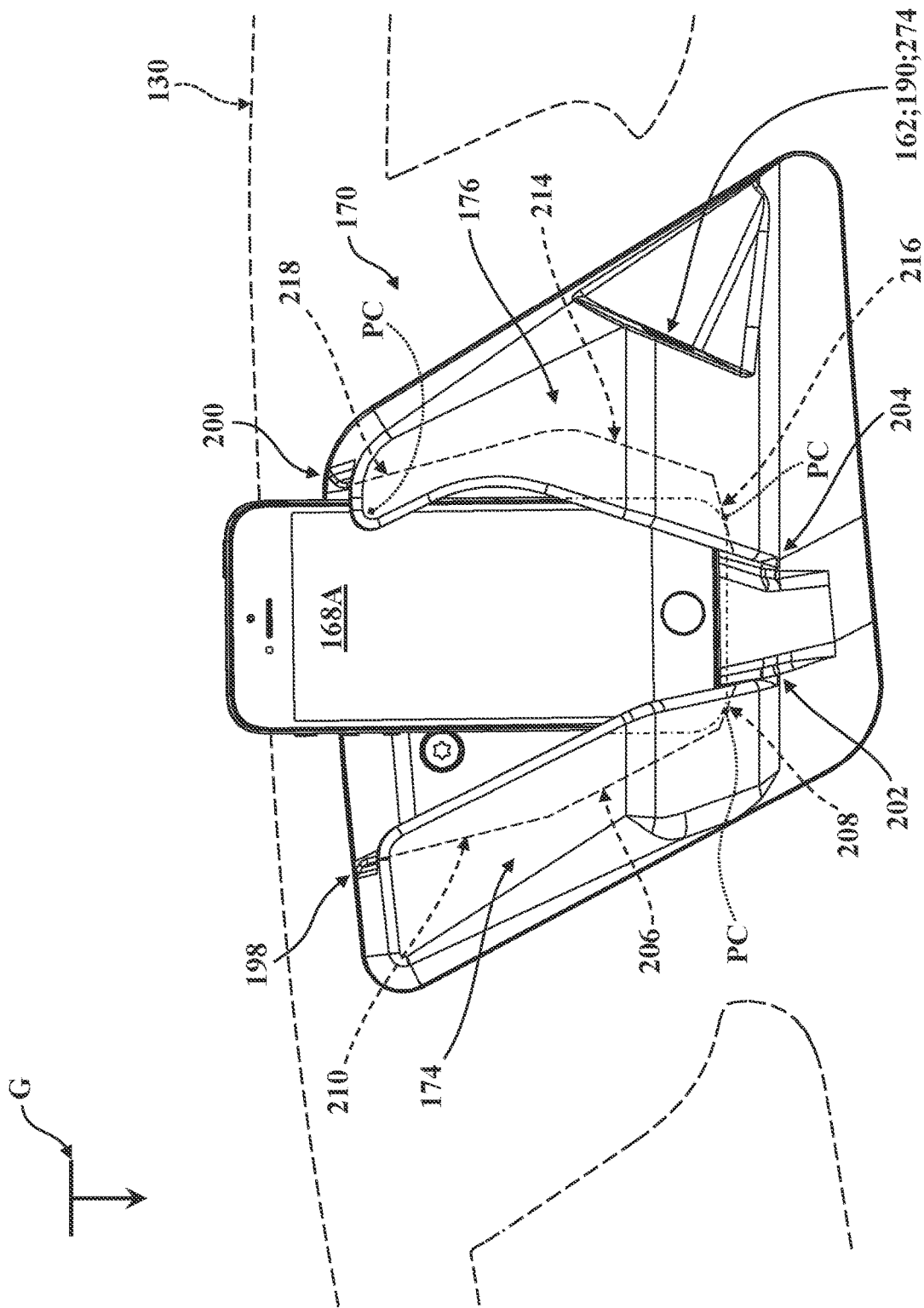
FIG. 18B is another enlarged partial front view of the side rail and the caddy of FIG. 18A, shown with a first type of portable electronic device retained by the caddy in an exemplary configuration effected by the arrangement of the gravitational reference indicia.
Figure 18C:
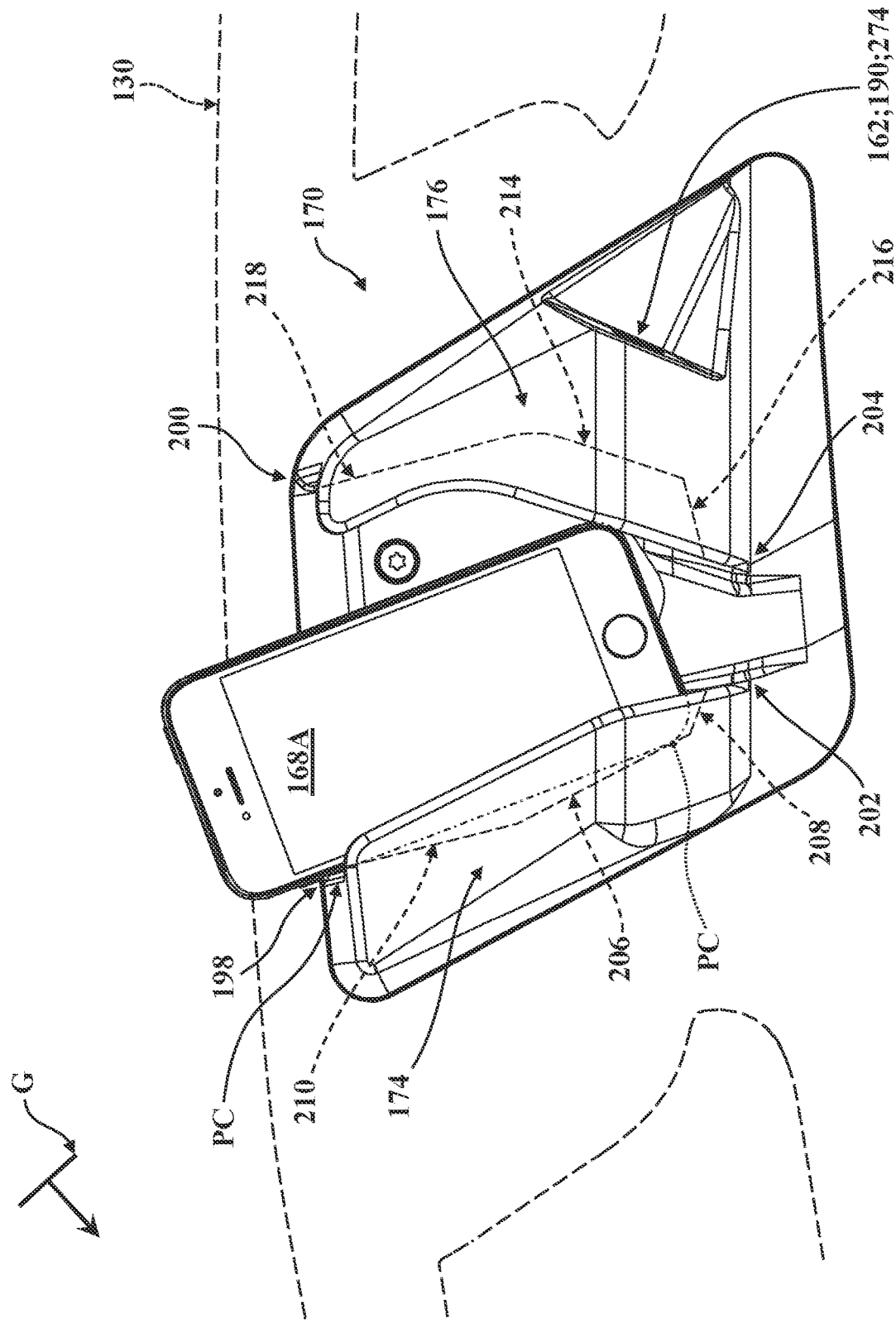
FIG. 18C is another enlarged partial front view of the side rail, the caddy, and the first type of portable electronic device of FIG. 18B, shown with the first type of portable electronic device retained by the caddy in a different exemplary configuration effected by the arrangement of the gravitational reference indicia.
Figure 18E:
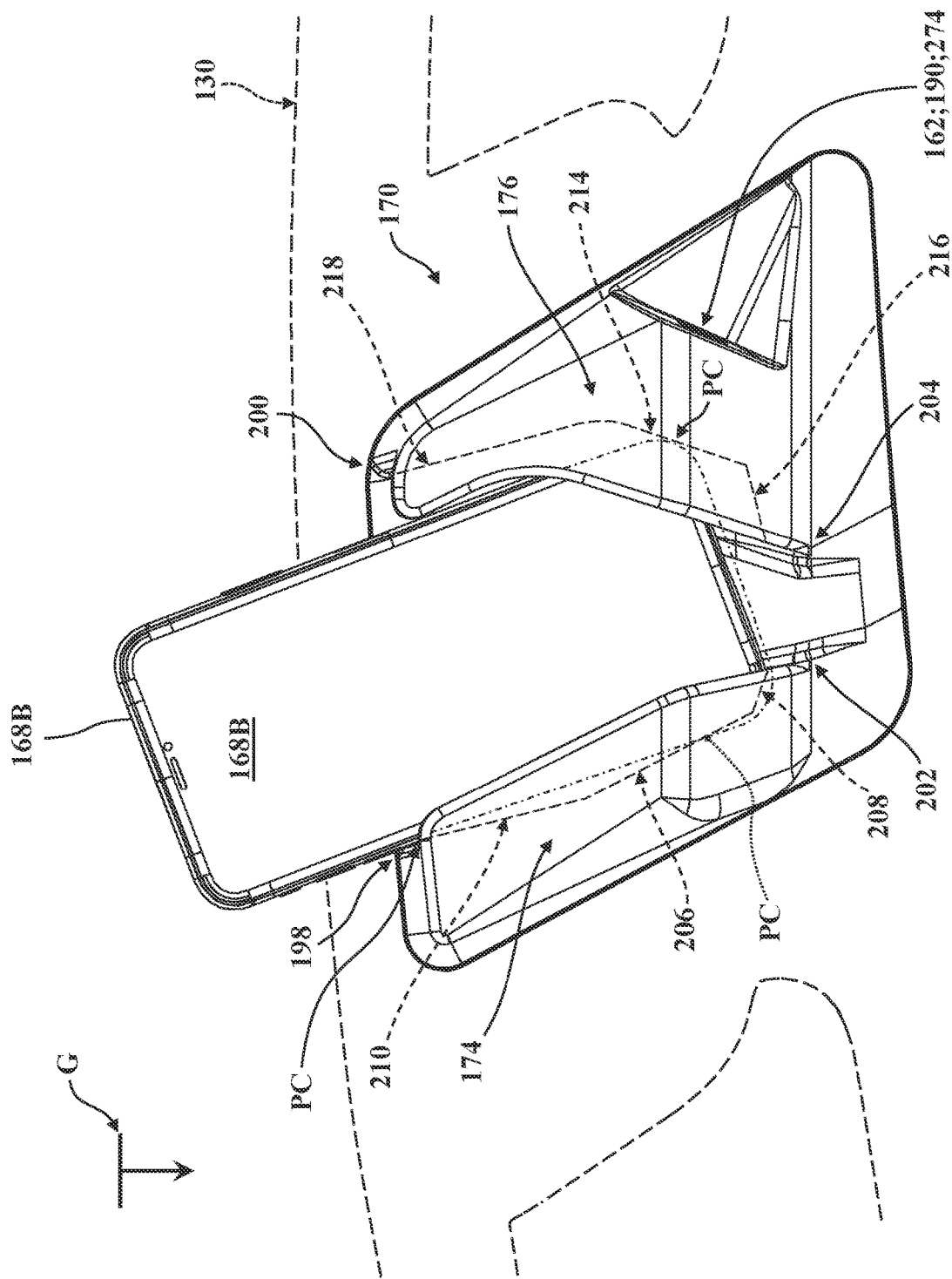
FIG. 18E is another enlarged partial perspective view of the side rail and the caddy of FIG. 18A, shown with a second type of portable electronic device retained by the caddy in an exemplary configuration effected by the arrangement of the gravitational reference indicia.
Figure 18F:
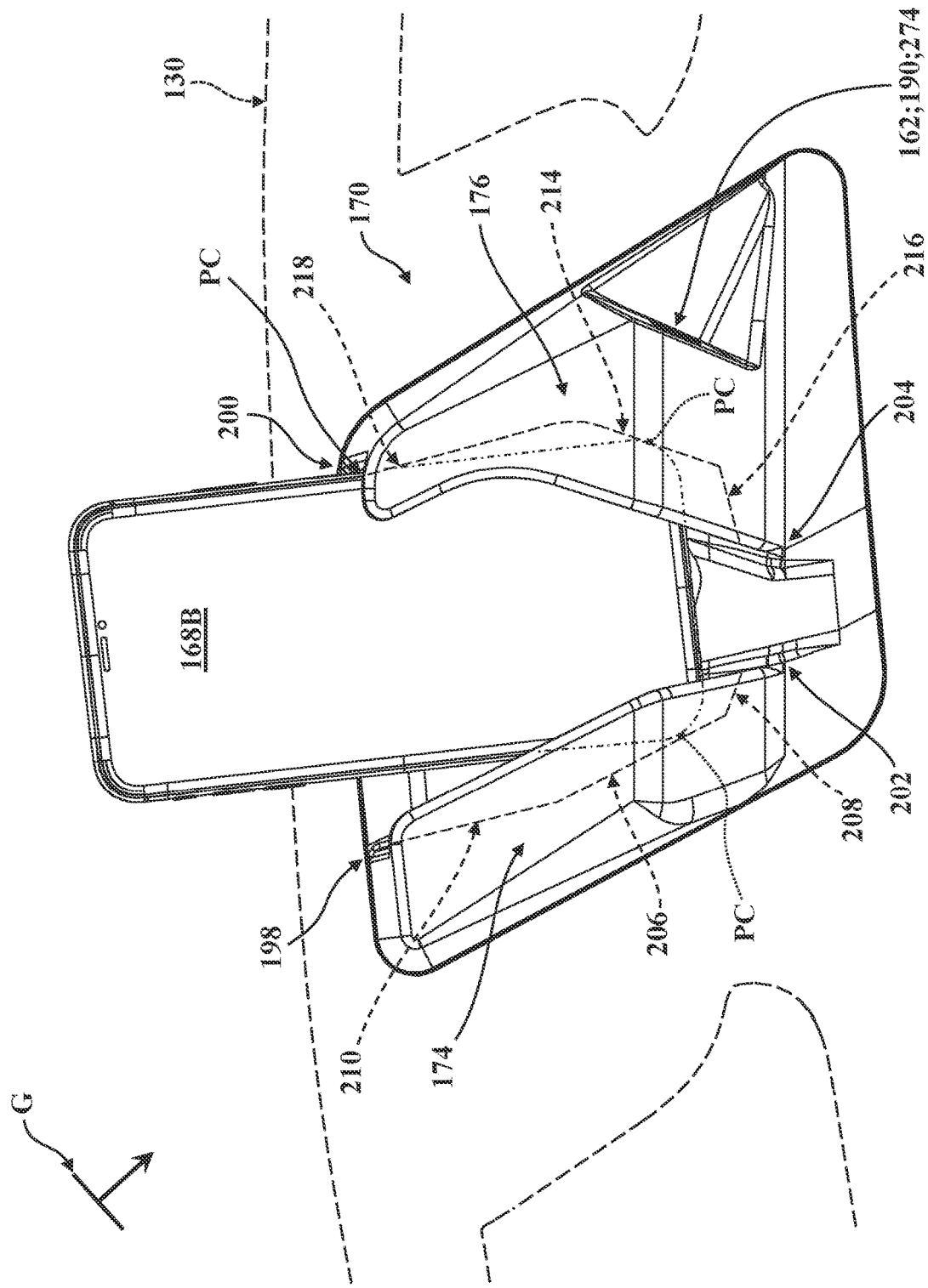
FIG. 18F is another enlarged partial front view of the side rail, the caddy, and the second type of portable electronic device of FIG. 18E, shown with the second type of portable electronic device retained by the caddy in a different exemplary configuration effected by the arrangement of the gravitational reference indicia.
Figure 18G:
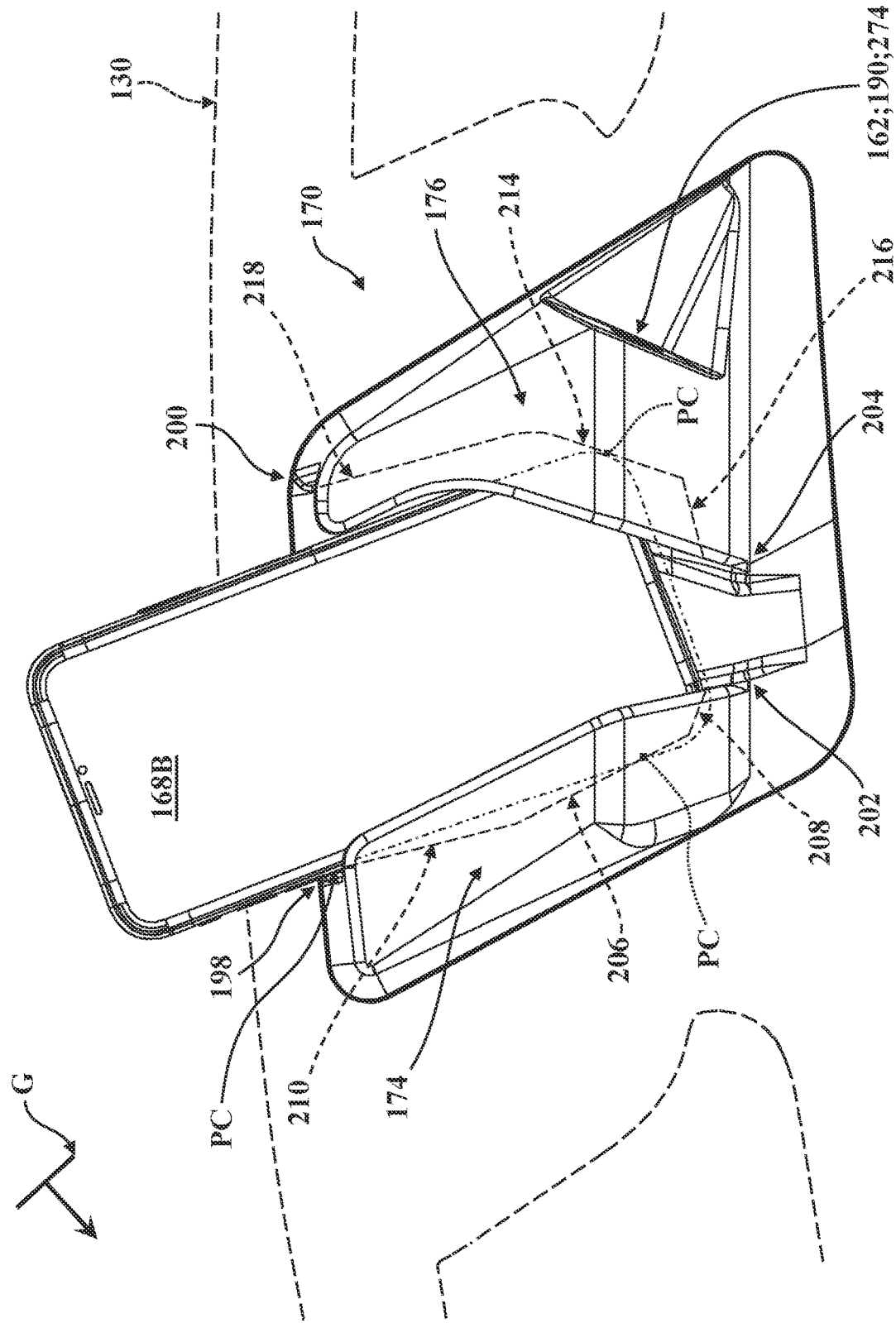
FIG. 18G is another enlarged partial front view of the side rail, the caddy, and the second type of portable electronic device of FIGS. 18E-18F, shown with the second type of portable electronic device retained by the caddy in another different exemplary configuration effected by the arrangement of the gravitational reference indicia.

Referring now to FIGS. 17-18G, the second side rail 130 is shown from another perspective to illustrate how differently-sized portable electronic devices 168A, 168B can be retained by and engage the caddy 170 at differing points of contact PC based, for example, on the arrangement of the caddy 170 coupled to the second side rail 130 relative to gravity represented by the gravitational reference indicia G. For the purposes of clarity and consistency, certain structural features described below are not separately illustrated in FIGS. 17-18G, but can be found in other Figures (e.g., FIGS. 10-14B). In FIG. 18B, the first portable electronic device 168A is shown retained by the caddy 170, and various portions of the first and second braces 174, 176 are shown providing differing points of contact PC with the first portable electronic device 168A, such as the second top constraining face 246 of the second lip 238, and portions of the first and second bottom support regions 178, 180. More specifically, in the arrangement depicted in FIG. 18B, the first portable electronic device 168A is seated into the first and second lower support faces 208, 216 of the first and second braces 174, 176, each of which generally provides two points of contact PC based on the conical profile described above in connection with FIGS. 14A-14B. In FIG. 18C, the second side rail 130 has moved relative to gravity from the arrangement depicted in FIG. 18B (compare gravitational reference indicia G in FIGS. 18B-18C). Here, the first portable electronic device 168A is now shown in engagement with other portions of the first brace 174, such as at points of contact PC provided by the first top support face 210 and the first middle support face 206. In FIG. 18D, the arrangement of the second side rail 130 has change again relative to gravity, as represented by the gravitational reference indicia G. Here in FIG. 18D, the first portable electronic device 168A is disposed in engagement with the second lower support face 216 and the second top support face 218.

In FIG. 18E, the second portable electronic device 168B is shown retained by the caddy 170, and various portions of the first and second braces 174, 176 are shown providing differing points of contact PC with the second portable electronic device 168B, such as the first top support face 210, the first middle support face 206, and the second middle support face 214. Here too in FIG. 18E, the second portable electronic device 168B is seated into the first lower support face 208 of the first brace 174, which generally provides two points of contact PC based on the conical profile described above in connection with FIG. 14A. In FIG. 18F, the second side rail 130 has moved relative to gravity from the arrangement depicted in FIG. 18E (compare gravitational reference indicia G in FIGS. 18E-18F). Here, the second portable electronic device 168B is now shown in engagement with other portions of the first and second braces 174, 176 such as at points of contact PC provided by the first middle support face 206, the second middle support face 214, and the second top support face 218. In FIG. 18G, the arrangement of the second side rail 130 has change again relative to gravity, as represented by the gravitational reference indicia G. Here in FIG. 18G, the second portable electronic device 168B is arranged similarly to as depicted in FIG. 18E, despite the change in the arrangement of the second side rail 130 (compare gravitational reference indicia G in FIGS. 18E and 18G). It will be appreciated that FIGS. 18B-18G depict exemplary arrangements of differently-sized portable electronic devices 168A, 168B retained by the caddy 170 and disposed in engagement with differing points of contact PC based, for example, on differences in the size, shape, profile, and the like of the portable electronic devices 168A, 168B, as well as based on the arrangement of the caddy 170 in each view relative to gravity as represented by the gravitational reference indicia G.

Figure 19:
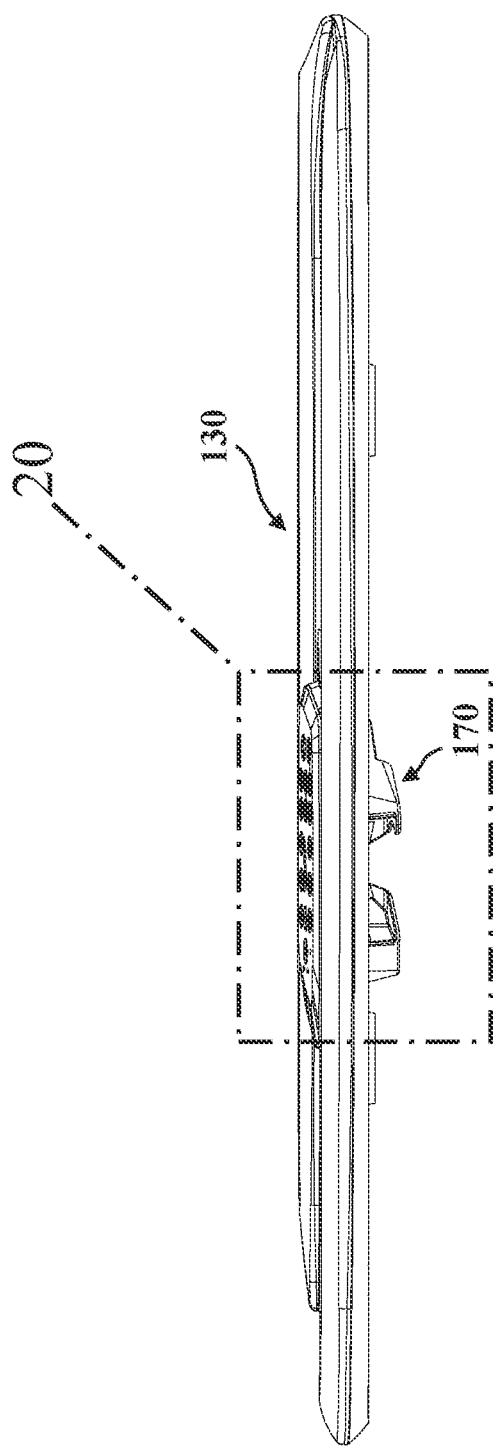
FIG. 19 is a top perspective view of the side rail and caddy of FIGS. 7-8.
Figure 20A:
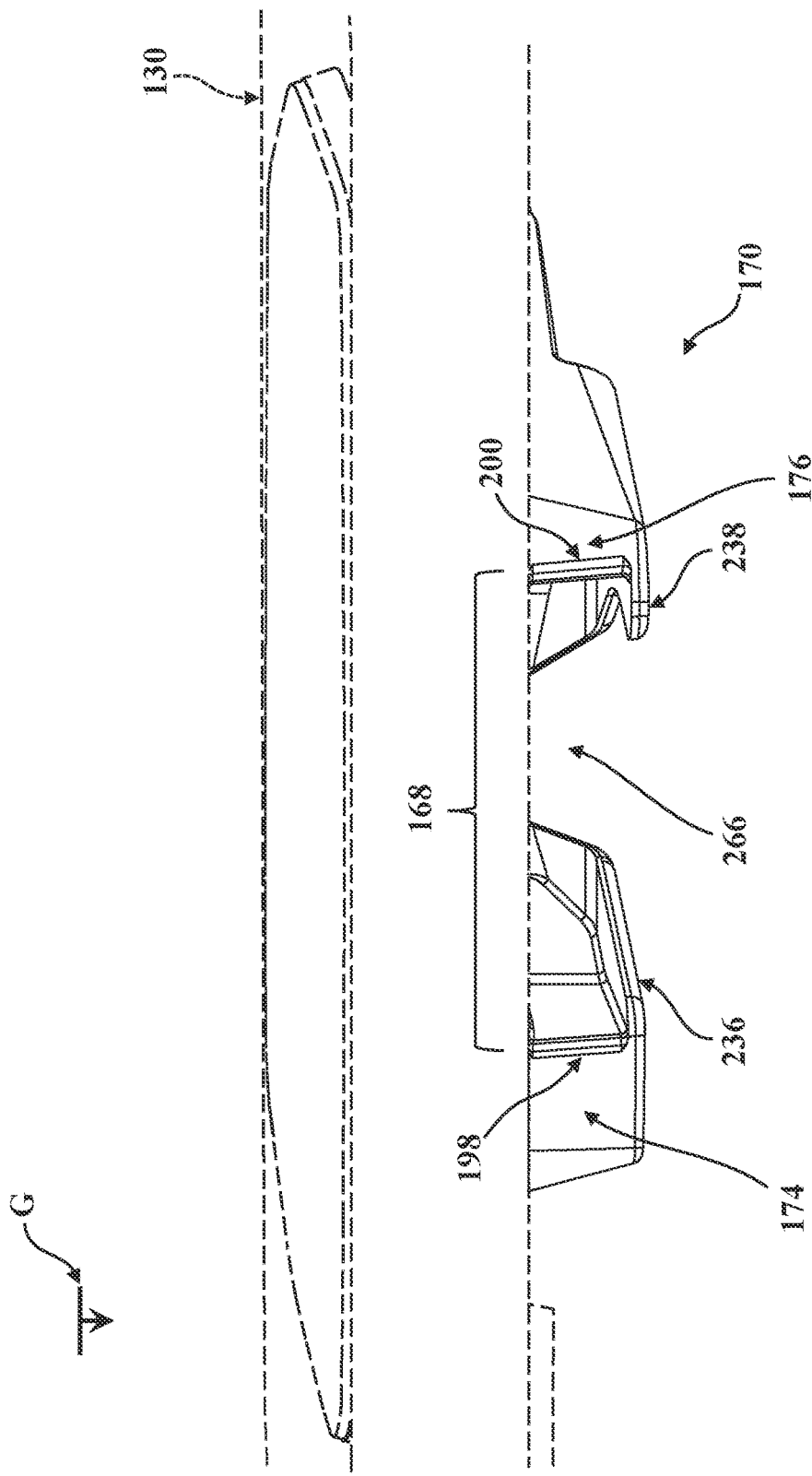
FIG. 20A is an enlarged partial top perspective view taken at reference 20 in FIG. 19, arranged relative to an exemplary gravitational reference indicia with the side rail depicted in phantom for illustrative purposes, and shown with the caddy coupled to the side rail.
Figure 20B:
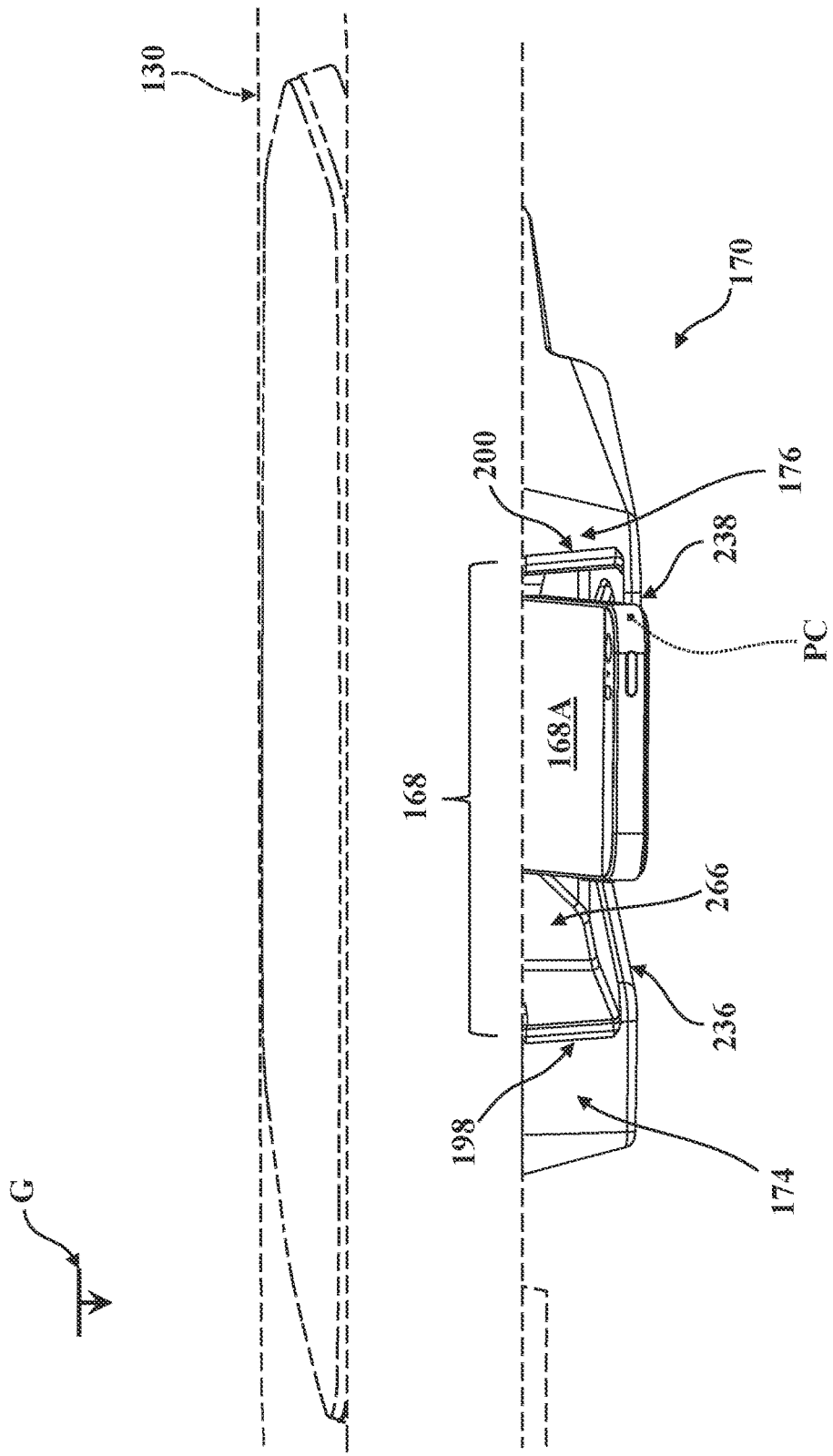
FIG. 20B is another enlarged partial top perspective view of the side rail and the caddy of FIG. 20A, shown with a first type of portable electronic device retained by the caddy in an exemplary configuration effected by the arrangement of the gravitational reference indicia.

Referring now to FIGS. 19-20C, the second side rail 130 is shown from yet another perspective to further illustrate how differently-sized portable electronic devices 168A, 168B can be retained by and engage the caddy 170 at differing points of contact PC based, for example, on the arrangement of the caddy 170 coupled to the second side rail 130 relative to gravity represented by the gravitational reference indicia G. For the purposes of clarity and consistency, certain structural features described below are not separately illustrated in FIGS. 19-20C, but can be found in other Figures (e.g., FIGS. 10-14B). In FIG. 20B, the first portable electronic device 168A is shown retained by the caddy 170, and various portions of the first and second braces 174, 176 are shown providing differing points of contact PC with the first portable electronic device 168A, such as the second top constraining face 246 of the second lip 238. In FIG. 20C, the second portable electronic device 168B is shown retained by the caddy 170, and various portions of the first and second braces 174, 176 are shown providing differing points of contact PC with the second portable electronic device 168B, such as the second top constraining face 246 of the second lip 238. It will be appreciated that FIGS. 20B-20C depict exemplary arrangements of differently-sized portable electronic devices 168A, 168B retained by the caddy 170 and disposed in engagement with differing points of contact PC based, for example, on differences in the size, shape, profile, and the like of the portable electronic devices 168A, 168B, as well as based on the arrangement of the caddy 170 in each view relative to gravity as represented by the gravitational reference indicia G.

Figure 21:
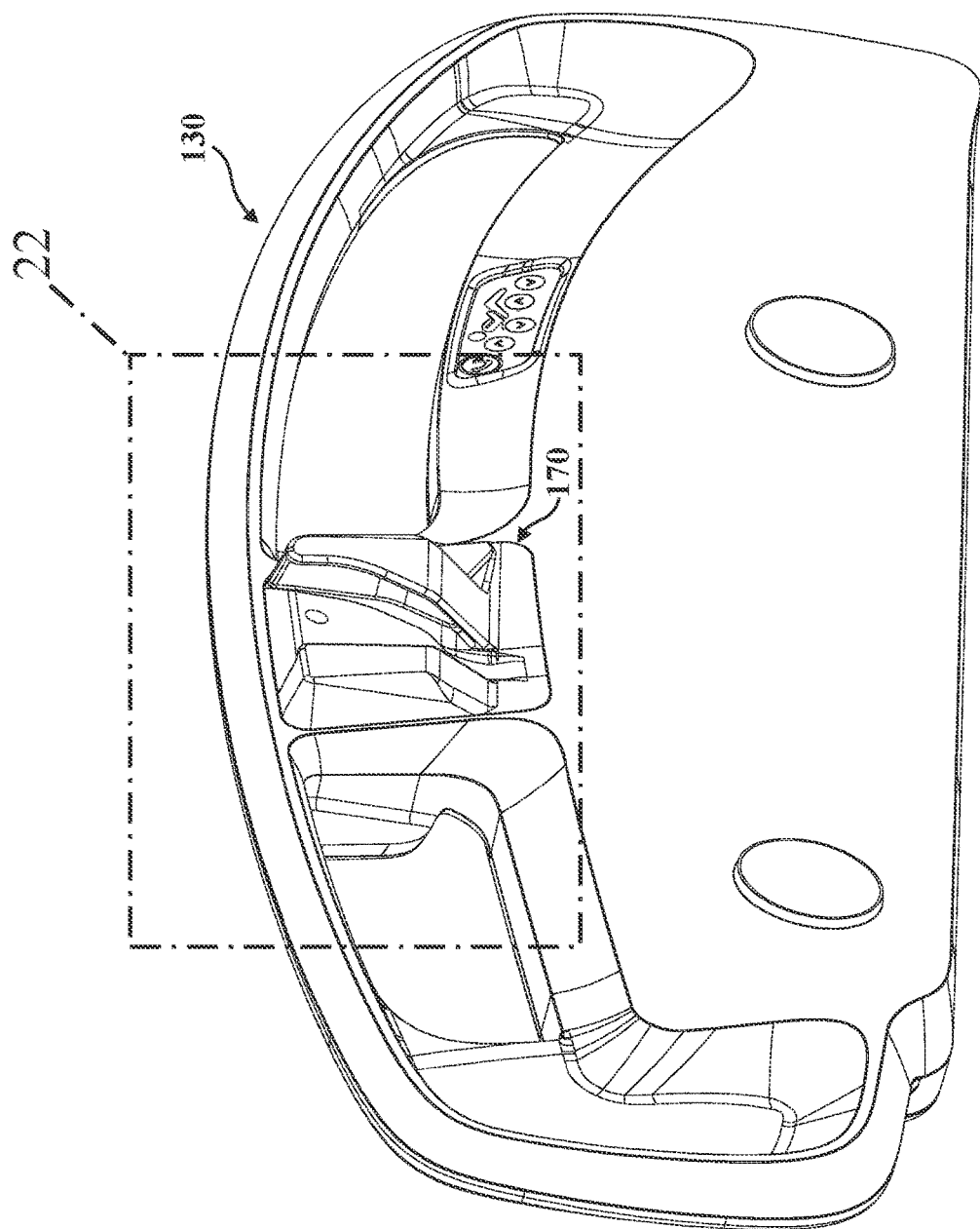
FIG. 21 is a left perspective view of the side rail and caddy of FIGS. 7-8.
Figure 22A:
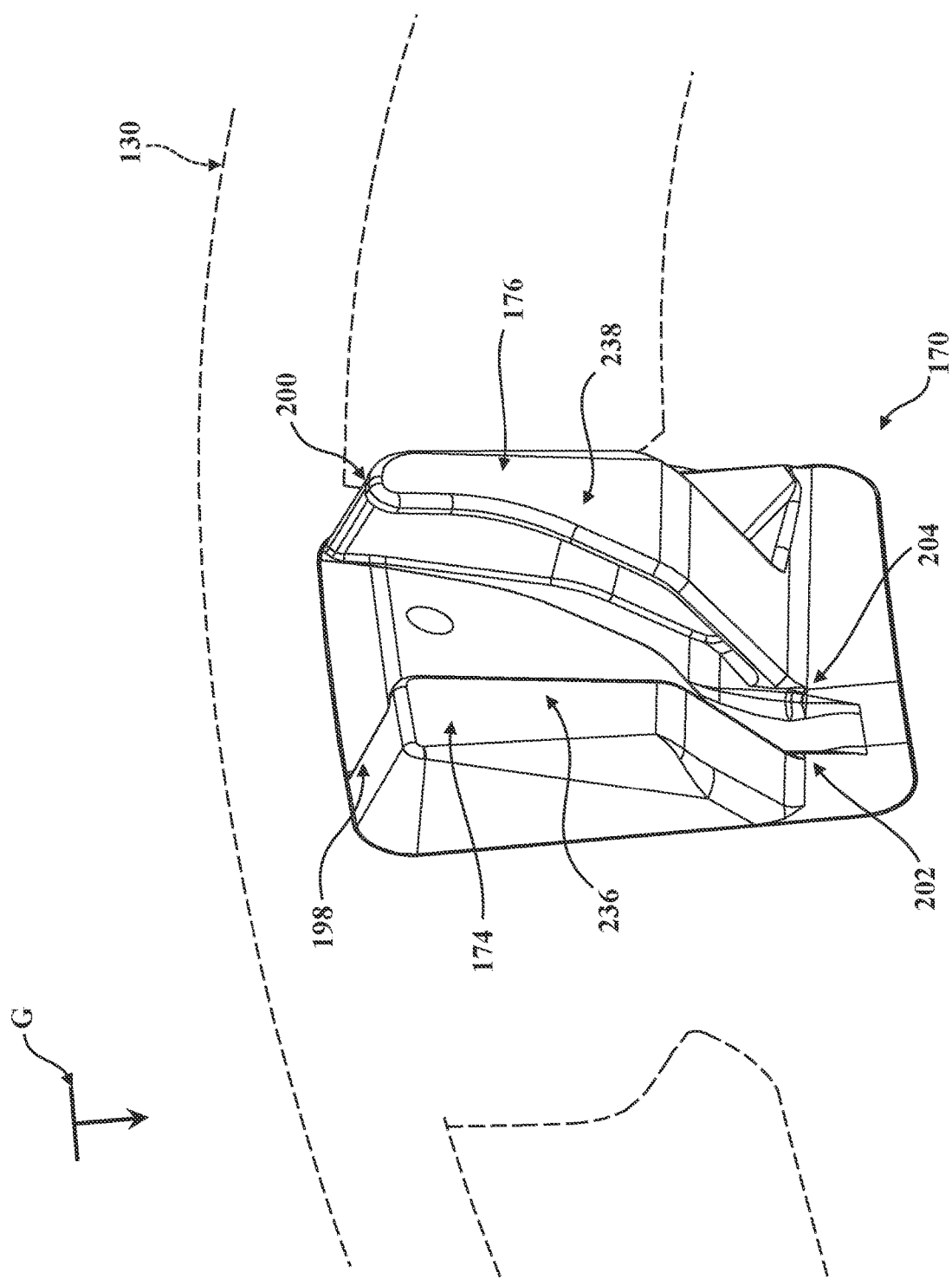
FIG. 22A is an enlarged partial left perspective view taken at reference 22 in FIG. 21, arranged relative to an exemplary gravitational reference indicia with the side rail depicted in phantom for illustrative purposes, and shown with the caddy coupled to the side rail.
Figure 22B:
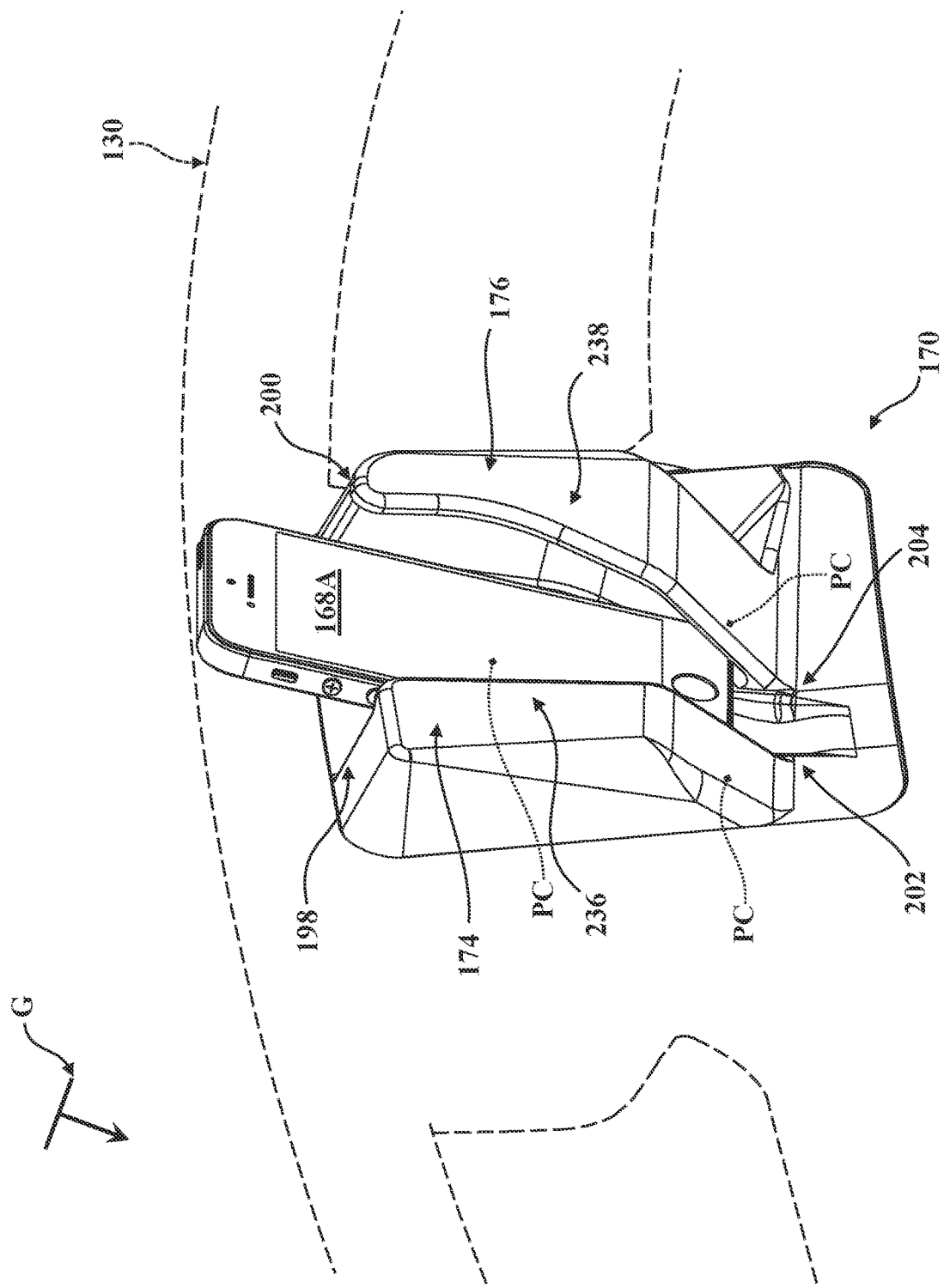
FIG. 22B is another enlarged partial left perspective view of the side rail and the caddy of FIG. 22A, shown with a first type of portable electronic device retained by the caddy in an exemplary configuration effected by the arrangement of the gravitational reference indicia.
Figure 22C:
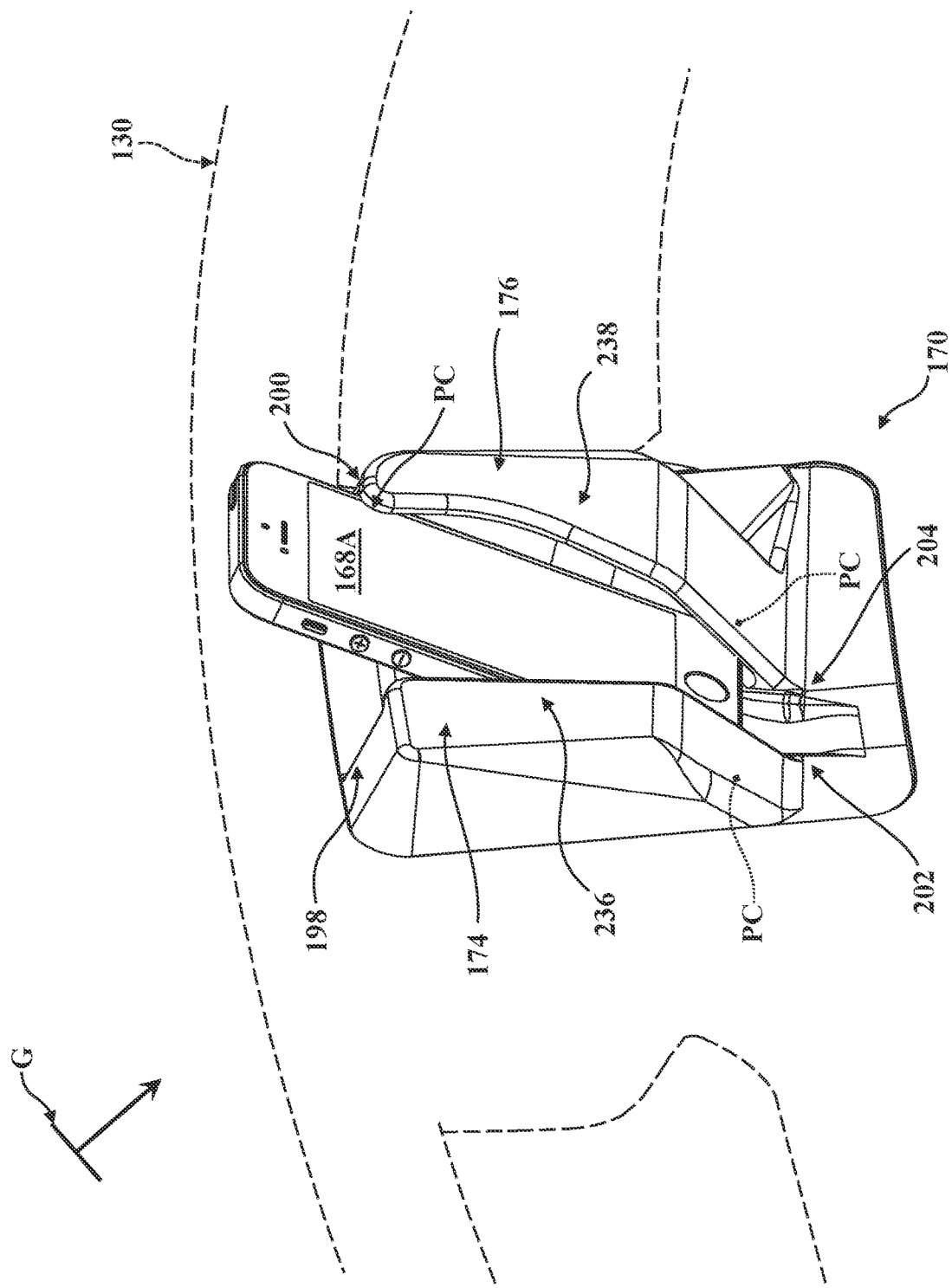
FIG. 22C is another enlarged partial left perspective view of the side rail, the caddy, and the first type of portable electronic device of FIG. 22B, shown with the first type of portable electronic device retained by the caddy in a different exemplary configuration effected by the arrangement of the gravitational reference indicia.
Figure 22D:
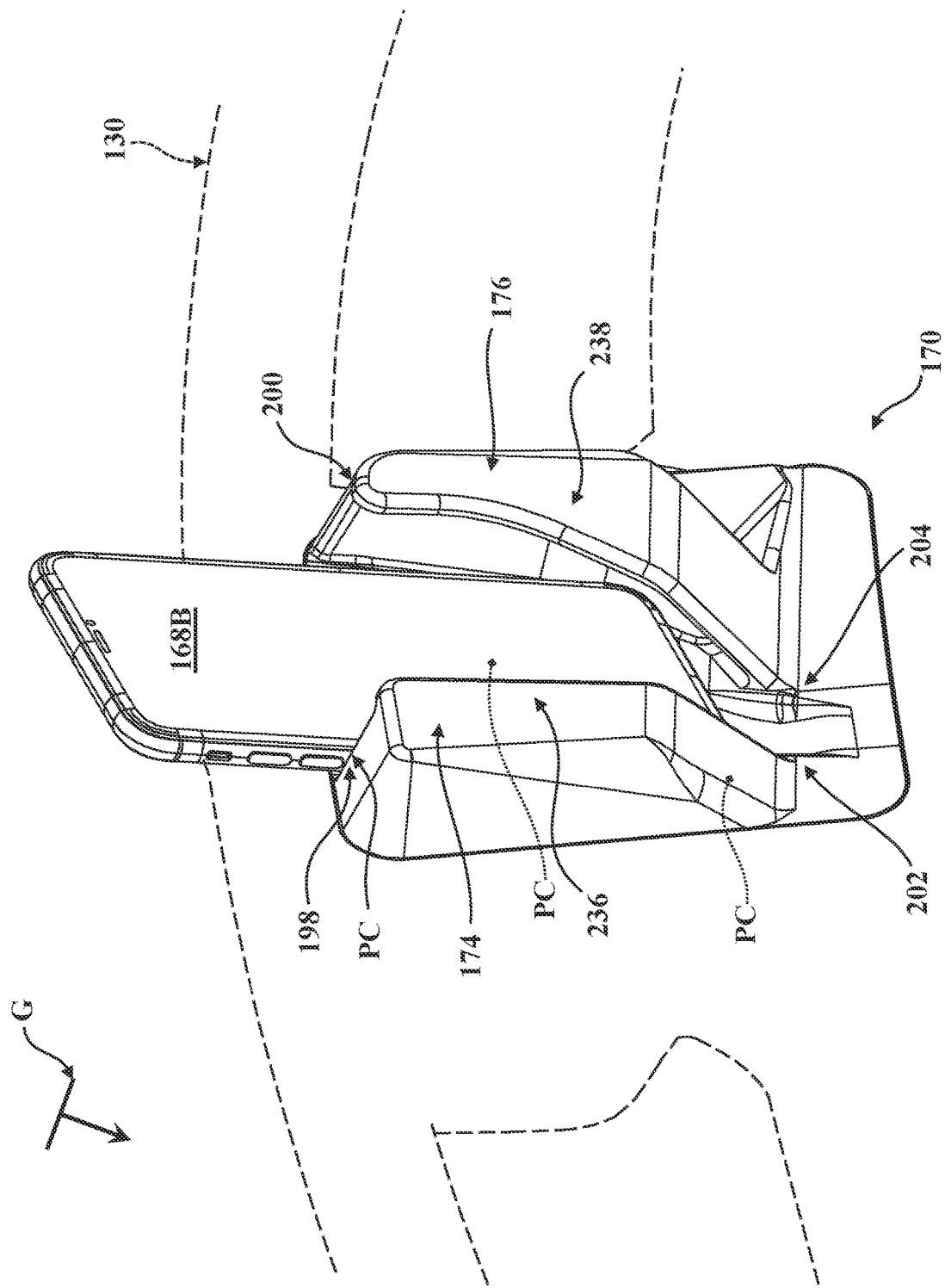
FIG. 22D is another enlarged partial left perspective view of the side rail and the caddy of FIG. 22A, shown with a second type of portable electronic device retained by the caddy in an exemplary configuration effected by the arrangement of the gravitational reference indicia.
Figure 22E:
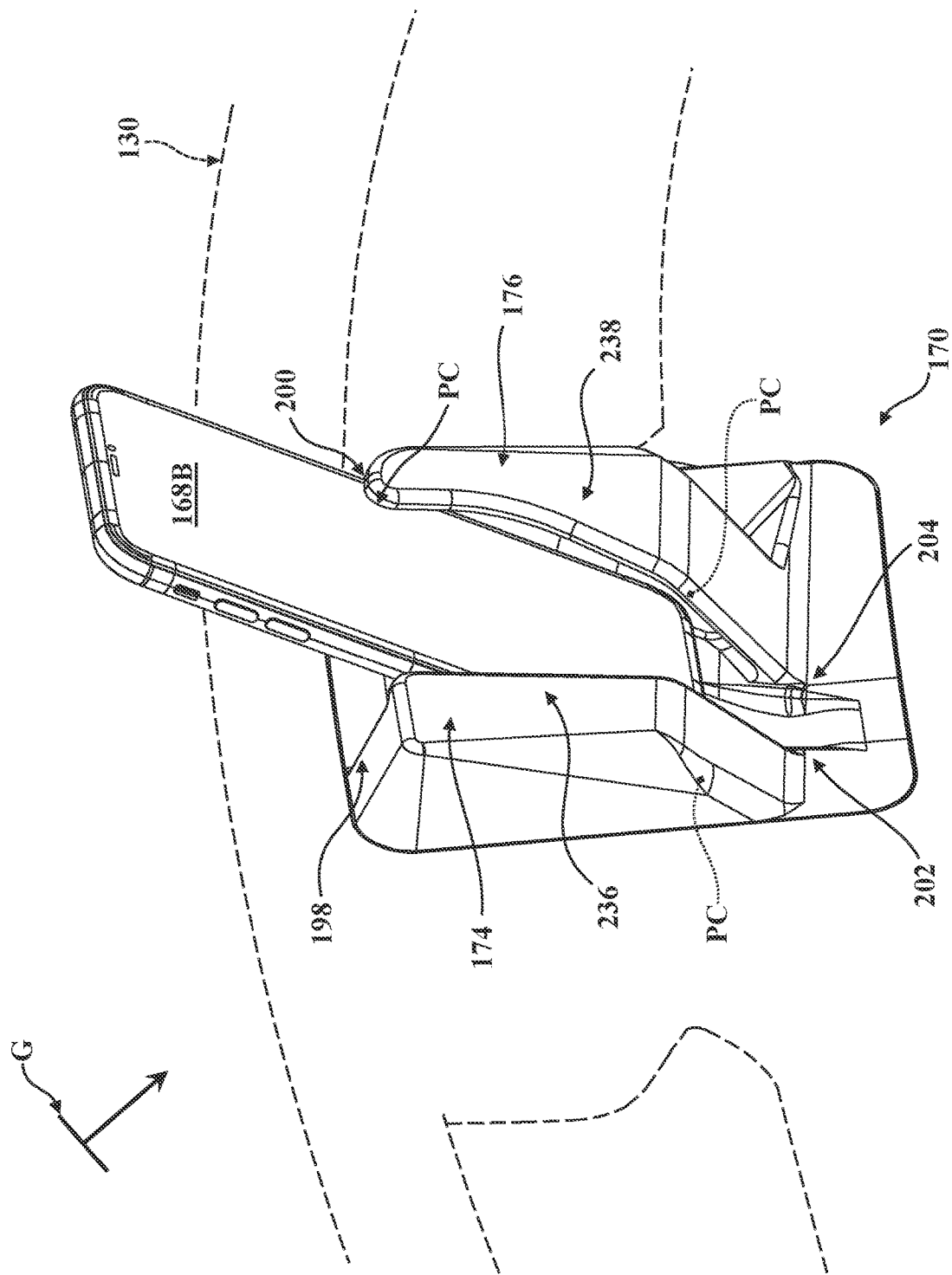
FIG. 22E is another enlarged partial left perspective view of the side rail, the caddy, and the second type of portable electronic device of FIG. 22D, shown with the second type of portable electronic device retained by the caddy in a different exemplary configuration effected by the arrangement of the gravitational reference indicia.

Referring now to FIGS. 21-22E, the second side rail 130 is shown from yet another perspective to illustrate how differently-sized portable electronic devices 168A, 168B can be retained by and engage the caddy 170 at differing points of contact PC based, for example, on the arrangement of the caddy 170 coupled to the second side rail 130 relative to gravity represented by the gravitational reference indicia G. For the purposes of clarity and consistency, certain structural features described below are not separately illustrated in FIGS. 21-22E, but can be found in other Figures (e.g., FIGS. 10-14B). In FIG. 22B, the first portable electronic device 168A is shown retained by the caddy 170, and various portions of the first and second braces 174, 176 are shown providing differing points of contact PC with the first portable electronic device 168A, such as portions of the first and second bottom support regions 178, 180. Here, the arrangement of gravity represented by the gravitational reference indicia G is such that one or more portions of the back 172 of the caddy 170 (e.g., the back surface 222) also provides differing points of contact PC with the first portable electronic device 168A. In FIG. 22C, the arrangement of the second side rail 130 has changed (compare the gravitational reference indicia G in FIGS. 22B-22C) such that the first portable electronic device 168A is retained differently, with a portion of the second top constraining face 246 of the second lip 238 providing a point of contact PC.

In FIG. 22D, the second portable electronic device 168B is shown retained by the caddy 170, and various portions of the first and second braces 174, 176 are shown providing differing points of contact PC with the second portable electronic device 168B, such as portions of the first and second bottom support regions 178, 180. Here, too the arrangement of gravity represented by the gravitational reference indicia G is such that one or more portions of the back 172 of the caddy 170 (e.g., the back surface 222) also provides differing points of contact PC with the second portable electronic device 168B. In FIG. 22E, the arrangement of the second side rail 130 has changed (compare the gravitational reference indicia G in FIGS. 22D-22E) such that the second portable electronic device 168B is retained differently, with a portion of the second top constraining face 246 of the second lip 238 providing a point of contact PC. It will be appreciated that FIGS. 22B-22E depict exemplary arrangements of differently-sized portable electronic devices 168A, 168B retained by the caddy 170 and disposed in engagement with differing points of contact PC based, for example, on differences in the size, shape, profile, and the like of the portable electronic devices 168A, 168B, as well as based on the arrangement of the caddy 170 in each view relative to gravity as represented by the gravitational reference indicia G.

Figure 23:
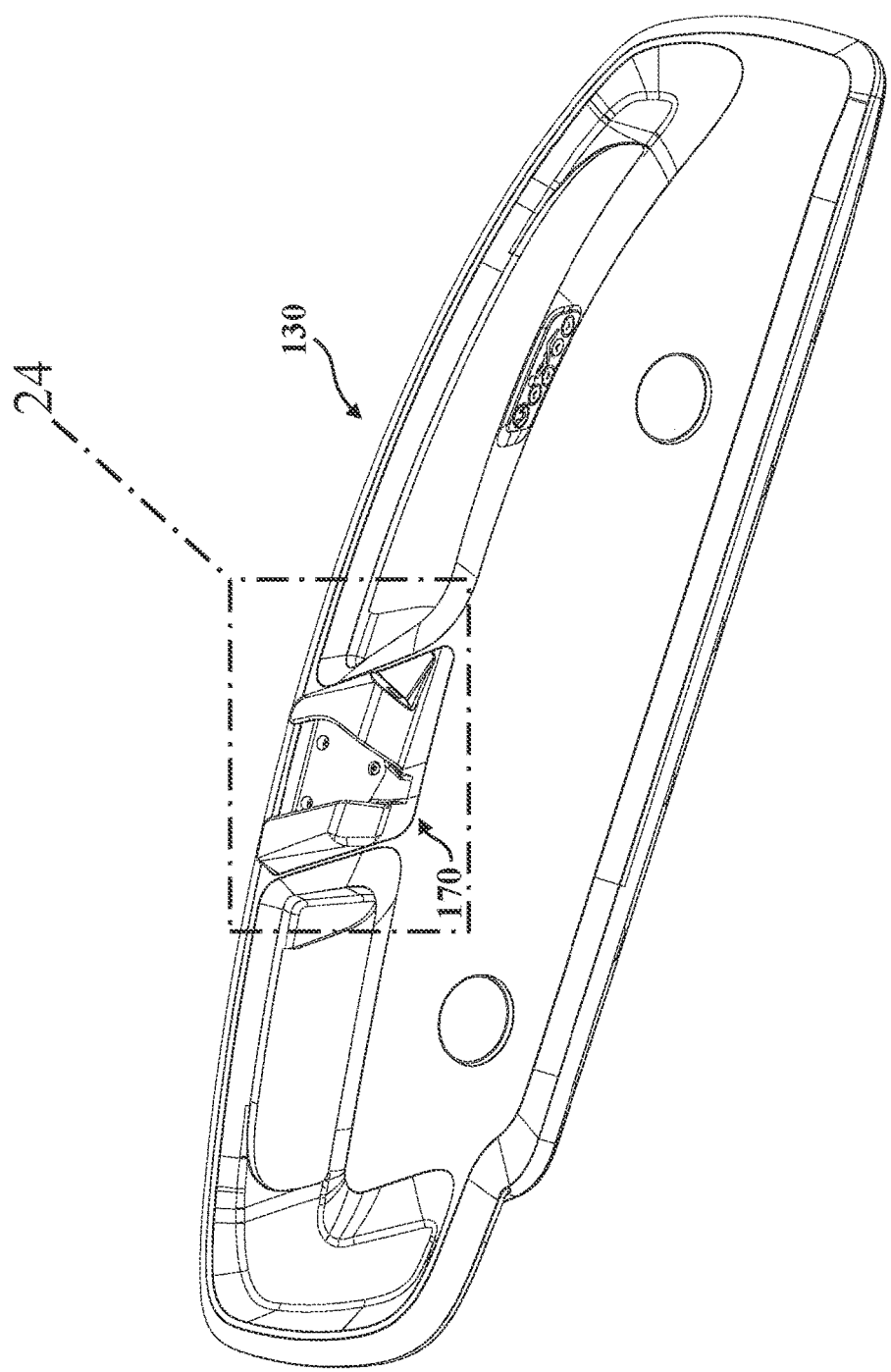
FIG. 23 is a bottom perspective view of the side rail and caddy of FIGS. 7-8.
Figure 24A:
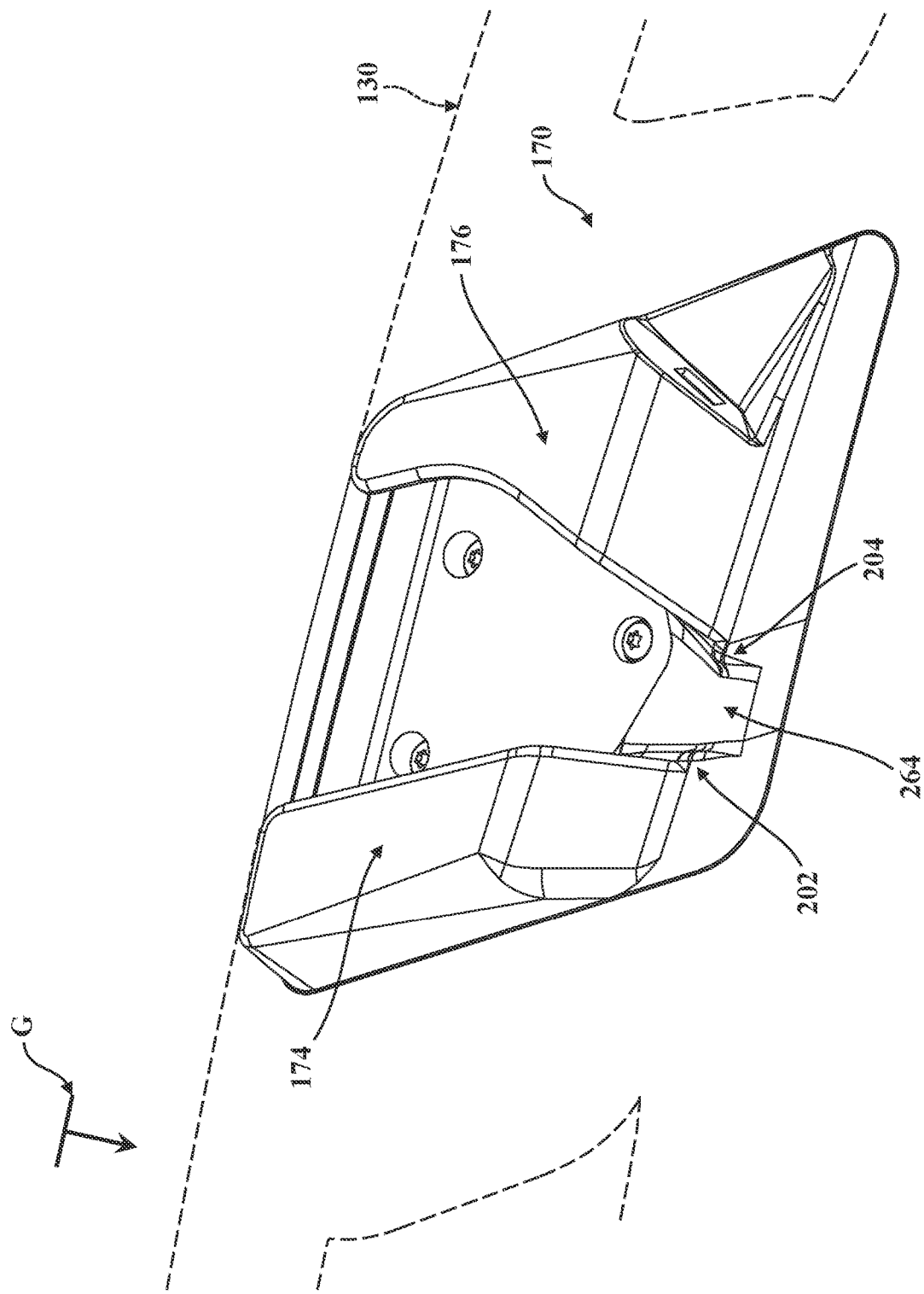
FIG. 24A is an enlarged partial bottom perspective view taken at reference 24 in FIG. 23, arranged relative to an exemplary gravitational reference indicia with the side rail depicted in phantom for illustrative purposes, and shown with the caddy coupled to the side rail.
Figure 24C:
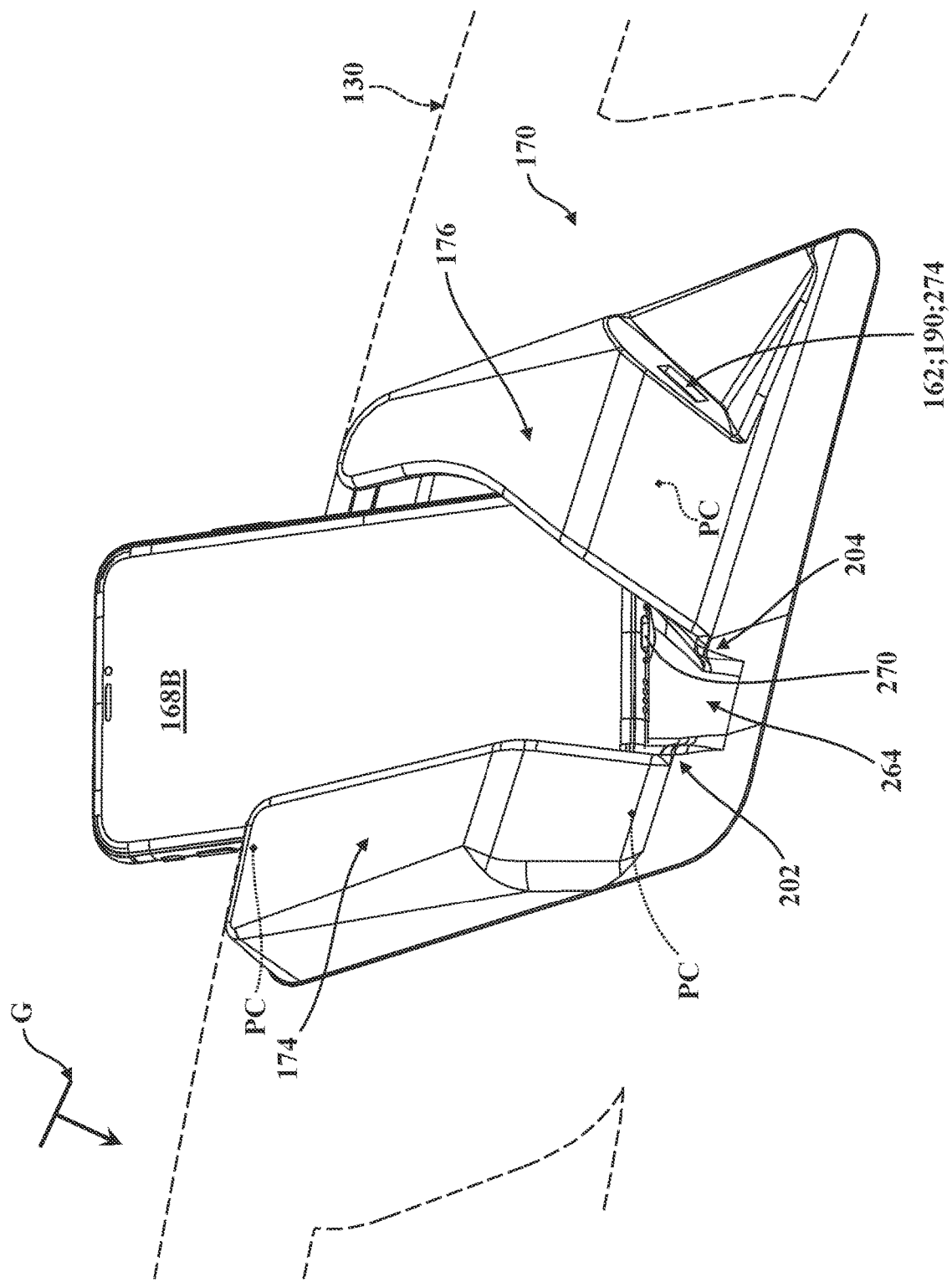
FIG. 24C is another enlarged partial bottom perspective view of the side rail and the caddy of FIG. 24A, shown with a second type of portable electronic device retained by the caddy in an exemplary configuration effected by the arrangement of the gravitational reference indicia.

Referring now to FIGS. 23-24C, the second side rail 130 is shown from another perspective to illustrate how differently-sized portable electronic devices 168A, 168B can be retained by and engage the caddy 170 at differing points of contact PC based, for example, on the arrangement of the caddy 170 coupled to the second side rail 130 relative to gravity represented by the gravitational reference indicia G. For the purposes of clarity and consistency, certain structural features described below are not separately illustrated in FIGS. 23-24C, but can be found in other Figures (e.g., FIGS. 10-14B). In FIG. 24B, the first portable electronic device 168A is shown retained by the caddy 170, and various portions of the first and second braces 174, 176 are shown providing differing points of contact PC with the first portable electronic device 168A, such as the second top constraining face 246 of the second lip 238, and portions of the first and second bottom support regions 178, 180 (engagement not shown in detail). In FIG. 24C, the second portable electronic device 168B is shown retained by the caddy 170, and various portions of the first and second braces 174, 176 are shown providing differing points of contact PC with the second portable electronic device 168B, such as the first top constraining face 240 of the first lip 236, and portions of the first and second bottom support regions 178, 180 (engagement not shown in detail). It will be appreciated that FIGS. 24B-24C depict exemplary arrangements of differently-sized portable electronic devices 168A, 168B retained by the caddy 170 and disposed in engagement with differing points of contact PC based, for example, on differences in the size, shape, profile, and the like of the portable electronic devices 168A, 168B, as well as based on the arrangement of the caddy 170 in each view relative to gravity as represented by the gravitational reference indicia G.

Referring now to FIGS. 2 and 25-26F, as noted above, the control system 154 of the patient support apparatus 100 may employ one or more charging interfaces 162 in some embodiments for electrically coupling with, and facilitating charging of, different types of portable electronic devices 168A, 168B. As is depicted generically in FIG. 2, portable electronic devices 168A, 168B typically include one or more ports 270 (e.g., a "charging port") employed to facilitate connection to tethers 192 (e.g., universal serial bus cables). Furthermore, conventional portable electronic devices 168A, 168B may also include one or more device coils 272 used to facilitate wireless charging (not shown in detail, but generally known in the related art). In the representative embodiments illustrated herein, and as is depicted schematically in FIG. 2, the charging interface 162 may comprise a wired interface 274 and/or an inductive charging interface 276. The wired interface 274 is operatively attached to the caddy 170 for electrically coupling with tethers 192 provided to connect to ports 270 of different portable electronic devices 168A, 168B.

Figure 25:
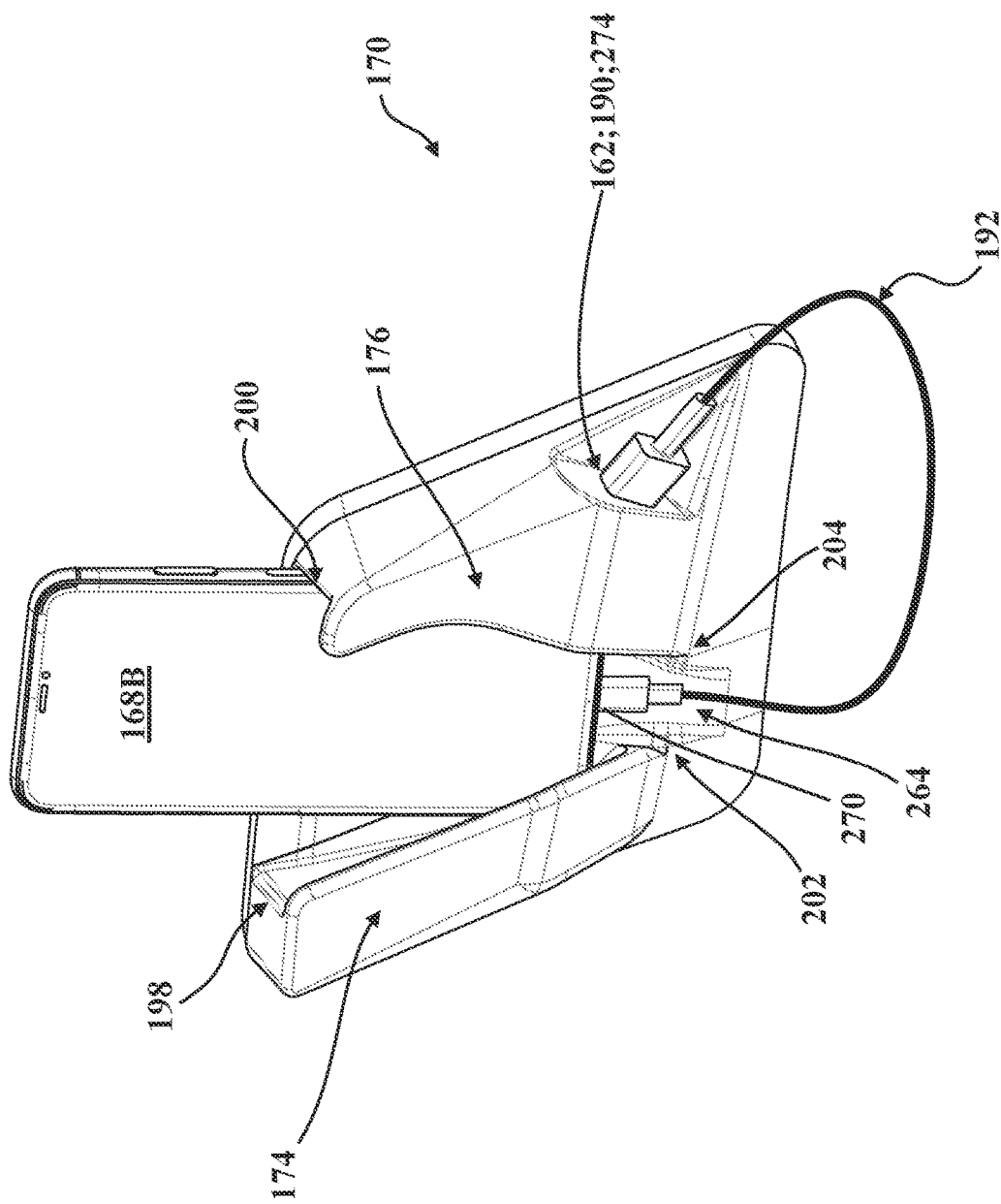
FIG. 25 is a perspective view of the caddy subassembly of FIGS. 7-8 shown with a first type of portable electronic device retained by the caddy and connected to a port of the caddy subassembly with a tether.

In the representative embodiment illustrated herein, the tether connector 190 defines the wired interface 274 of the charging interface 162, and comprises a Universal Serial Bus (USB) port to which a suitable tether 192 (e.g., a USB cable) can be attached (see FIG. 25). Here, the tether connector 190 of the wired interface 274 may be connected to the controller 156 either directly or indirectly in order to provide power from the power supplies 164 to charge portable electronic devices 168A, 168B. Those having ordinary skill in the art will appreciate that power regulation to the wired interface 274 can be achieved in a number of different ways and/or according to a number of different charging protocols. By way of non-limiting example, the controller 156 could be configured to provide specific voltages and/or currents to the wired interface 274, which could be based on various industry standards or could be adjusted for certain types of portable electronic devices 168A, 168B. In some embodiments, a separate charging controller (not shown) may be disposed in communication with the controller 156 to facilitate regulating power to the charging interfaces 162 and/or to the portable electronic devices 168A, 168B. Other configurations are contemplated. Furthermore, while the tether connector 190 is realized as a USB port in the illustrated embodiments, other types of connectors are contemplated.

In the representative embodiment illustrated herein, the inductive charging interface 276 comprises a plurality of inductive charging coils 278A, 278B, 278C operatively attached to the caddy 170 for electrically coupling with device coils 272 of different portable electronic devices 168A, 168B. Here, schematically-depicted first, second, and third inductive charging coils 278A, 278B, 278C are shown in FIGS. 26A-26F to illustrate one exemplary configuration of the inductive charging interface 276. The first, second, and third inductive charging coils 278A, 278B, 278C are shown spaced about the back 172 of the caddy 170 in different locations to facilitate communicating with device coils 272 (see FIG. 2) of portable electronic devices 168A, 168B irrespective of how the portable electronic devices 168A, 168B themselves are retained by the caddy 170 (e.g., to ensure charging from multiple positions) and/or irrespective of the configuration of the device coil 272 (e.g., to ensure charging of different styles of portable electronic devices). Here, the inductive charging interface 276 may be connected to the controller 156 either directly or indirectly in order to provide power from the power supplies 164 to charge portable electronic devices 168A, 168B. Those having ordinary skill in the art will appreciate that power regulation to the inductive charging interface 276 can be achieved in a number of different ways and/or according to a number of different charging protocols (e.g., according to the Qi standard). In some embodiments, a separate charging controller (not shown) may be disposed in communication with the controller 156 to facilitate regulating power to the charging interfaces 162 and/or to the portable electronic devices 168A, 168B.

In some embodiments, only a single inductive charging coil may be used (e.g., the first inductive charging coil 278A). However, it will be appreciated that any suitable number of inductive charging coils could be utilized (e.g., one, two, three, more than three, and the like). Furthermore, while certain representative embodiments of the inductive charging interface 276 are depicted in certain drawing views with a total of three similarly-sized inductive charging coils each having a generally circular profile, it will be appreciated that other configurations are contemplated, and certain inductive charging coils could be sized larger or smaller than others and/or could have other profiles (e.g., non-circular). In some embodiments, inductive charging coils could be "stacked" on top of each other in multiple planes (see FIG. 2; not shown in detail) to eliminate potential "gaps" between adjacent coils arranged within a common plane. In some embodiments, the "stacked" arrangement of inductive charging coils could be achieved with a predetermined amount of overlap (e.g., 50% overlap). In some embodiments, one or more inductive charging coils could be provided with "contoured" geometry, such as to conform to different types of surface profiles of the caddy 170 (e.g., where the back 172 has a curved or non-planar profile) and/or the side rail 130. Other configurations are contemplated.

It will be appreciated that the controller 156 depicted in FIG. 2 (or a separate charging controller as noted above) can be configured to operate the charging interface 162 in a number of different ways to facilitate optimizing power transfer to portable electronic devices 168A, 168B. In some embodiments, the controller 156 may be configured to activate, monitor, or otherwise drive each inductive charging coil 278A, 278B, 278B between "active" to transfer power and "inactive" based, for example, on changes in relative efficiency of power transfer to the device coil 272 of the portable electronic device retained by the caddy 170. Here, for example, the controller 156 may activate inductive charging coils 278A, 278B, 278C for a brief period of time (e.g., 0.5 seconds) and evaluate the power transfer of each inductive charging coil 278A, 278B, 278C against one or more predetermined thresholds to determine whether to activate certain inductive charging coils 278A, 278B, 278C. For example, the controller 156 may deactivate coils if the power transfer efficiency of one of the inductive charging coils 278A, 278B, 278C is below the predetermined threshold. As will be appreciated from the subsequent description below, certain inductive charging coils 278A, 278B, 278C may be deactivated based on the relative position of the portable electronic device 168A, 168B retained by the caddy 170 to, among other things, optimize power transfer and avoid unnecessary activation of certain inductive charging coils 278A, 278B, 278C. Other configurations are contemplated.

As is depicted schematically in FIG. 2, in some embodiments, the control system 154 may further comprise one or more charging indicators 280 disposed in communication with the controller 156 and/or the charging interface 162 to provide the patient with feedback regarding the charging state of the portable electronic device 168A, 168B retained by the caddy 170. Here, the charging indicator 280 may comprise a visual indicator 282 (e.g., a light-emitting diode, a bulb, and the like), an audible indicator 284 (e.g., a speaker, a buzzer, and the like), or other types of indicators (e.g., a haptic indicator). Other configurations are contemplated. In some embodiments, the controller 156 may activate the charging indicator 280 to communicate to the patient that their portable electronic device 168A, 168B retained by the caddy 170 is charging. For example, activation of the audible indicator 284 could result in a sound (e.g., a "ding") being generated to confirm to the patient that charging has been initiated. In some embodiments, such as is depicted in FIGS. 26A-26F, the visual indicator 282 could be operable between a first state 282A (e.g., an "off" condition not emitting light) to communicate to the patient that no charging is occurring (see FIG. 26A), and a second state 282B (e.g., an "on" condition emitting light) to communicate to the user that charging is underway (see FIGS. 26B-26F). In some embodiments, additional states may be employed to, for example, differentiate between charging efficiencies, the charged state of the portable electronic device 168A, 168B (e.g., determined based on power transfer), and the like, and may be effected in some embodiments by using one or more single or multi-color light-emitting diodes to communicate different states via the emission of differently-colored light. Other configurations are contemplated.

Figure 26A:
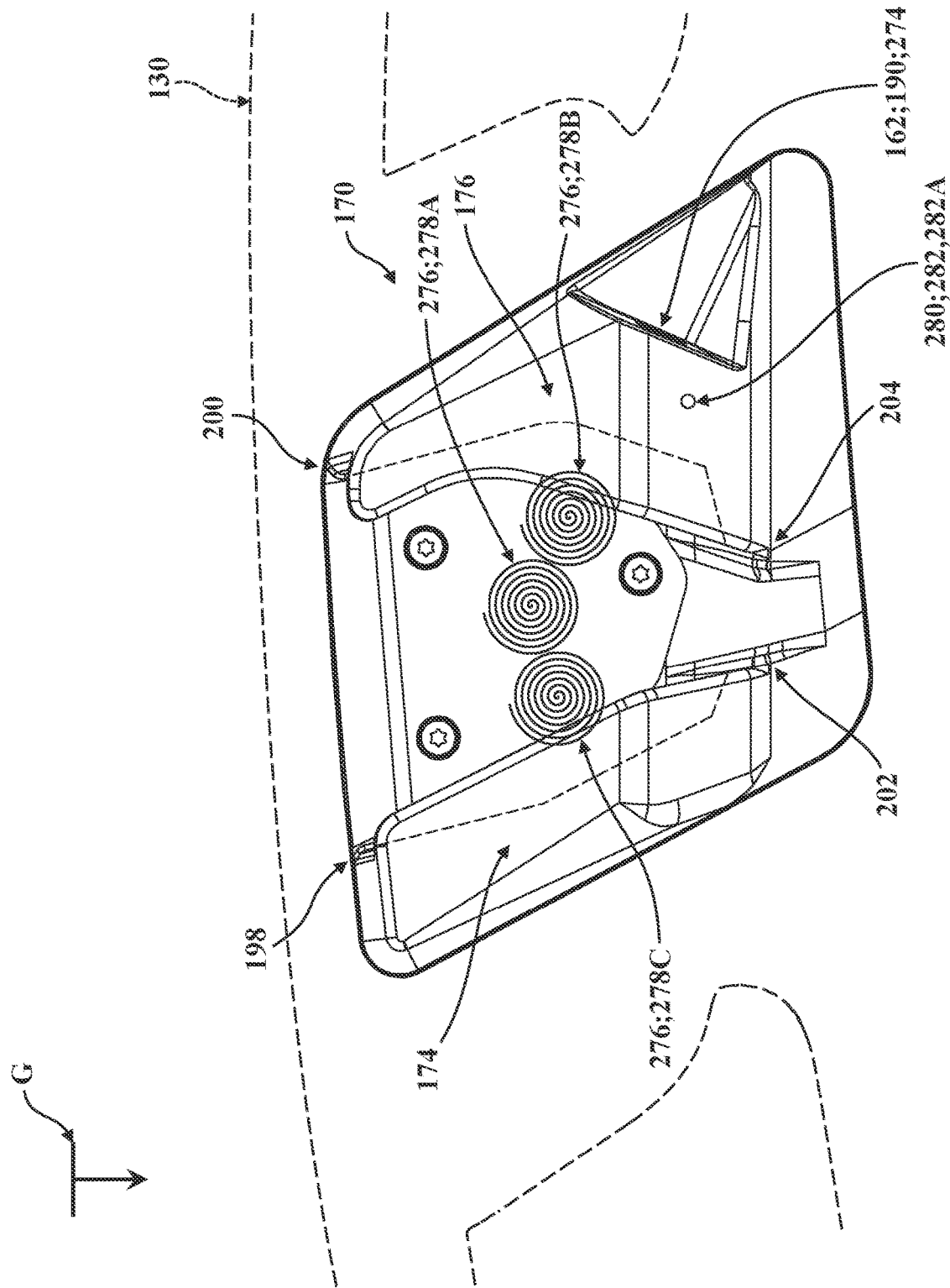
FIG. 26A is an enlarged partial front view taken at reference 18 in FIG. 17, arranged relative to an exemplary gravitational reference indicia with the side rail depicted in phantom for illustrative purposes, and shown with the caddy coupled to the side rail with first, second, and third coils depicted schematically.
Figure 26B:
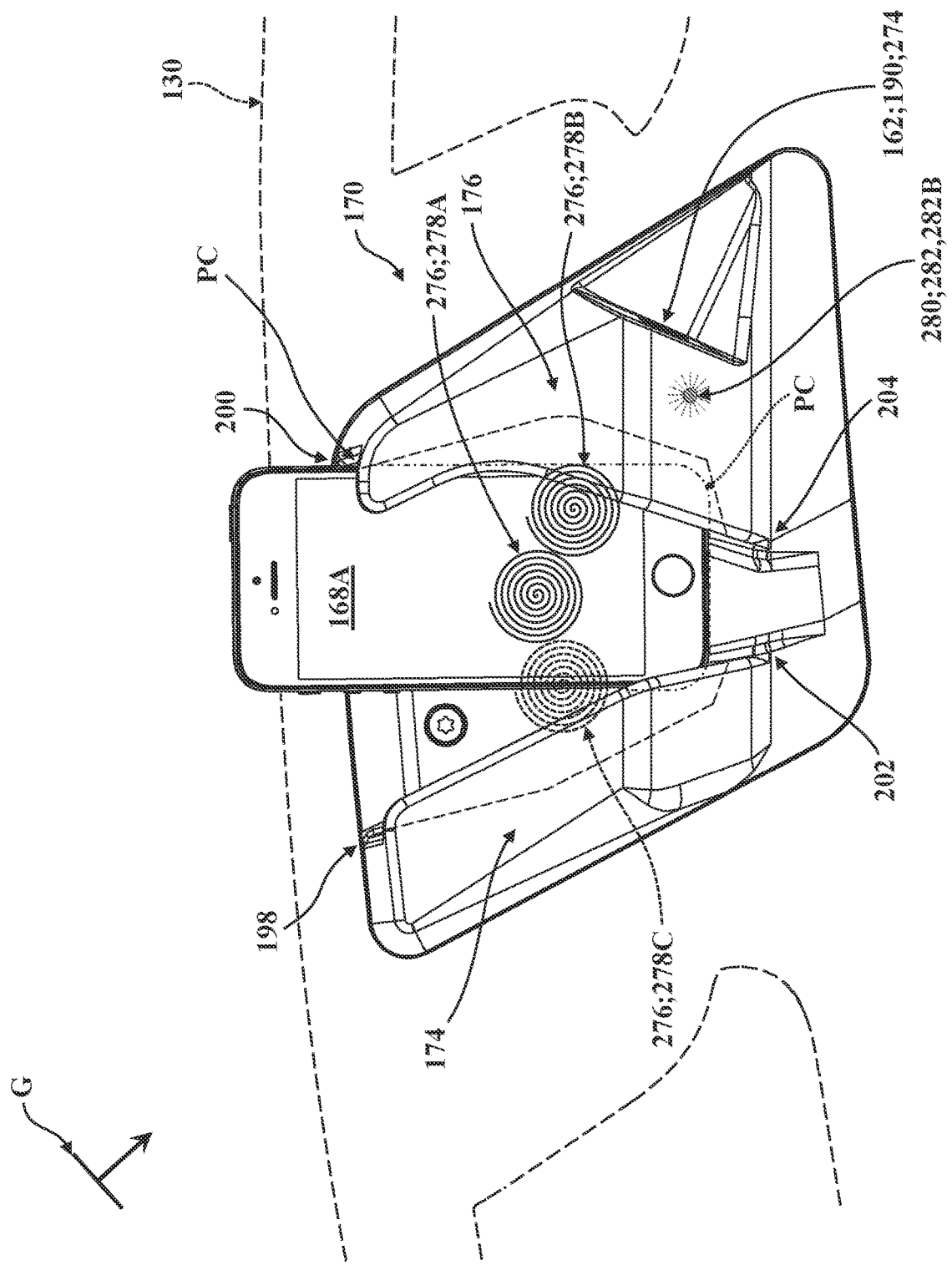
FIG. 26B is another enlarged partial front view of the side rail and the caddy of FIG. 26A, shown with a first type of portable electronic device retained by the caddy in an exemplary configuration effected by the arrangement of the gravitational reference indicia, and shown with the first and second coils active to represent charging of the first type of portable electronic device.
Figure 26C:
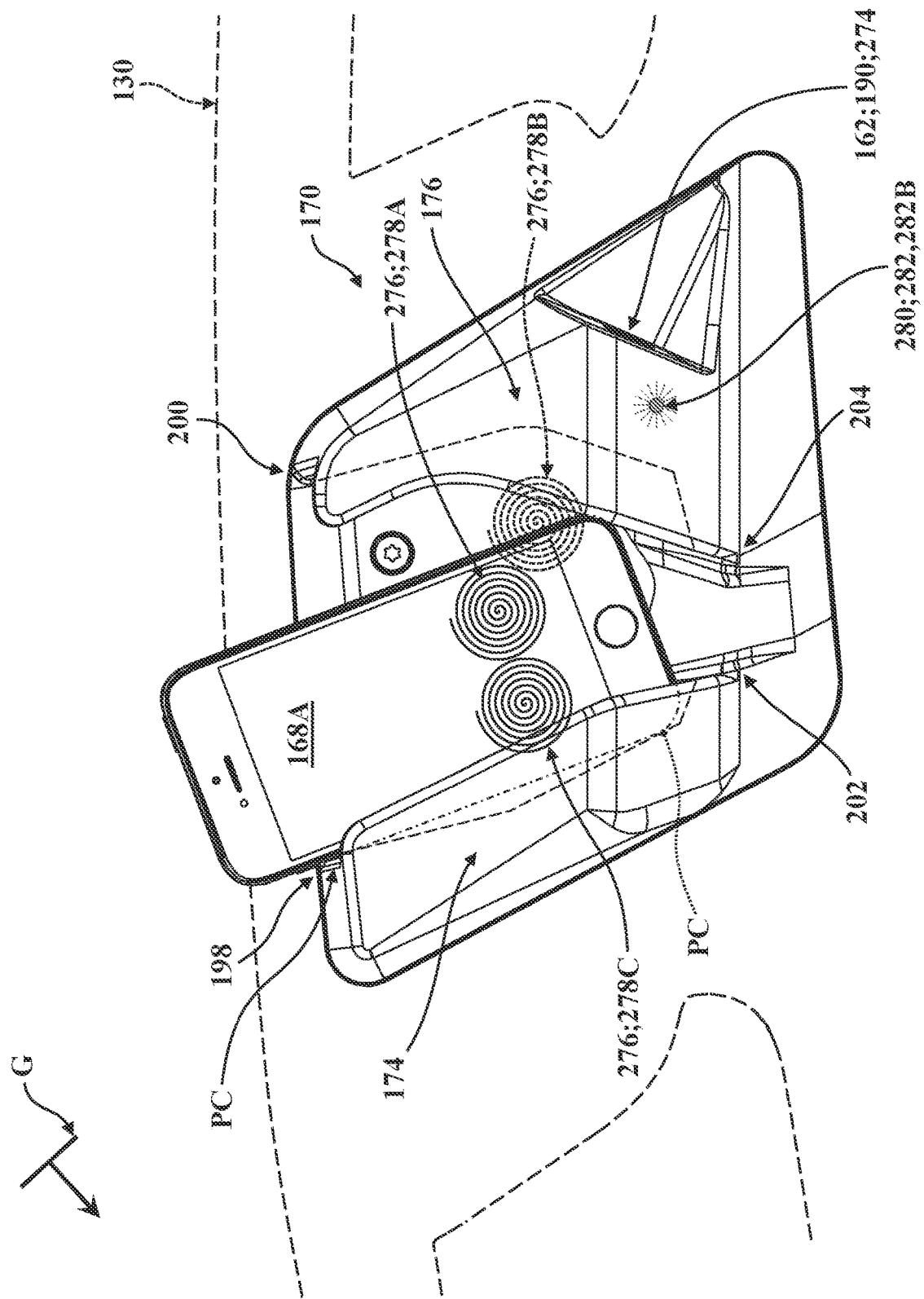
FIG. 26C is another enlarged partial front view of the side rail, the caddy, and the first type of portable electronic device of FIG. 26B, shown with the first type of portable electronic device retained by the caddy in a different exemplary configuration effected by the arrangement of the gravitational reference indicia, and shown with the first and third coils active to represent charging of the first type of portable electronic device.
Figure 26D:
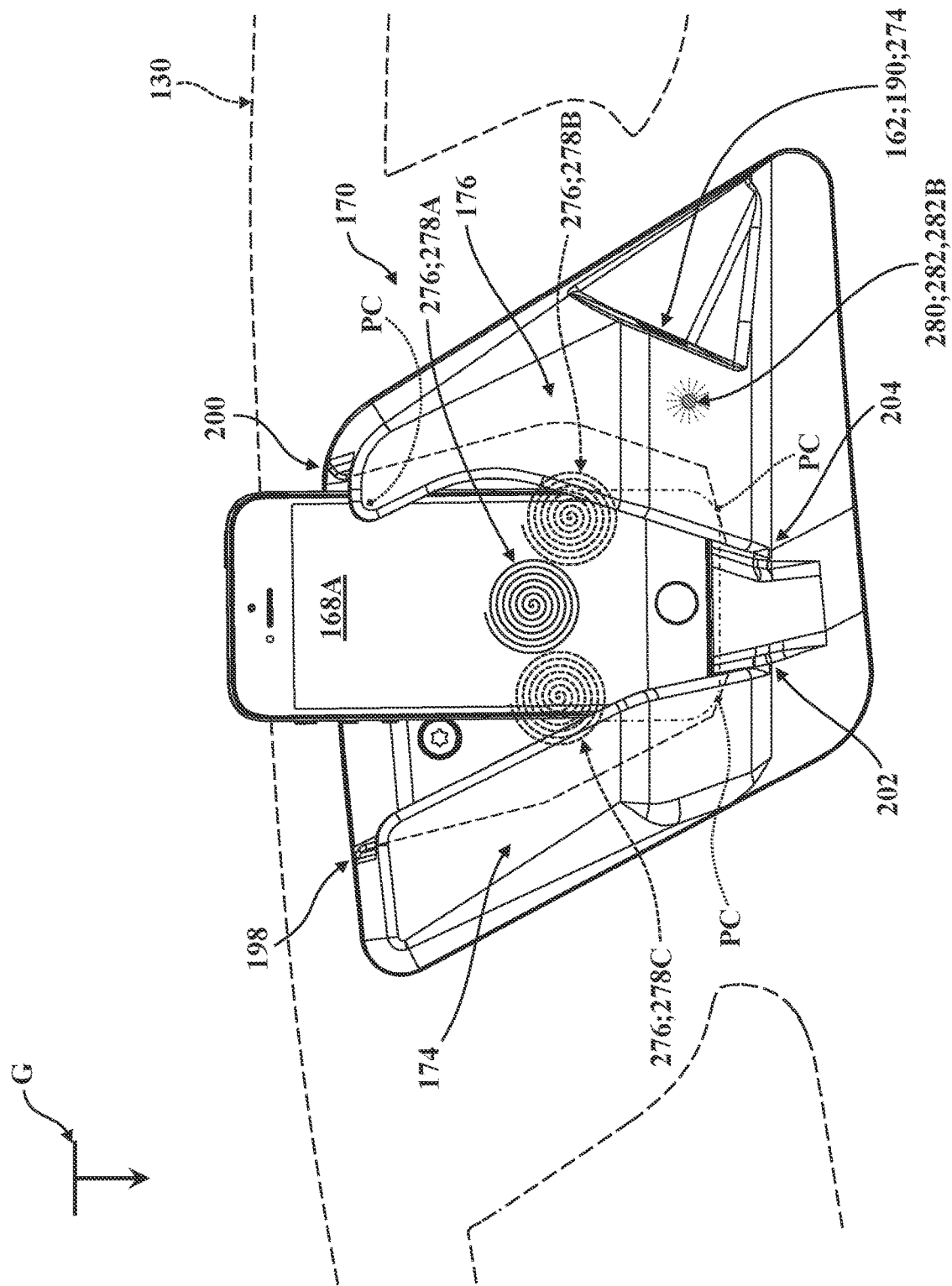
FIG. 26D is another enlarged partial front view of the side rail, the caddy, and the first type of portable electronic device of FIGS. 26B-26C, shown with the first type of portable electronic device retained by the caddy in another different exemplary configuration effected by the arrangement of the gravitational reference indicia, and shown with the first coil active to represent charging of the first type of portable electronic device.

FIGS. 26A-26F generally illustrate how differently-sized portable electronic devices 168A, 168B can be retained by and engage the caddy 170 at differing points of contact PC based, for example, on the arrangement of the caddy 170 coupled to the second side rail 130 relative to gravity represented by the gravitational reference indicia G while, at the same time, being charged via the inductive charging interface 276. In FIG. 26B, the first portable electronic device 168A is shown retained by the caddy 170, and the first and second inductive charging coils 278A, 278B are shown as active in order to electrically couple to the device coil 272 (not shown; see FIG. 2). In FIG. 26C, the arrangement of the second side rail 130 has changed (compare the gravitational reference indicia G in FIGS. 22B-22C) such that the first portable electronic device 168A is retained differently by the caddy 170. Here in FIG. 26C, the first and third inductive charging coils 278A, 278C are shown as active in order to electrically couple to the device coil 272 (not shown; see FIG. 2). In FIG. 26D, the arrangement of the second side rail 130 has changed again, and is similar to the arrangement depicted in FIG. 26B, but only the first inductive charging coil 278A is shown as active in order to illustrate the concept of utilizing a single inductive charging coil in some embodiments, as noted above.

Figure 26E:
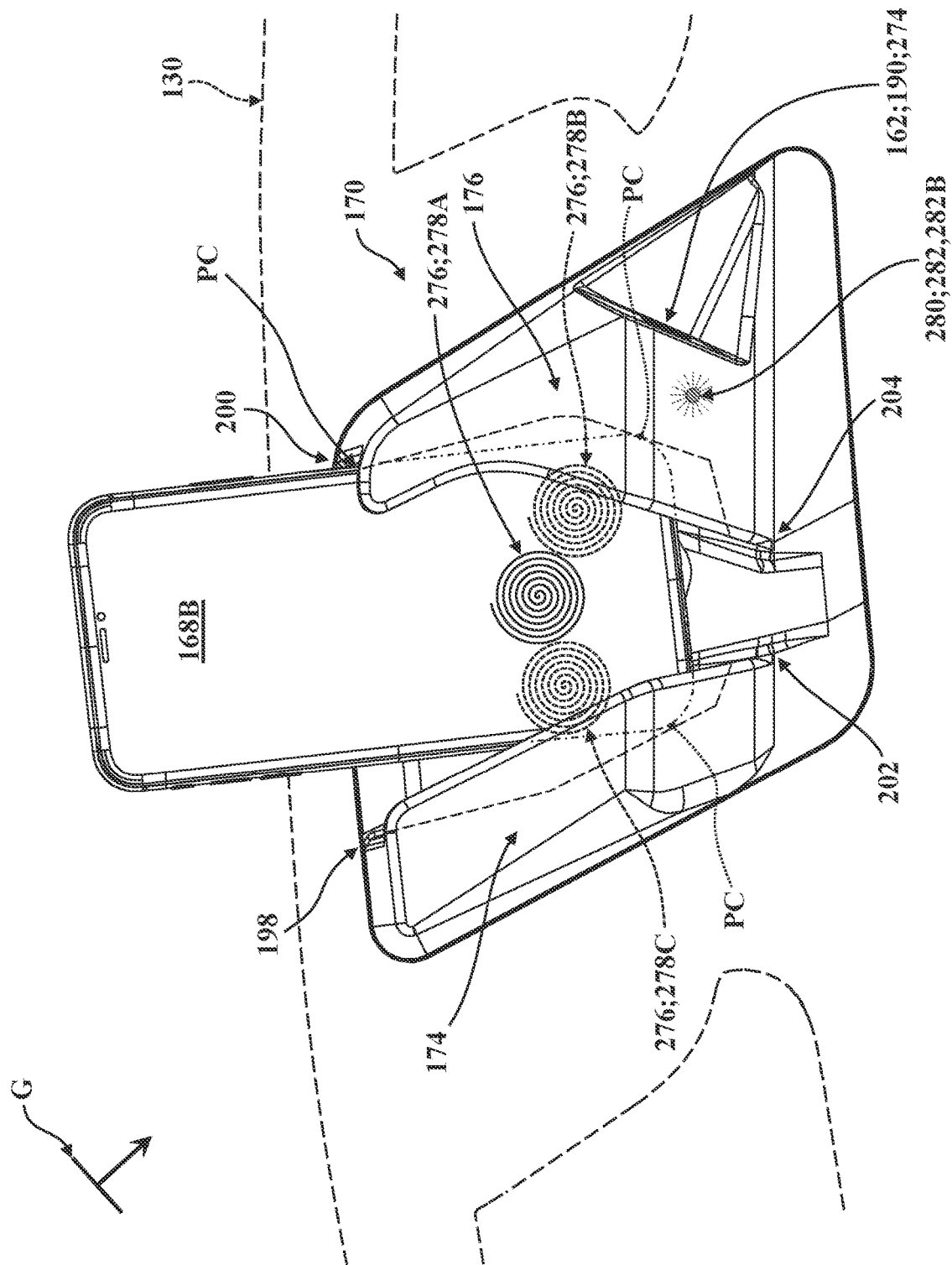
FIG. 26E is another enlarged partial perspective view of the side rail and the caddy of FIG. 26A, shown with a second type of portable electronic device retained by the caddy in an exemplary configuration effected by the arrangement of the gravitational reference indicia, and shown with the first coil active to represent charging of the second type of portable electronic device.
Figure 26F:
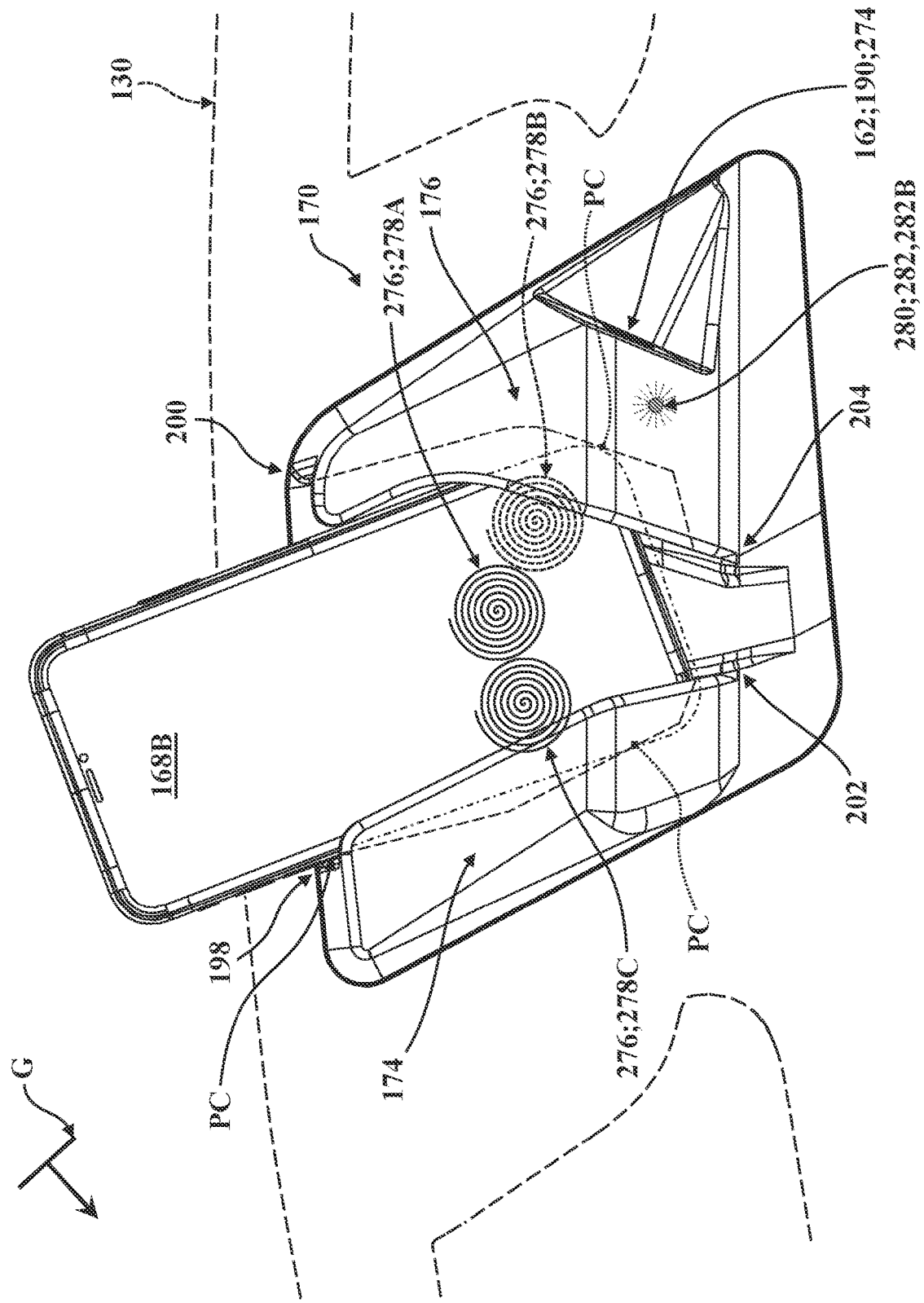
FIG. 26F is another enlarged partial front view of the side rail, the caddy, and the second type of portable electronic device of FIG. 26E, shown with the second type of portable electronic device retained by the caddy in a different exemplary configuration effected by the arrangement of the gravitational reference indicia, and shown with the first and third coils active to represent charging of the second type of portable electronic device.

In FIG. 26E, the second portable electronic device 168B is shown retained by the caddy 170, and the first inductive charging coil 278A is shown as active in order to electrically couple to the device coil 272 (not shown; see FIG. 2). In FIG. 26F, the arrangement of the second side rail 130 has changed (compare the gravitational reference indicia G in FIGS. 22E-22F) such that the second portable electronic device 168B is retained differently by the caddy 170. Here in FIG. 26F, the first and third inductive charging coils 278A, 278C are shown as active in order to electrically couple to the device coil 272 (not shown; see FIG. 2).

In this way, the caddy 170 of the present disclosure affords significant opportunities for increased patient convenience and comfort by providing reliable and easily-accessible retention, protection, and/or charging of portable electronic devices 168A, 168B of various sizes, styles, and/or configurations. Moreover, the "universal" nature of the caddy 170 afforded by the arrangement of the braces 174, 176 and the bottom support regions 178, 180 is compatible with the rapid product life cycle associated with mobile phones, tablet computers, electronic readers, and the like. Furthermore, it will be appreciated that the caddy 170 of the present disclosure can be used to retain and charge different portable electronic devices 168A, 168B using either wired or wireless electrical connections while, at the same time, positioning the portable electronic device for convenient access by the patient. In addition, those having ordinary skill in the art will appreciate that the representative embodiment of the caddy 170 illustrated herein is configured to be easily and readily cleaned, and can be implemented without necessitating that side rails be overtly large (e.g., in the lateral direction).

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support apparatus for removably retaining differently-sized portable electronic devices, said patient support apparatus comprising:
   a base;
   a litter with a patient support deck for supporting a patient; and
   a side rail coupled to said litter and arranged for movement relative to said base, said side rail including a caddy comprising:
      a back;
      a first brace extending laterally from said back and defining a first bottom support region with a first support face; and
      a second brace, spaced from said first brace, extending laterally from said back and defining a second bottom support region with a second support face spaced from and converging toward said first support face of said first bottom support region at an oblique angle to arrange said first and second bottom support regions to provide differing points of contact for retaining differently-sized portable electronic devices.

2. The patient support apparatus of claim 1, wherein said side rail is arranged for movement relative to said litter between a plurality of side rail positions; and
   wherein said caddy maintains retention of differently-sized portable electronic devices as said side rail moves between said plurality of side rail positions.

3. The patient support apparatus of claim 1, wherein said litter is arranged for movement relative to said base between a plurality of vertical configurations; and
   wherein said caddy maintains retention of differently-sized portable electronic devices as said litter moves between said plurality of vertical configurations.

4. The patient support apparatus of claim 1, wherein said litter comprises an intermediate frame, and said patient support deck comprises a plurality of deck sections including a back section arranged for movement relative to said intermediate frame between a plurality of section positions;
   wherein said side rail is coupled to said back section for concurrent movement between said plurality of section positions; and
   wherein said caddy maintains retention of differently-sized portable electronic devices as said back section moves between said plurality of section positions.

5. The patient support apparatus of claim 1, wherein said caddy is formed integrally with said side rail.

6. The patient support apparatus of claim 1, wherein said caddy is formed separately from and coupled to said side rail.

7. The patient support apparatus of claim 1, wherein said side rail is further defined as a first side rail, said first side rail defining a first side rail surface;
   further comprising a second side rail coupled to said litter and arranged for movement relative to said base, said second side rail spaced from said first side rail and defining a second side rail surface facing toward said first side rail surface;
   wherein said caddy is further defined as a first caddy; and
   wherein said second side rail includes a second caddy.

8. The patient support apparatus of claim 1, wherein said first support face and said second support face each have a substantially planar profile.

9. The patient support apparatus of claim 1, wherein at least one of said first support face and said second support face tapers toward said back.

10. The patient support apparatus of claim 1, wherein said first brace further defines a first constraining face, said second brace further defines a second constraining face, and wherein said first and second constraining faces are each arranged facing toward said back to provide differing points of contact for retaining differently-sized portable electronic devices.

11. The patient support apparatus of claim 1, wherein said first brace and said second brace are spaced longitudinally from each other to define an access opening shaped to permit access to differently-sized portable electronic devices retained by said caddy.

12. The patient support apparatus of claim 1, wherein said back of said caddy defines a back surface extending between and cooperating with said first brace and said second brace to define a storage volume for receiving differently sized portable electronic devices.

13. The patient support apparatus of claim 12, wherein said first brace defines a first top support region extending from a first top end toward said first bottom support region;
   wherein said second brace defines a second top support region extending from a second top end toward said second bottom support region; and
   wherein said first top end and said second top end cooperate to define an inlet shaped to receive differently sized portable electronic devices within said storage volume.

14. The patient support apparatus of claim 13, wherein said first brace further defines a first bottom end, and said second brace further defines a second bottom end spaced from said first bottom end to define an accessory slot for routing one or more tethers to differently-sized portable electronic devices retained within said caddy;
   wherein said first bottom support region extends between said first bottom end and said first top support region; and
   wherein said second bottom support region extends between said second bottom end and said second top support region.

15. The patient support apparatus of claim 1, further comprising a charging interface for electrically coupling with differently-sized portable electronic devices.

16. The patient support apparatus of claim 15, wherein said charging interface includes a wired interface operatively attached to said caddy for electrically coupling with tethers connected to ports of different portable electronic devices.

17. The patient support apparatus of claim 15, wherein said charging interface includes an inductive charging interface for electrically coupling with device coils of different portable electronic devices.

18. The patient support apparatus of claim 17, wherein said inductive charging interface comprises one or more inductive charging coils operatively attached to said back of said caddy to electrically couple with device coils of different portable electronic devices.

\* \* \* \* \*